United States Patent
Liu et al.

(10) Patent No.: US 12,476,851 B2
(45) Date of Patent: Nov. 18, 2025

(54) LAYERED MODULATION COMMUNICATION

(71) Applicant: QUALCOMM Incorporated, San Diego, CA (US)

(72) Inventors: Kangqi Liu, San Diego, CA (US); Wei Yang, San Diego, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 18/455,547

(22) Filed: Aug. 24, 2023

(65) Prior Publication Data

US 2025/0071004 A1    Feb. 27, 2025

(51) Int. Cl.
*H04L 27/00* (2006.01)
*G01S 13/28* (2006.01)

(52) U.S. Cl.
CPC .......... *H04L 27/00* (2013.01); *G01S 13/282* (2013.01)

(58) Field of Classification Search
CPC ... H04L 27/00; H04L 5/0091; H04L 27/0008; G01S 13/282; H04W 52/0235
See application file for complete search history.

(56) References Cited

U.S. PATENT DOCUMENTS

| | | | | |
|---|---|---|---|---|
| 2011/0111700 A1* | 5/2011 | Hackett | ................. | H04W 72/23 455/41.2 |
| 2011/0173517 A1* | 7/2011 | Kim | ................... | H04L 27/3488 714/776 |
| 2011/0298506 A1* | 12/2011 | Salle | ........................ | G01S 7/35 327/156 |
| 2018/0343614 A1 | 11/2018 | Cao et al. | | |
| 2021/0215817 A1* | 7/2021 | Lee | ....................... | G01S 13/426 |

FOREIGN PATENT DOCUMENTS

| | | |
|---|---|---|
| WO | 2022266036 A1 | 12/2022 |
| WO | 2023107768 | 6/2023 |

OTHER PUBLICATIONS

International Search Report and Written Opinion—PCT/US2024/043228—ISA/EPO—Nov. 20, 2024.
Rohling H., et al., "A New Generation of Automotive Radar Waveform Design Techniques", 2004 International Waveform Diversity Design Conference, IEEE, Nov. 8, 2004, 5 Pages, XP033331477, ISBN 978-1-5090-3177-1, abstract p. 1, paragraph 2 p. 3, paragraph 3 p. 3, paragraph 4 figure 3.

* cited by examiner

*Primary Examiner* — Vineeta S Panwalkar
(74) *Attorney, Agent, or Firm* — Paul M. McAdams; Harrity & Harrity, LLP

(57) ABSTRACT

Various aspects of the present disclosure generally relate to wireless communication. In some aspects, a first network entity may encode first information using keying modulation. The first network entity may encode second information using frequency modulated continuous waveform (FMCW) modulation. The first network entity may transmit a communication that includes a first layer indicating the first information and a second layer indicating the second information. Numerous other aspects are described.

29 Claims, 18 Drawing Sheets

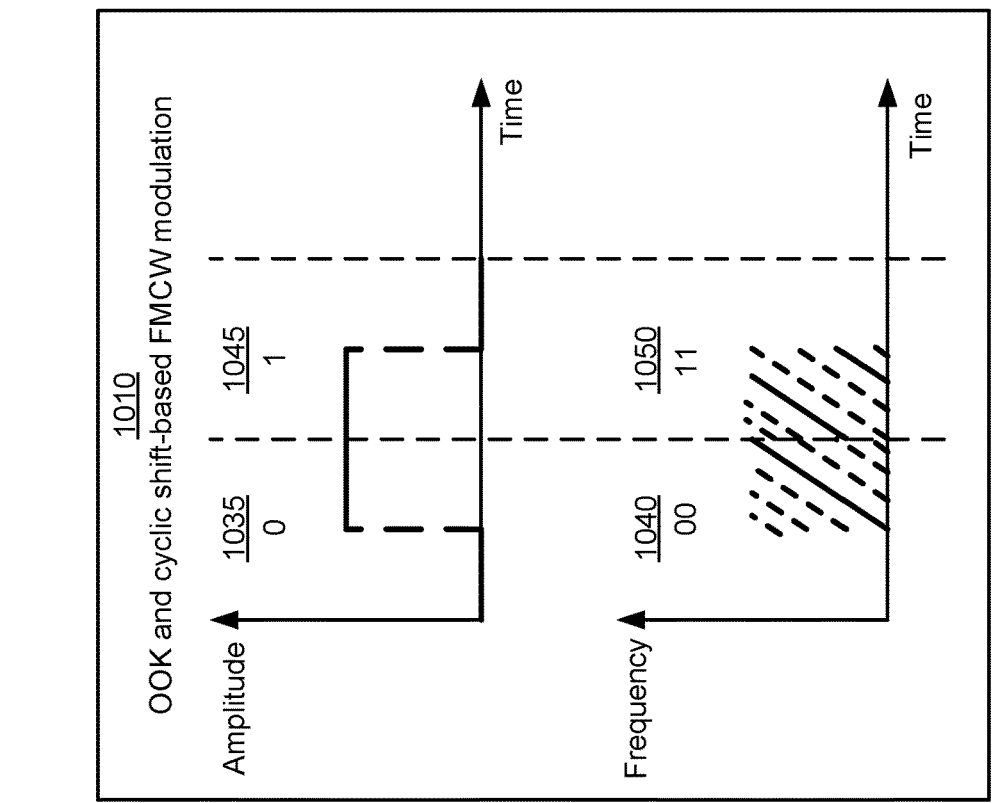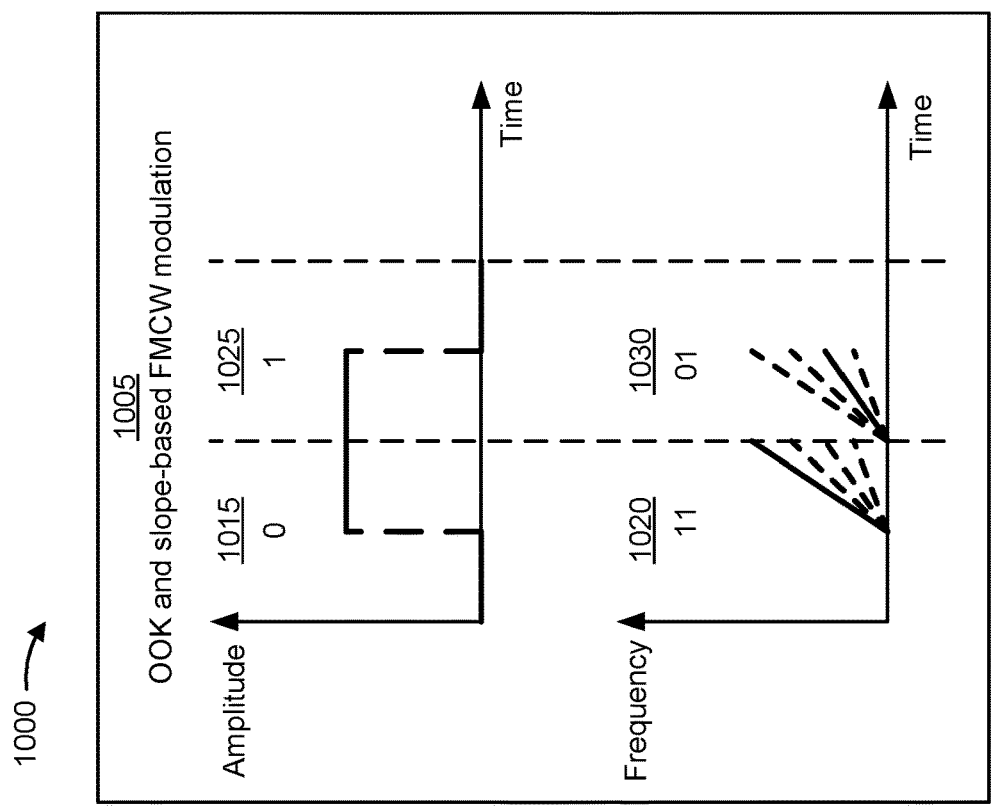
FIG. 10

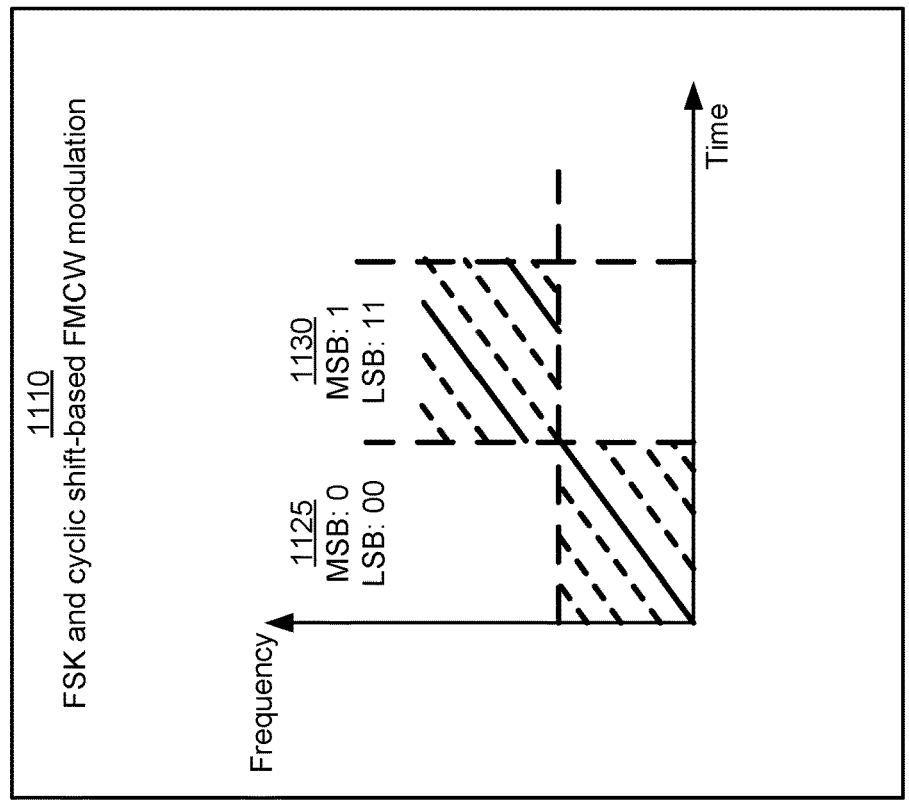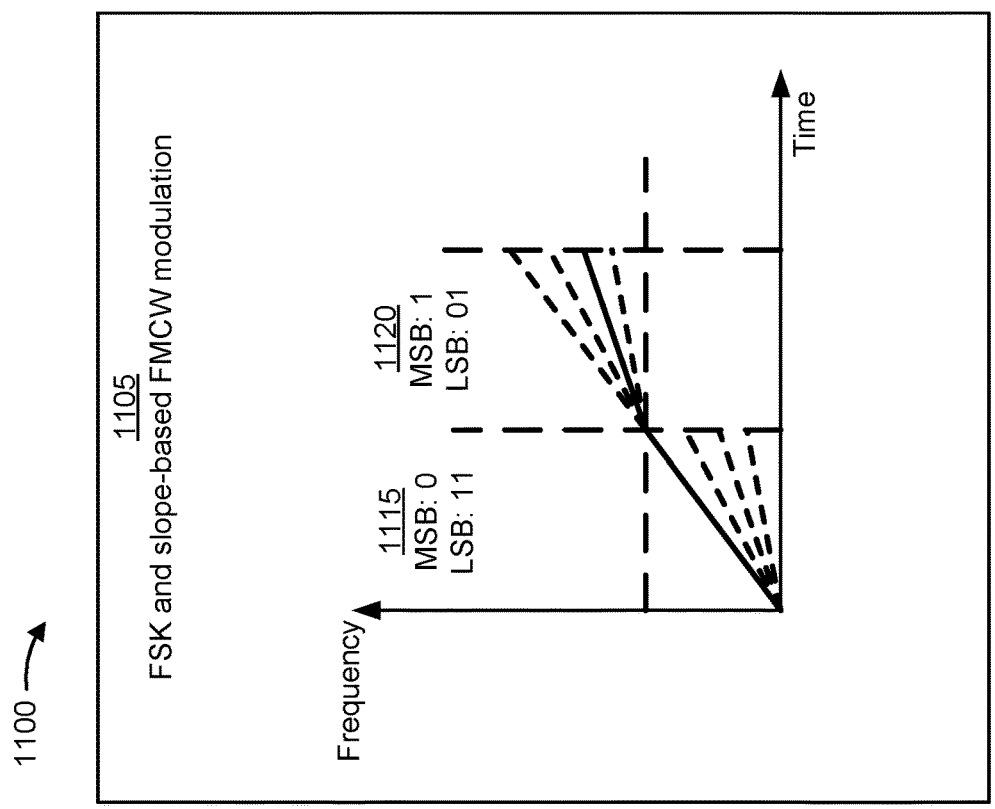
FIG. 11

LAYERED MODULATION COMMUNICATION

FIELD OF THE DISCLOSURE

Aspects of the present disclosure generally relate to wireless communication and to techniques and apparatuses for a layered modulation communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform (DFT) spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network entity for wireless communication. The first network entity may include a processing system. The processing system may be configured to encode first information using keying modulation. The processing system may be configured to encode second information using frequency modulated continuous waveform (FMCW) modulation. The processing system may be configured to transmit a communication that includes a first layer indicating the first information and a second layer indicating the second information.

Some aspects described herein relate to a first network entity for wireless communication. The first network entity may include a processing system. The processing system may be configured to receive, from a second network entity, a communication that includes a first layer indicating first information and a second layer indicating second information. The processing system may be configured to demodulate the first layer using keying modulation to obtain the first information. The processing system may be configured to demodulate the second layer using FMCW modulation to obtain the second information.

Some aspects described herein relate to a method of wireless communication performed by or at a first network entity. The method may include encoding first information using keying modulation. The method may include encoding second information using FMCW modulation. The method may include transmitting a communication that includes a first layer indicating the first information and a second layer indicating the second information.

Some aspects described herein relate to a method of wireless communication performed by or at a first network entity. The method may include receiving, from a second network entity, a communication that includes a first layer indicating first information and a second layer indicating second information. The method may include demodulating the first layer using keying modulation to obtain the first information. The method may include demodulating the second layer using FMCW modulation to obtain the second information.

Some aspects described herein relate to a non-transitory computer-readable medium having instructions for wireless communication stored thereon. The instructions, when executed by a first network entity, may cause the network entity to encode first information using keying modulation. The instructions, when executed by the first network entity, may cause the network entity to encode second information using FMCW modulation. The instructions, when executed by the first network entity, may cause the network entity to transmit a communication that includes a first layer indicating the first information and a second layer indicating the second information.

Some aspects described herein relate to a non-transitory computer-readable medium having instructions for wireless communication stored thereon. The instructions, when executed by a first network entity, may cause the network entity to receive, from a second network entity, a communication that includes a first layer indicating first information and a second layer indicating second information. The instructions, when executed by the first network entity, may cause the network entity to demodulate the first layer using keying modulation to obtain the first information. The instructions, when executed by the first network entity, may cause the network entity to demodulate the second layer using FMCW modulation to obtain the second information.

Some aspects described herein relate to an apparatus for wireless communication. The apparatus may include means for encoding first information using keying modulation. The apparatus may include means for encoding second information using FMCW modulation. The apparatus may include means for transmitting a communication that includes a first layer indicating the first information and a second layer indicating the second information.

Some aspects described herein relate to an apparatus for wireless communication. The apparatus may include means for receiving, from a second network entity, a communication that includes a first layer indicating first information and a second layer indicating second information. The apparatus may include means for demodulating the first layer using keying modulation to obtain the first information. The apparatus may include means for demodulating the second layer using FMCW modulation to obtain the second information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing broadly outlines example features and example technical advantages of examples according to the disclosure. Additional example features and example advantages are described hereinafter.

BRIEF DESCRIPTION OF THE DRAWINGS

The appended drawings illustrate certain example aspects of this disclosure and are therefore not limiting in scope. The same reference numbers in different drawings may identify the same or similar elements.

FIG. 10 is a diagram of an example associated with an on-off keying modulated and frequency modulated continuous waveform (FMCW) modulated communication, in accordance with the present disclosure.

FIG. 11 is a diagram of an example associated with an frequency-shift keying modulated and FMCW modulated communication, in accordance with the present disclosure.

DETAILED DESCRIPTION

Figure 1:
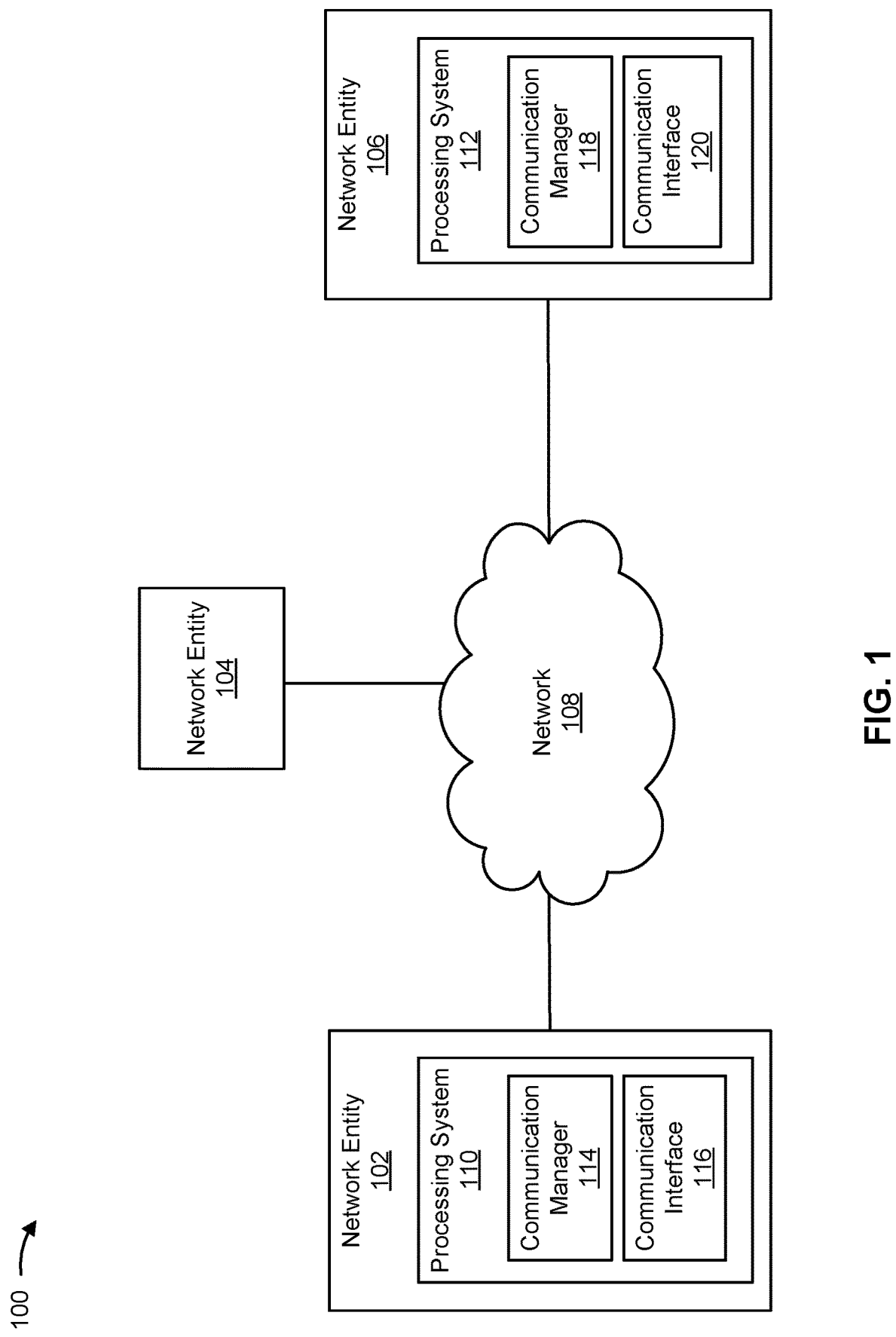
FIG. 1 is a diagram illustrating an example environment in which apparatuses and/or methods described herein may be implemented, in accordance with the present disclosure.

In some examples, a transmitting entity may transmit, and a receiving entity receive, a signal. The signal may be a low power signal (e.g., associated with low power consumption at the receiving entity associated with receiving the signal). In some examples, the signal may be associated with keying modulation. Keying modulation may include on-off keying (OOK) modulation, and/or frequency-shift keying (FSK) modulation, among other examples. For example, the transmitting entity may modulate and/or encode the signal using keying modulation (e.g., OOK modulation or FSK modulation). As an example, the signal may be a wakeup signal (WUS), a synchronization signal (SS), a reference signal (RS), or another signal. The signal may be associated with low power consumption and/or low energy consumption by the receiving entity (e.g., associated with receiving the signal) because of the relatively low sampling rates and reduced complexity associated with components used to receive signals modulated via the keying modulation. For example, the signal may be a low-power (LP) WUS (LP-WUS), an LP-SS, and/or an LP-RS, among other examples. For example, the receiving entity may include a LP receiver (e.g., a radio receiver circuit designed to have low energy consumption). The LP receiver may also be referred to as an LP radio, and/or a LP wakeup radio (LP-WUR), among other examples.

The receiving entity (e.g., via the LP receiver), may monitor for signals (e.g., for the signal). In some examples, the receiving entity may include a main receiver (e.g., associated with a relatively higher energy consumption than the LP receiver). For example, the LP receiver may be a companion receiver that is configured to monitor for signals, with very low power, while a main receiver is powered off or in a deep sleep state. The LP receiver may wake up the main receiver when actual data communication is indicated (e.g., via the signal, such as a WUS). The LP receiver may consume low power by design, and may be powered separately with less power needed, as compared to the main receiver.

When there is no data to receive, the main receiver may be off or in deep sleep, and the LP receiver may actively monitor for a signal. This conserves power and/or energy of the receiving entity by enabling the receiving entity to keep the main receiver off or in a deep sleep state. If the receiving entity receives a signal (e.g., an LP-WUS) via the LP receiver, then the receiving entity may cause the main receiver to be turned on (e.g., to enable the receiving entity to receive data when the transmitting entity has data to transmit to the receiving entity). For example, the signal (e.g., LP-WUS or another signal) may be used to reduce unnecessary paging receptions. The signal may be transmitted only when there is paging for idle or inactive mode entities (e.g., UEs). When the LP-WUS is detected by the receiving entity, the receiving entity may turn on the main receiver. The main receiver may monitor for a synchronization signal block (SSB) before a paging occasion (PO) for synchronization, and then may receive a paging message accordingly. When the signal is not detected, the main receiver may stay powered off, in a deep sleep state for power saving.

For example, the receiving entity (e.g., the LP receiver of the receiving entity) may be associated with a keying modulation design. For example, the receiving entity (e.g., the LP receiver of the receiving entity) may be associated with an OOK based design and/or an FSK based design. The OOK based design and/or an FSK based design may provide greater power saving, as compared to an orthogonal frequency division multiplexing (OFDM)-based design. In other words, the receiving entity (e.g., the LP receiver of the receiving entity) may be configured to receive OOK waveforms and/or FSK waveforms for improved power saving and/or reduced energy consumption associated with one or more reception operations.

In some examples, the signal (e.g., a WUS modulated using OOK or FSK) may be a single-carrier signal (e.g., the signal may occupy a single carrier and/or a single subcarrier in the frequency domain). In such examples, the receiving entity may detect the signal with small sampling rates (e.g., a sampling rate of approximately 30 kilohertz at a 30 kilohertz subcarrier spacing). However, a single-carrier signal may be sensitive to frequency selectivity (e.g., a measure of the performance of the receiving entity to respond only to the signal the receiving entity is tuned to and reject other signals nearby in frequency). In other examples, the signal may be a multi-carrier signal (e.g., the signal may occupy multiple carriers and/or multiple subcarriers in the frequency domain). A multi-carrier signal may be robust against fading, but may be associated with a high sampling rate (e.g., the sampling rate may be proportional to the total bandwidth spanned by the multi-carrier signal), thereby increasing energy consumption of the receiving entity. Additionally, the multi-carrier signal (e.g., using an OOK waveform or an FSK waveform) may be associated with a modulation of 1 bit (e.g., a single bit) over multiple subcarriers, resulting in reduced spectral efficiency.

For example, the signal (e.g., using an OOK waveform or an FSK waveform) may be associated with indicating a single bit in a given OFDM symbol. For example, the signal may indicate a single bit per OFDM symbol. This may result in a low data rate for the signal. The data rate may be significantly less than expected for an actual bandwidth occupied by the signal. However, increasing the quantity of bits indicated in a given OFDM symbol by the signal (e.g., for OFDM-compatible OOK waveforms or OFDM-compatible FSK waveforms) may result in frequency selectivity errors and/or in-band interference. Therefore, the signal may be associated with a low data rate (e.g., in examples where a single bit is indicated in a given OFDM symbol) or degraded performance (e.g., caused by frequency selectivity errors and/or in-band interference) with an increased quantity of bits indicated in a given OFDM symbol by the signal.

Various aspects relate generally to wireless communication and more particularly to a layered modulation communication. Some aspects more specifically relate to a communication that includes a first layer modulated using a keying modulation scheme and a second layer that is modulated using a frequency modulated continuous waveform (FMCW) modulation scheme. In some aspects, a transmitting entity may transmit, and a receiving entity may receive, a communication that includes the first layer and the second layer. The first layer may indicate first information, and the second layer may indicate second information. The receiving entity may detect, decode, demodulate, and/or otherwise receive the first layer using the keying modulation scheme (e.g., using OOK modulation or FSK modulation) to obtain the first information. Additionally, or alternatively, the receiving entity may detect, decode, demodulate, and/or otherwise receive the second layer using the FMCW modulation scheme to obtain the second information. A layer may refer to an independent data streams. The multiple layers (e.g., multiple independent data streams) may be transmitted simultaneously (e.g., in a given signal) using different modulation schemes (e.g., via a hierarchical modulation scheme). For example, a first layer may be associated with keying modulation (e.g., OOK modulation or FSK modulation), and a second layer may be associated with FMCW modulation.

In some aspects, the first layer may indicate a most significant bit (MSB) for the communication and the second layer may indicate one or more least significant bits (LSBs) for the communication. In some aspects, the communication may be a WUS. In such examples, the first layer (e.g., the first information) may indicate a set of entities (e.g., a set of user equipments (UEs)). For example, the transmitting entity may have data or a communication to transmit to at least one entity included in the set of entities. Therefore, the transmitting entity may encode and/or modulate first information (e.g., using OOK modulation or FSK modulation) to indicate that the set of entities are to wake up. The second layer (e.g., the second information) may indicate the at least one entity included in the set of entities for which the transmitting entity has data or a communication. In other words, the second layer (e.g., the second information) may indicate a particular UE that is to wake up (e.g., from a set of UEs). The receiving entity may obtain the first information and determine that the receiving entity is included in the set of entities indicated to wake up by the first layer and/or the first information. In some aspects, the receiving entity may obtain the second information (e.g., may detect, decode, and/or demodulate the second layer) based on, in response to, or otherwise associated with the first information indicating that the set of entities are to wake up. If the second information indicates an identifier associated with the receiving entity (e.g., if the second information indicates that the receiving entity is to wake up), then the receiving entity may wake up (e.g., wake up and/or power on a main receiver) to enable the receiving entity to receive the data and/or the communication from the transmitting entity (e.g., via the main receiver).

Particular aspects of the subject matter described in this disclosure can be implemented to realize one or more of the following potential advantages. Some aspects described herein enable a layered modulation signal that includes multiplexed information for increased data rates and low power consumption at the receiving entity. In some aspects, by using keying modulation (e.g., OOK modulation or FSK modulation) in combination with FMCW modulation for respective layers may enable the receiving entity to receive the signal using low power consumption while also increasing the data rate associated with the signal, as described in more detail elsewhere herein. For example, both keying modulation (e.g., OOK modulation or FSK modulation) and FMCW modulation may be associated with relatively low sampling rates and/or relatively low complexity components, thereby enabling the receiving entity to receive signals modulated using keying modulation (e.g., OOK modulation or FSK modulation) and FMCW modulation with relatively low power consumption.

In some aspects, by indicating the MSB(s) for the communication via the first layer (e.g., that is modulated using OOK modulation or FSK modulation), higher order or more significant information may be indicated to a wider range of entities and/or devices. For example, the OOK modulation or FSK modulation may be associated with relatively less complexity than the FMCW modulation (and therefore may be supported by a wider range of (or more) entities and/or devices). Therefore, by indicating the MSB(s) via the first layer, the transmitting entity may indicate the MSB(s) to a wider range of entities and/or devices.

By receiving (e.g., detecting, decoding, and/or demodulating) the second layer only when the second information is intended for or applicable to the receiving entity, the second receiving entity may conserve processing resources, computing resources, and/or power resources that would have otherwise been used to detect, decode, and/or demodulate the second layer in examples where the second information is not intended for or is not applicable to the receiving entity. By waking up the receiving entity (e.g., by turning on the main receiver) only if the information indicated by the first layer and/or the second layer of the communication indicates that there are communication(s) to be received by the receiving entity, the receiving entity may conserve power that would have otherwise been used to power the main receiver. Additionally, by transmitting the communication using multiple layers that are modulated using modulation schemes that can be processed (e.g., received, detected, demodulated, and/or decoded) using relatively low sampling rates, the receiving entity may conserve power associated with processing the multiple layers. Further, by transmitting the communication using multiple layers, additional data may be indicated via the same communication (e.g., the same signal), thereby increasing the data rate associated with the communication (e.g., while not significantly increasing the power consumption of the receiving entity associated with receiving the communication).

Various aspects of the disclosure are described more fully hereinafter with reference to the accompanying drawings. This disclosure may, however, be embodied in many different forms and is not limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, network entity, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the example concepts disclosed herein, both their organization and method of operation, together with associated example advantages, are described in the following description and in connection with the accompanying figures. Each of the figures is provided for the purposes of illustration and description, and not as a definition of the limits of the claims. Each of the figures is provided for the purposes of illustration and description, and not as a definition of the limits of the claims.

While aspects are described in the present disclosure by illustration to some examples, those skilled in the art understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described example aspects and example features may include additional example components and example features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example environment 100 in which apparatuses and/or methods described herein may be implemented, in accordance with the present disclosure. As shown in FIG. 1, the environment 100 may include a network entity 102, a network entity 104, and a network entity 106, that may communicate with one another via a network 108. The network entities 102, 104, and 106, may be dispersed throughout the network 108, and each network entity 102, 104, and 106 may be stationary and/or mobile. The network 108 may include wired communication connections, wireless communication connections, or a combination of wired and wireless communication connections.

The network 108 may include, for example, a cellular network (e.g., a Long-Term Evolution (LTE) network, a code division multiple access (CDMA) network, a 4G network, a 5G network, a 6G network, or another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In general, any number of networks 108 may be deployed in a given geographic area. Each network 108 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, Open-RAT NR. 5G, and/or 6G RAT networks may be deployed.

In some aspects, the environment 100 may include one or more non-terrestrial network (NTN) deployments in which a non-terrestrial wireless communication device may include a non-terrestrial network entity (e.g., the network entity 102, 104, and 106). The non-terrestrial network entity may include a network entity such as, for example, a UE (which may be referred to herein, interchangeably, as a "non-terrestrial UE"), a base station (referred to herein, interchangeably, as a "non-terrestrial base station"), and/or a relay station (referred to herein, interchangeably, as a "non-terrestrial relay station"), among other examples. As used herein, "NTN" may refer to a network for which access is facilitated by a non-terrestrial network entity such as a non-terrestrial UE, a non-terrestrial base station, and/or a non-terrestrial relay station, among other examples.

One or more of the network entities 102, 104, and 106 may be, include, or be included in, any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. Satellites may communicate directly and/or indirectly with other entities in the environment using satellite communication. The other entities may include UEs (e.g., terrestrial UEs and/or non-terrestrial UEs), other satellites in the one or more NTN deployments, other types of base stations (e.g., stationary and/or ground-based base stations), relay stations, and/or one or more components and/or devices included in a core network, among other examples.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity." in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity 102 may include a processing system 110. Similarly, the network entity 106 may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an "input" and "input information" may be used interchangeably. Similarly, as described herein, an "output" and "output information" may be used interchangeably. Any information generated by any component may be provided to one or more other systems or components of, for example, a network entity described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

For example, as shown in FIG. 1, the processing system 110 may include a (e.g., one or more) communication manager 114 and one or more communication interfaces 116. The communication manager 114 may be configured to perform one or more communication tasks as described herein. In some aspects, the communication manager 114 may direct the communication interface 120 and/or the processing system 110 to perform one or more communication tasks as described herein. Similarly, the processing system 112 may include a (e.g., one or more) communication manager 118 and one or more communication interfaces 120. The communication manager 118 may be configured to perform one or more communication tasks as described herein. In some aspects, the processing system 112 and/or the communication manager 118 may direct the communication interface 120 to perform one or more communication tasks as described herein. Although depicted, for clarity of description, with reference only to the network entities 102 and 104, any one or more of the network entities 102, 104, and 106 also may include a communication manager and a communication interface.

As used herein, "communication interface" refers to an interface that enables communication (e.g., wireless communication, wired communication, or a combination thereof) between a first network entity and a second network entity. A communication interface may include electronic circuitry that enables a network entity to transmit, receive, or otherwise perform the communication. A communication interface may be, be similar to, include, or be included in one or more components that are configured to enable communication between the first network entity and the second network entity. For example, a communication interface may include a transmission component, a reception component, and/or a transceiver, among other examples. For example, a communication interface may include one or more transceivers, one or more receivers, and/or one or more transmitters configured to communicate with other devices, such as via a wired connection, a wireless connection, or a combination of wired and wireless connections. In some examples, a communication interface may include one or more RF components, an RF front end, one or more antennas, one or more transmit or receive processors, a demodulation component, and/or a modulation component, among other examples. Communication interfaces are described in more detail elsewhere herein, such as in connection with FIG. 2.

As described herein, a network entity (e.g., the network entity 102 and/or the network entity 106) may be configured to perform one or more operations. Reference to a network entity being configured to perform one or more operations may refer to a processing system of the network entity being configured to perform the one or more operations and/or the processing system being configured to cause one or more components of the network entity to perform the one or more operations. For example, reference to the processing system being configured to perform one or more operations may refer to one or more components (or subcomponents) of the processing system performing the one or more operations. For example, the one or more components of the processing system may include at least one memory, at least one processor, and/or at least one communication interface, among other examples, that are configured to perform one or more (or all) of the one or more operations, and/or any combination thereof. Where reference is made to the network entity and/or the processing system being configured to perform operations, the network entity and/or the processing system may be configured to cause one component to perform all operations, or to cause more than one component to collectively perform the operations. When the network entity and/or the processing system is configured to cause more than one component to collectively perform the operations, each operation need not be performed by each of those components (e.g., different operations may be performed by different components) and/or each operation need not be performed in whole by only one component (e.g., different components may perform different sub-functions of an operation).

As described in more detail elsewhere herein, the network entity 102 may (e.g., the processing system 110 may, or the processing system 110 may cause the communication manager 114 and/or the communication interface 116 to) encode first information using keying modulation; encode second information using FMCW modulation; and/or transmit a communication that includes a first layer indicating the first information and a second layer indicating the second information. Additionally, or alternatively, the network entity 102 and/or the communication manager 114 may perform one or more other operations described herein.

As described in more detail elsewhere herein, the network entity 106 may (e.g., the processing system 112 may, or the processing system 112 may cause the communication manager 114 and/or the communication interface 116 to) receive, from a second network entity, a communication that includes a first layer indicating first information and a second layer indicating second information; demodulate the first layer using keying modulation to obtain the first information; and/or demodulate the second layer using FMCW modulation to obtain the second information. Additionally, or alternatively, the network entity 106 and/or the communication manager 118 may perform one or more other operations described herein.

The number and arrangement of entities shown in FIG. 1 are provided as one or more examples. In practice, there may be additional network entities and/or networks, fewer network entities and/or networks, different network entities and/or networks, or differently arranged network entities and/or networks than those shown in FIG. 1. Furthermore, the network entity 102, 104, and 106 may be implemented using a single apparatus or multiple apparatuses.

Figure 2:
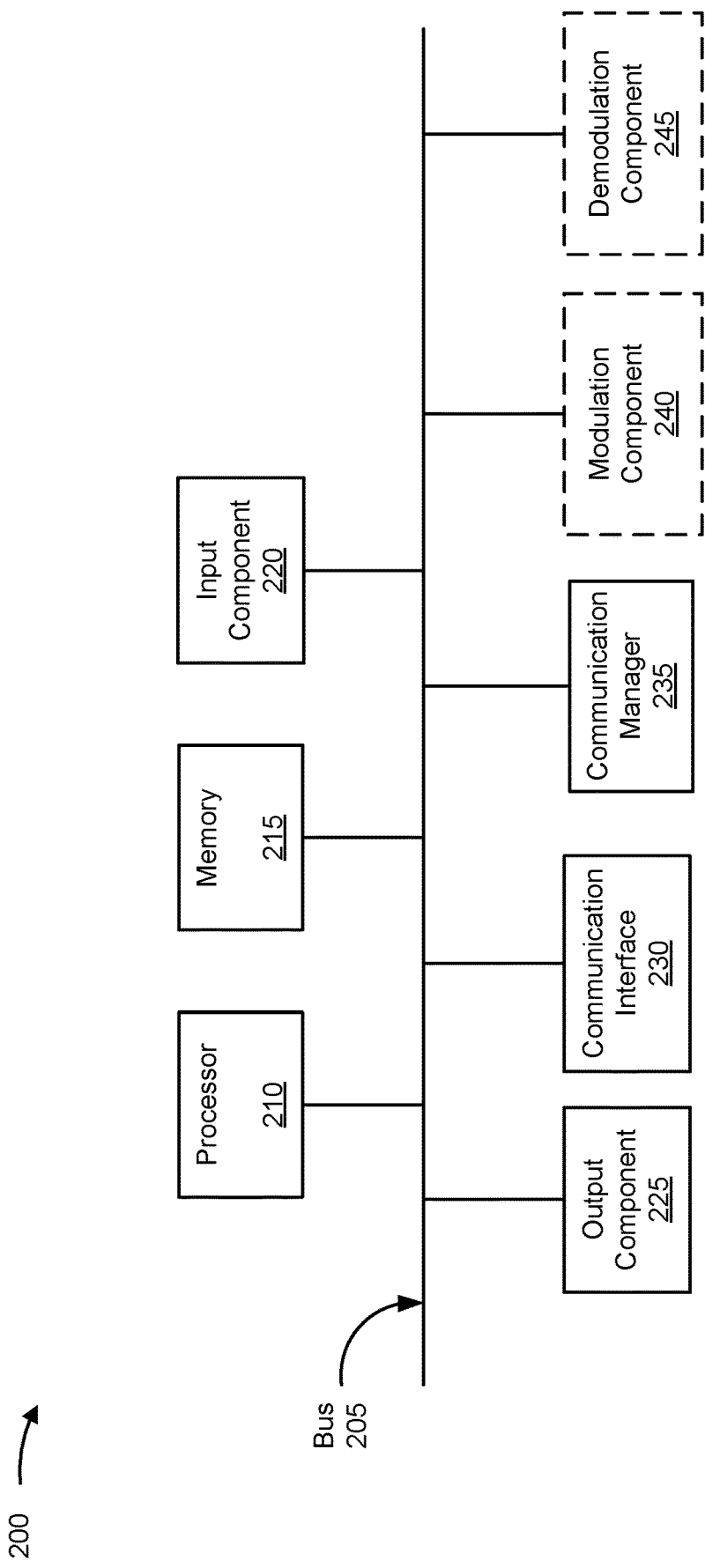
FIG. 2 is a diagram of example components of an apparatus, in accordance with the present disclosure.

FIG. 2 is a diagram of example components of an apparatus 200, in accordance with the present disclosure. The apparatus 200 may correspond to any one or more of the network entities 102, 104, and 106 or another network entity described herein. Additionally, or alternatively, any one or more of the network entities 102, 104, and 106 or another network entity described herein may include one or more apparatuses 200 and/or one or more components of the apparatus 200. For example, in some aspects, the apparatus 200 may include an apparatus (e.g., a device, a device component, a modem, a chip, and/or a set of device components, among other examples) that is configured to perform a wireless communication method, as described herein. In some aspects, the apparatus 200 may be a processing system (e.g., the processing system 110 and/or the processing system 112) of a network entity. As shown in FIG. 2, the apparatus 200 may include components such as a bus 205, a processor 210, a memory 215, an input component 220, an output component 225, a communication interface 230, a communication manager 235, a modulation component 240, and/or a demodulation component 245. Any one or more of the components 205, 210, 215, 220, 225 230, 235, 240, and/or 245 may be implemented in hardware, software, or a combination of hardware and software.

The bus 205 includes a component that permits communication among the components of the apparatus 200. The processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. In some aspects, the processor 210 includes one or more processors capable of being programmed to perform a function.

The memory 215 includes a random-access memory, a read only memory (ROM), and/or another type of dynamic or static storage device (e.g., a flash memory, a magnetic memory, and/or an optical memory) that stores information and/or instructions for use by the processor 210. The memory 215 may store other information and/or software related to the operation and use of the apparatus 200. For example, the memory 215 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium.

The input component 220 includes a component that permits the apparatus 200 to receive information, such as via user input. For example, the input component 220 may be associated with a user interface as described herein (e.g., to permit a user to interact with the one or more features of the apparatus 200). The input component 220 may include a capacitive touchscreen display that can receive user inputs. The input component 220 may include a keyboard, a keypad, a mouse, a button, a switch, and/or a microphone, among other examples. Additionally, or alternatively, the input component 220 may include a sensor for sensing information (e.g., a vision sensor, a location sensor, an accelerometer, a gyroscope, and/or an actuator, among other examples). In some aspects, the input component 220 may include a camera (e.g., a high-resolution camera and/or a low-resolution camera, among other examples). The output component 225 may include a component that provides output from the apparatus 200 (e.g., a display, a speaker, and/or one or more light-emitting diodes (LEDs), among other examples).

The communication interface 230 may include a transmission component and/or a reception component. For example, the communication interface 230 may include a transceiver and/or one or more separate receivers and/or transmitters that enable the apparatus 200 to communicate with other devices, such as via a wired connection, a wireless connection, or a combination of wired and wireless connections. In some aspects, the communication interface may include one or more radio frequency reflective elements and/or one or more radio frequency refractive elements. The communication interface 230 may permit the apparatus 200 to receive information from another apparatus and/or provide information to another apparatus. For example, the communication interface 230 may include an Ethernet interface, an optical interface, a coaxial interface, an infrared interface, an RF interface, a universal serial bus (USB) interface, a Wi-Fi interface, a cellular network interface, a wireless modem, an inter-integrated circuit (I2C), and/or a serial peripheral interface (SPI), among other examples.

The communication manager 235 may include hardware, software, or a combination of hardware and software configured to cause the apparatus 200 to perform one or more communication tasks associated with the communication manager 114 and/or the communication interface 116 or the communication interface 230. Similarly, the communication manager 235 may include hardware, software, or a combination of hardware and software configured to cause the apparatus 200 to perform one or more communication tasks associated with the communication manager 118 and/or the communication interface 120 or the communication interface 230. In some aspects, the communication manager 235 may be, be similar to, include, or be included in, the communication manager 114 and/or the communication manager 118 depicted in FIG. 1. In some aspects, the communication manager 235 may include the processor 210, the memory 215, the input component 220, the output component 225, the communication interface 230, the modulation component 240, the demodulation component 245, and/or one or more aspects thereof.

The modulation component 240 may include hardware, software, or a combination of hardware and software configured to cause the apparatus 200 to modulate and/or encode information. For example, as described in more detail elsewhere herein, the modulation component 240 may encode first information using keying modulation (e.g., OOK or FSK modulation) and may encode second information using FMCW modulation. The first information and the second information may be associated with different layers of the same communication. The demodulation component 245 may include hardware, software, or a combination of hardware and software configured to cause the apparatus 200 to demodulate, detect, and/or decode information. For example, as described in more detail elsewhere herein, the demodulation component 245 may detect, decode, and/or demodulate a first layer of a communication using keying modulation (e.g., OOK or FSK modulation) to obtain first information. The demodulation component 245 may detect, decode, and/or demodulate a second layer of the communication using FMCW modulation to obtain second information.

As indicated above, FIG. 2 is provided as an example. Other examples may differ from what is described with regard to FIG. 2.

As described above, in some aspects, the network 108 depicted in FIG. 1 may include a cellular network that includes a RAT. While some aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

Figure 3:
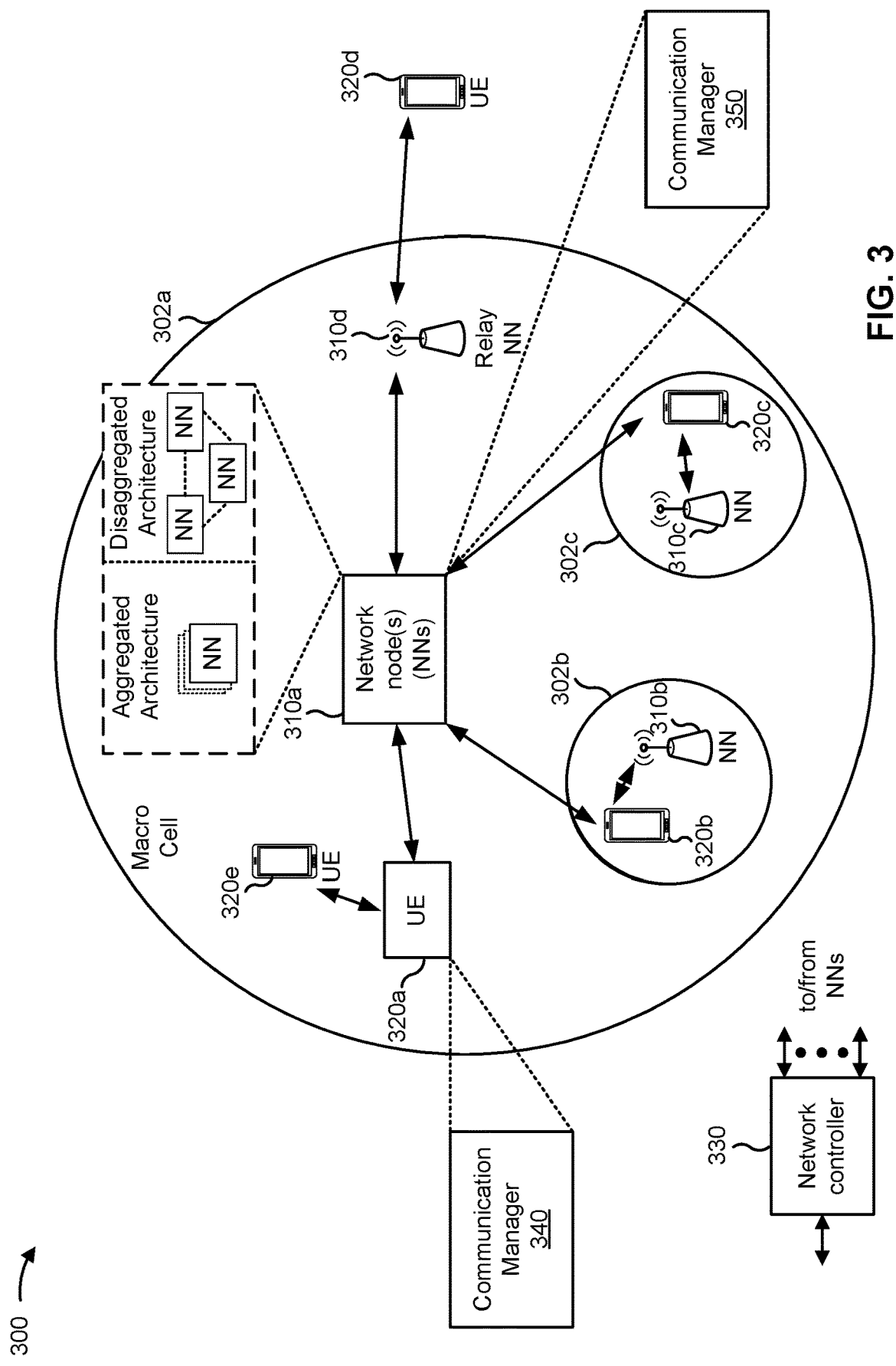
FIG. 3 is a diagram illustrating an example of a wireless network, in accordance with the present disclosure.

FIG. 3 is a diagram illustrating an example of a wireless network 300, in accordance with the present disclosure. The wireless network 300 may be or may include elements of a 4G (e.g., LTE) network, a 5G (e.g., NR) network, and/or, a 6G network, among other examples. The wireless network 300 may include one or more network nodes 310 (shown as a network node 310*a*, a network node 310*b*, a network node 310*c*, and a network node 310*d*), a UE 320 or multiple UEs 320 (shown as a UE 320*a*, a UE 320*b*, a UE 320*c*, a UE 320*d*, and a UE 320*e*), and/or other entities. A network node 310 is a network node that communicates with UEs 320. As shown, a network node 310 may include one or more network nodes. For example, a network node 310 may be an aggregated network node, meaning that the aggregated network node is configured to utilize a radio protocol stack that is physically or logically integrated within a single radio access network (RAN) node (e.g., within a single device or unit). As another example, a network node 310 may be a disaggregated network node (sometimes referred to as a disaggregated base station), meaning that the network node 310 is configured to utilize a protocol stack that is physically or logically distributed among two or more nodes (such as one or more CUs, one or more DUs, or one or more RUs).

In some examples, a network node 310 is or includes a network node that communicates with UEs 320 via a radio access link, such as an RU. In some examples, a network node 310 is or includes a network node that communicates with other network nodes 310 via a fronthaul link or a midhaul link, such as a DU. In some examples, a network node 310 is or includes a network node that communicates with other network nodes 310 via a midhaul link or a core network via a backhaul link, such as a CU. In some examples, a network node 310 (such as an aggregated network node 310 or a disaggregated network node 310) may include multiple network nodes, such as one or more RUs, one or more CUs, and/or one or more DUs. A network node 310 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 310 may be interconnected to one another or to one or more other network nodes 310 in the wireless network 300 through various types of fronthaul, midhaul, and/or backhaul interfaces, such as a direct physical connection, an air interface, or a virtual network, using any suitable transport network.

In some examples, a network node 310 may provide communication coverage for a particular geographic area. In the Third Generation Partnership Project (3GPP), the term "cell" can refer to a coverage area of a network node 310 and/or a network node subsystem serving this coverage area, depending on the context in which the term is used. A network node 310 may provide communication coverage for a macro cell, a pico cell, a femto cell, and/or another type of cell. A macro cell may cover a relatively large geographic area (e.g., several kilometers in radius) and may allow unrestricted access by UEs 320 with service subscriptions. A pico cell may cover a relatively small geographic area and may allow unrestricted access by UEs 320 with service subscriptions. A femto cell may cover a relatively small geographic area (e.g., a home) and may allow restricted access by UEs 320 having association with the femto cell (e.g., UEs 320 in a closed subscriber group (CSG)). A network node 310 for a macro cell may be referred to as a macro network node. A network node 310 for a pico cell may be referred to as a pico network node. A network node 310 for a femto cell may be referred to as a femto network node or an in-home network node. In the example shown in FIG. 3, the network node 310*a* may be a macro network node for a macro cell 302*a*, the network node 310*b* may be a pico network node for a pico cell 302*b*, and the network node 310*c* may be a femto network node for a femto cell 302*c*. A network node may support one or multiple (e.g., three) cells. In some examples, a cell may not necessarily be stationary, and the geographic area of the cell may move according to the location of a network node 310 that is mobile (e.g., a mobile network node).

In some aspects, the terms "base station" or "network entity" may refer to an aggregated base station, a disaggregated base station, an IAB node, a relay node, or one or more components thereof. For example, in some aspects, "base station" or "network entity" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the network node 310. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 300 may include one or more relay stations. A relay station is a network node that can receive a transmission of data from an upstream node (e.g., a network node 310 or a UE 320) and send a transmission of the data to a downstream node (e.g., a UE 320 or a network node 310). A relay station may be a UE 320 that can relay transmissions for other UEs 320. In the example shown in FIG. 3, the network node 310*d* (e.g., a relay network node) may communicate with the network node 310*a* (e.g., a macro network node) and the UE 320*d* in order to facilitate communication between the network node 310*a* and the UE 320*d*. A network node 310 that relays communications may be referred to as a relay station, a relay base station, a relay network node, a relay node, a relay, or the like.

The wireless network 300 may be a heterogeneous network that includes network nodes 310 of different types, such as macro network nodes, pico network nodes, femto network nodes, relay network nodes, or the like. These different types of network nodes 310 may have different transmit power levels, different coverage areas, and/or different impacts on interference in the wireless network 300. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 330 may couple to or communicate with a set of network nodes 310 and may provide coordination and control for these network nodes 310. The network controller 330 may communicate with the network nodes 310 via a backhaul communication link or a midhaul communication link. The network nodes 310 may communicate with one another directly or indirectly via a wireless or wireline backhaul communication link. In some aspects, the network controller 330 may be a CU or a core network device, or may include a CU or a core network device.

For example, in some aspects, the wireless network 300 may be, include, or be included in a wireless backhaul network, sometimes referred to as an IAB network. In an IAB network, at least one network entity (e.g., network node 310) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station (s) may communicate with one or more UEs (e.g., UE 320) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target network entity (e.g., a UE and/or a base station). In this way, inter-link interference may be reduced.

An IAB network may include an IAB donor that connects to a core network via a wired connection (e.g., a wireline backhaul). For example, an Ng interface of an IAB donor may terminate at a core network. Additionally, or alternatively, an IAB donor may connect to one or more devices of the core network that provide a core access and mobility management function (AMF). In some aspects, an IAB donor may include a network node 310, such as an anchor base station. An IAB donor may include a CU, which may perform access node controller (ANC) functions and/or AMF functions. The CU may configure a DU of the IAB donor and/or may configure one or more IAB nodes (e.g., a mobile termination (MT) function and/or a DU function of an IAB node) that connect to the core network via the IAB donor. Thus, a CU of an IAB donor may control and/or configure the entire IAB network (or a portion thereof) that connects to the core network via the IAB donor, such as by using control messages and/or configuration messages (e.g., a radio resource control (RRC) configuration message or an F1 application protocol (F1AP) message).

The MT functions of an IAB node (e.g., a child node) may be controlled and/or scheduled by another IAB node (e.g., a parent node of the child node) and/or by an IAB donor. The DU functions of an IAB node (e.g., a parent node) may control and/or schedule other IAB nodes (e.g., child nodes of the parent node) and/or UEs 320. Thus, a DU may be referred to as a scheduling node or a scheduling component, and an MT may be referred to as a scheduled node or a scheduled component. In some aspects, an IAB donor may include DU functions and not MT functions. That is, an IAB donor may configure, control, and/or schedule communications of IAB nodes and/or UEs 320. A UE 320 may include only MT functions, and not DU functions. That is, communications of a UE 320 may be controlled and/or scheduled by an IAB donor and/or an IAB node (e.g., a parent node of the UE 320).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor or an IAB node, and a child node may be an IAB node or a UE 320. Communications of an MT function of a child node may be controlled and/or scheduled by a parent node of the child node.

A link between a UE 320 and an IAB donor, or between a UE 320 and an IAB node, may be referred to as an access link. An access link may be a wireless access link that provides a UE 320 with radio access to a core network via an IAB donor, and optionally via one or more IAB nodes. Thus, the wireless network 300 may be referred to as a multi-hop network or a wireless multi-hop network.

A link between an IAB donor and an IAB node or between two IAB nodes may be referred to as a backhaul link. A backhaul link may be a wireless backhaul link that provides an IAB node with radio access to a core network via an IAB donor, and optionally via one or more other IAB nodes. In an IAB network, network resources for wireless communications (e.g., time resources, frequency resources, and/or spatial resources) may be shared between access links and backhaul links. In some aspects, a backhaul link may be a primary backhaul link or a secondary backhaul link (e.g., a backup backhaul link). In some aspects, a secondary backhaul link may be used if a primary backhaul link fails, becomes congested, and/or becomes overloaded, among other examples.

The UEs 320 may be dispersed throughout the wireless network 300, and each UE 320 may be stationary or mobile. A UE 320 may include, for example, an access terminal, a terminal, a mobile station, and/or a subscriber unit. A UE 320 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 320 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 320 may be considered Internet-of-Things (IoT) devices, and/or may be implemented as NB-IoT (narrowband IoT) devices. Some UEs 320 may be considered a Customer Premises Equipment. A UE 320 may be included inside a housing that houses components of the UE 320, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

Some network nodes may have a reduced feature set compared to other network nodes. A network node with a reduced feature set may be referred to as a reduced capability (RedCap) node, a low-tier node, an NR-Lite node, an IoT node, an ambient IoT node, a passive node, a terminal (e.g., a radio frequency identification (RFID) device, a tag, or a similar device), and/or an energy-harvesting-capable node, among other examples. For example, a node with a reduced feature set may support a lower maximum modulation and coding scheme (MCS) than other nodes (e.g., quadrature phase shift keying (QPSK) or the like as compared to 256-quadrature amplitude modulation (QAM) or the like), may support a lower maximum transmit power, may have a less advanced beamforming capability (e.g., may not be capable of forming as many beams as other nodes), may require a longer processing time, may include less hardware (e.g., fewer antennas, fewer RF components, fewer transmit antennas, and/or fewer receive antennas), and/or may not be capable of communicating on as wide of a maximum bandwidth, among other examples.

In general, any number of wireless networks 300 may be deployed in a given geographic area. Each wireless network 300 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 320 may communicate directly using one or more sidelink channels (e.g., without using a network node 310 as an intermediary to communicate with one another). For example, the UE 320*a* may communicate with a UE 320*e* via one or more sidelink channels. For example, the UEs 320 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 320 may perform scheduling operations, resource selection operations, and/or other operations described elsewhere herein as being performed by the network node 310.

Devices of the wireless network 300 may communicate using the electromagnetic spectrum, which may be subdivided by frequency or wavelength into various classes, bands, channels, or the like. For example, devices of the wireless network 300 may communicate using one or more operating bands. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 may be referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, the term "sub-6 GHz" or the like, if used herein, may broadly represent frequencies that may be less than 6 GHz, may be within FR1, or may include mid-band frequencies. Further, unless specifically stated otherwise, the term "millimeter wave" or the like, if used herein, may broadly represent frequencies that may include mid-band frequencies, may be within FR2, FR4, FR4-a or FR4-1, and/or FR5, or may be within the EHF band. The frequencies included in these operating bands (e.g., FR1, FR2, FR3, FR4, FR4-a, FR4-1, and/or FR5) may be modified, and techniques described herein are applicable to those modified frequency ranges.

As described above, in some aspects, a network entity (e.g., the network entity 102, 104, and/or 106 depicted in FIG. 1) may be implemented in a wireless communication environment. For example, in some aspects, the network node may be implemented as a UE, a base station, relay device, and/or TRP, among other examples. In some such aspects, as shown in FIG. 3, the UE 320a may include a communication manager 340 and/or a transceiver and the network node 310a may include a communication manager 350 and/or a transceiver. In some aspects, the communication manager 340 and/or 350 may be, be similar to, include, or be included in, the communication manager 114 and/or the communication manager 118 depicted in FIG. 1 and/or the communication manager 235 depicted in FIG. 2. In some aspects, the transceiver(s) may be, be similar to, include, or be included in, the communication interface 116 and/or the communication interface 120 depicted in FIG. 1. In some aspects, the transceiver(s) may include, or be included in, the communication interface 230 depicted in FIG. 2. In some aspects, the UE 320a may include a processing system (e.g., similar to the processing system 110 and/or the processing system 112). In some aspects, the network node 310 may include a processing system (e.g., similar to the processing system 110 and/or the processing system 112).

In some aspects, the UE 320 may include a communication manager 340. As described in more detail elsewhere herein, the communication manager 340 may receive, from a second network entity, a communication that includes a first layer indicating first information and a second layer indicating second information; demodulate the first layer using keying modulation to obtain the first information; and/or demodulate the second layer using FMCW modulation to obtain the second information. Additionally, or alternatively, the communication manager 340 may perform one or more other operations described herein.

In some aspects, the network node 310 may include a communication manager 350. As described in more detail elsewhere herein, the communication manager 350 may encode first information using keying modulation; encode second information using FMCW modulation; and/or transmit a communication that includes a first layer indicating the first information and a second layer indicating the second information. Additionally, or alternatively, the communication manager 350 may perform one or more other operations described herein.

As indicated above, FIG. 3 is provided as an example. Other examples may differ from what is described with regard to FIG. 3.

Figure 4:
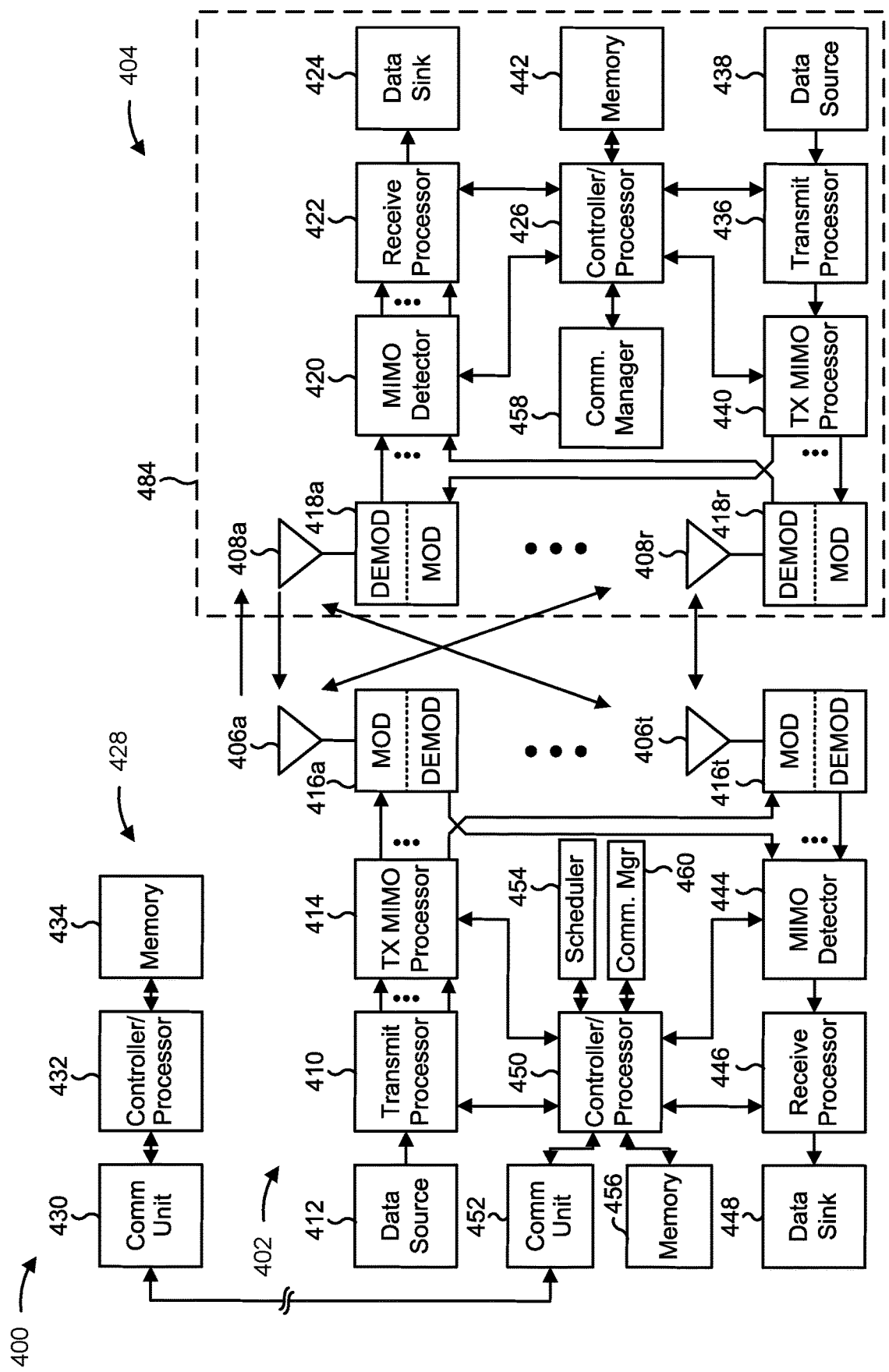
FIG. 4 is a diagram illustrating an environment including a first network entity in wireless communication with a second network entity, in accordance with the present disclosure.

FIG. 4 is a diagram illustrating an environment 400 including a network entity 402 in wireless communication with a network entity 404 (e.g., via a network such as the network 108 depicted in FIG. 1 and/or the wireless network 300 depicted in FIG. 3), in accordance with the present disclosure. The network entity 402 may be equipped with a set of antennas 406a through 406t, such as T antennas (T≥1). The network entity 404 may be equipped with a set of antennas 408a through 408r, such as R antennas (R≥1).

At the network entity 402, a transmit processor 410 may receive data, from a data source 412, intended, or otherwise destined, for the network entity 404 (or a set of network entities 404). The transmit processor 410 may select one or more MCSs for the network entity 404 based on one or more channel quality indicators (CQIs) received from that network entity 404. The network entity 402 may process (e.g., encode and modulate) the data for the network entity 404 based on the MCS(s) selected for the network entity 404 and may provide data symbols for the network entity 404. The transmit processor 410 may process system information (e.g., for semi-static resource partitioning information (SRPI)) and control information (e.g., CQI requests, grants, and/or upper layer signaling) and provide overhead symbols and control symbols. The transmit processor 410 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 414 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 416a through 416t (e.g., T modems). For example, each output symbol stream may be provided to a modulator component (shown as MOD) of a modem of the set of modems 416a through 416t. Each modem of the set of modems 416a through 416t may use a respective modulator component to process a respective output symbol stream (e.g., for OFDM) to obtain an output sample stream. Each modem of the set of modems 416a through 416t may further use a respective modulator component to process (e.g., convert to analog, amplify, filter, and/or upconvert) the output sample stream to obtain a signal. One or more modems of the set of modems 416a through 416t may transmit a set of signals (e.g., T signals) via a corresponding antenna of the set of antennas 406a through 406t. The signal may include, for example, a downlink signal.

At the network entity 404, one or more antennas of the set of antennas 408a through 408r may receive the signals from the network entity 402 and/or network nodes and may provide a set of received signals (e.g., R received signals) to one or more modems of a set of modems 418a through 418r (e.g., R modems). For example, each received signal may be provided to a demodulator component (shown as DEMOD) of a respective modem of the set of modems 418a through 418r. Each modem of the set of modems 418a through 418r may use a respective demodulator component to condition (e.g., filter, amplify, downconvert, and/or digitize) a received signal to obtain input samples. Each modem of the set of modems 418a through 418r may use a demodulator component to further process the input samples (e.g., for OFDM) to obtain received symbols. A MIMO detector 420 may obtain received symbols from one or more modems of the set of modems 418a through 418r, may perform MIMO detection on the received symbols if applicable, and may provide detected symbols.

A receive processor 422 may process (e.g., demodulate and decode) the detected symbols, may provide decoded data for the network entity 404 to a data sink 424, and may provide decoded control information and system information to a controller/processor 426. The term "controller/processor" may refer to one or more controllers, one or more processors, or a combination thereof. The controller/processor 426 may be, be similar to, include, or be included in, the processor 210 depicted in FIG. 2. The controller/processor 426 may determine a reference signal received power (RSRP) parameter, a received signal strength indicator (RSSI) parameter, a reference signal received quality (RSRQ) parameter, and/or a CQI parameter, among other examples.

A network controller 428 may include a communication unit 430, a controller/processor 432, and a memory 434. The network controller 428 may be, be similar to, include, or be included in, the network controller 330 depicted in FIG. 3. The network controller 428 may include, for example, one or more devices in a core network. The network controller 428 may communicate with the network entity 402 via the communication unit 430.

One or more antennas (e.g., antennas 406a through 406t and/or antennas 408a through 408r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings, such as a housing 484), a set of coplanar antenna elements, a set of non-coplanar antenna elements, and/or one or more antenna elements coupled to one or more transmission and/or reception components, such as one or more components of FIG. 4.

Similarly, at the network entity 404, a transmit processor 436 may receive and process data from a data source 438 and control information (e.g., for reports that include RSRP, RSSI, RSRQ, and/or CQI) from the controller/processor 426. The transmit processor 436 may generate reference symbols for one or more reference signals. The symbols from the transmit processor 436 may be precoded by a TX MIMO processor 440 if applicable, and further processed by one or more of the set of modems 418a through 418r (e.g., for discrete Fourier transform (DFT) spread OFDM (DFT-s-OFDM) or CP-OFDM), and transmitted to the network entity 402. In some examples, each modem of the set of modems 418a through 418r of the network entity 404 may include a modulator and a demodulator. The network entity 404 may include a communication manager 458. The communication manager 458 may be, or may be similar to, the communication manager 114, the communication manager 118, the communication manager 235, the communication manager 340, and/or the communication manager 350. In some examples, the network entity 404 includes a transceiver. The transceiver may include any combination of the antenna(s) 408a through 408r, the modem(s) 418a through 418r, the MIMO detector 420, the receive processor 422, the transmit processor 436, and/or the TX MIMO processor 440. The transceiver may be, be similar to, include, or be included in, the communication interface 116 and/or the communication interface 120 depicted in FIG. 1 and/or the communication interface 230 depicted in FIG. 2. The transceiver may be used by a processor (e.g., the controller/processor 426) and/or a memory 442 to perform aspects of any of the methods described herein (e.g., with reference to FIGS. 7-18).

At the network entity 402, the signals from network entity 404 and/or other network nodes may be received by one or more antennas of the set of antennas 406a through 406t, processed by one or more modems of the set of modems 416a through 416t (e.g., a demodulator component, shown as DEMOD), detected by a MIMO detector 444 if applicable, and further processed by a receive processor 446 to obtain decoded data and control information sent by the network entity 404. The receive processor 446 may provide the decoded data to a data sink 448 and provide the decoded control information to a controller/processor 450. The network entity 402 may include a communication unit 452 and may communicate with the network controller 428 via the communication unit 452. The network entity 402 may include a communication manager 460. The communication manager 460 may be, or may be similar to, the communication manager 114, the communication manager 118, the communication manager 235, the communication manager 340, and/or the communication manager 350. The network entity 402 may include a scheduler 454 to schedule one or more network entities 404 for downlink and/or uplink communications. In some examples, one or more modems of the set of modem 416a through 416t of the network entity 402 may include a modulator and a demodulator. In some examples, the network entity 402 includes a transceiver. The transceiver may include any combination of the antenna(s) 406a through 406t, the modem(s) 416a through 416t, the MIMO detector 444, the receive processor 446, the transmit processor 410, and/or the TX MIMO processor 414. The transceiver may be, be similar to, include, or be included in, the communication interface 116 and/or the communication interface 120 depicted in FIG. 1 and/or the communication interface 230 depicted in FIG. 2. The transceiver may be used by a processor (e.g., the controller/processor 450) and a memory 456 to perform aspects of any of the methods described herein (e.g., with reference to FIGS. 7-18).

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The controller/processor 450 of the network entity 402, the controller/processor 426 of the network entity 404, and/or any other component(s) of FIG. 4 may perform one or more techniques associated with a layered modulation communication, as described in more detail elsewhere herein. For example, the controller/processor 450 of the network entity 402, the controller/processor 426 of the network entity 404, and/or any other component(s) of FIG. 4 may perform or direct operations of, for example, process 1500 of FIG. 15, process 1600 of FIG. 16, and/or other processes as described herein. The memory 442 and the memory 456 may store data and program codes for the network entity 402 and the network entity 404, respectively. In some examples, the memory 442 and/or the memory 456 may include a non-transitory computer-readable medium storing one or more instructions (e.g., code and/or program code) for wireless communication. For example, the one or more instructions, when executed (e.g., directly, or after compiling, converting, and/or interpreting) by one or more respective processors of the network entity 402 and/or the network entity 404, may cause the one or more processors, the network entity 404, and/or the network entity 402 to perform or direct operations of, for example, process 1500 of FIG. 15, process 1600 of FIG. 16, and/or other processes as described herein. In some examples, executing instructions may include running the instructions, converting the instructions, compiling the instructions, and/or interpreting the instructions, among other examples.

In some aspects, a first network entity (e.g., the network entity 402 or the network entity 404) includes means for receiving, from a second network entity, a communication that includes a first layer indicating first information and a second layer indicating second information; means for demodulating the first layer using keying modulation to obtain the first information; and/or means for demodulating the second layer using FMCW modulation to obtain the second information. In some aspects, the means for the first network entity to perform operations described herein may include, for example, one or more of a processing system (e.g., the processing system 110 or the processing system 112), the apparatus 200, one or more components of the apparatus 200, communication manager 458, antenna 408, modem 418, MIMO detector 420, receive processor 422, transmit processor 436, TX MIMO processor 440, controller/processor 426, memory 442, the communication interface 116, the communication interface 120, and/or the communication interface 230, among other examples.

In some aspects, a first network entity (e.g., the network entity 402 or the network entity 404) includes means for encoding first information using keying modulation; means for encoding second information using FMCW modulation; and/or means for transmitting a communication that includes a first layer indicating the first information and a second layer indicating the second information. In some aspects, the means for the first network entity to perform operations described herein may include, for example, one or more of a processing system (e.g., the processing system 110 or the processing system 112), the apparatus 200, one or more components of the apparatus 200, communication manager 460, transmit processor 410, TX MIMO processor 414, modem 416, antenna 406, MIMO detector 444, receive processor 446, controller/processor 450, memory 456, scheduler 454, the communication interface 116, the communication interface 120, and/or the communication interface 230, among other examples.

While blocks in FIG. 4 are illustrated as distinct components, the functions described above with respect to the blocks may be implemented in a single hardware, software, or combination component or in various combinations of components. For example, the functions described with respect to the transmit processor 436, the receive processor 422, and/or the TX MIMO processor 440 may be performed by or under the control of the controller/processor 426. Any number of other combination of various combinations of components depicted in FIG. 4 may be considered to be within the ambit of the present disclosure.

As indicated above. FIG. 4 is provided as an example. Other examples may differ from what is described with regard to FIG. 4.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network entities. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

As used herein, a first network entity "outputting" or "transmitting" a communication to a second network entity may refer to a direct transmission (for example, from the first network entity to the second network entity) or an indirect transmission via one or more other network entities or devices. For example, if the first network entity is a DU, an indirect transmission to the second network entity may include the DU outputting or transmitting a communication to an RU and the RU transmitting the communication to the second network entity, or may include causing the RU to transmit the communication (e.g., triggering transmission of a physical layer reference signal). Similarly, the second network entity "transmitting" a communication to the first network entity may refer to a direct transmission (e.g., from the second network entity to the first network entity) or an indirect transmission via one or more other network entities or devices. For example, if the first network entity is a DU, an indirect transmission to the first network entity may include the second network entity transmitting a communication to an RU and the RU transmitting the communication to the DU. Similarly, the first network entity "obtaining" a communication may refer to receiving a transmission carrying the communication directly (for example, from the second network entity to the first network entity) or receiving the communication (or information derived from reception of the communication) via one or more other network entities or devices.

Figure 5:
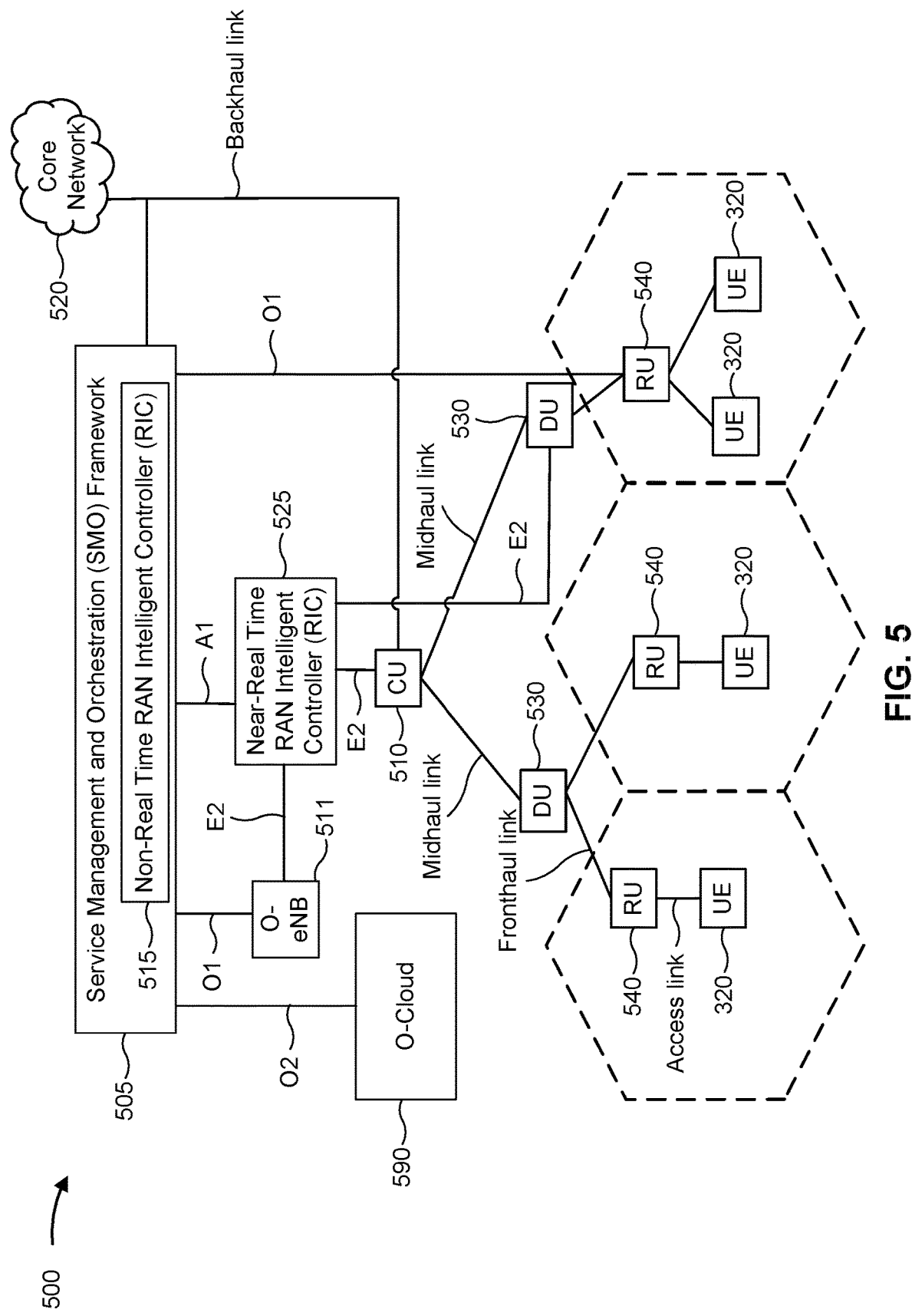
FIG. 5 is a diagram illustrating an example disaggregated base station architecture, in accordance with the present disclosure.

FIG. 5 is a diagram illustrating an example disaggregated base station architecture 500, in accordance with the present disclosure. The disaggregated base station architecture 500 may include a CU 510 that can communicate directly with a core network 520 via a backhaul link, or indirectly with the core network 520 through one or more disaggregated control units (such as a Near-RT RIC 525 via an E2 link, or a Non-RT RIC 515 associated with a Service Management and Orchestration (SMO) Framework 505, or both). A CU 510 may communicate with one or more DUs 530 via respective midhaul links, such as through F1 interfaces. Each of the DUs 530 may communicate with one or more RUs 540 via respective fronthaul links. Each of the RUs 540 may communicate with one or more UEs 320 via respective RF access links. In some implementations, a UE 320 may be simultaneously served by multiple RUs 540.

Each of the units, including the CUs 510, the DUs 530, the RUs 540, as well as the Near-RT RICs 525, the Non-RT RICs 515, and the SMO Framework 505, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 510 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 510. The CU 510 may be configured to handle user plane functionality (for example, Central Unit-User Plane (CU-UP) functionality), control plane functionality (for example, Central Unit-Control Plane (CU-CP) functionality), or a combination thereof. In some implementations, the CU 510 can be logically split into one or more CU-UP units and one or more CU-CP units. A CU-UP unit can communicate bidirectionally with a CU-CP unit via an interface, such as the E1 interface when implemented in an O-RAN configuration. The CU 510 can be implemented to communicate with a DU 530, as necessary, for network control and signaling.

Each DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 530 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 530, or with the control functions hosted by the CU 510.

Each RU 540 may implement lower-layer functionality. In some deployments, an RU 540, controlled by a DU 530, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 540 can be operated to handle over the air (OTA) communication with one or more UEs 320. In some implementations, real-time and non-real-time aspects of control and user plane communication with the RU(s) 540 can be controlled by the corresponding DU 530. In some scenarios, this configuration can enable each DU 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements, which may be managed via an operations and maintenance interface (such as an O1 interface). For virtualized network elements, the SMO Framework 505 may be configured to interact with a cloud computing platform (such as an open cloud (O-Cloud) platform 590) to perform network element life cycle management (such as to instantiate virtualized network elements) via a cloud computing platform interface (such as an O2 interface). Such virtualized network elements can include, but are not limited to, CUs 510, DUs 530, RUs 540, non-RT RICs 515, and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with each of one or more RUs 540 via a respective O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via an O1 interface) or via creation of RAN management policies (such as A1 interface policies).

As indicated above, FIG. 5 is provided as an example. Other examples may differ from what is described with regard to FIG. 5.

Figure 6:
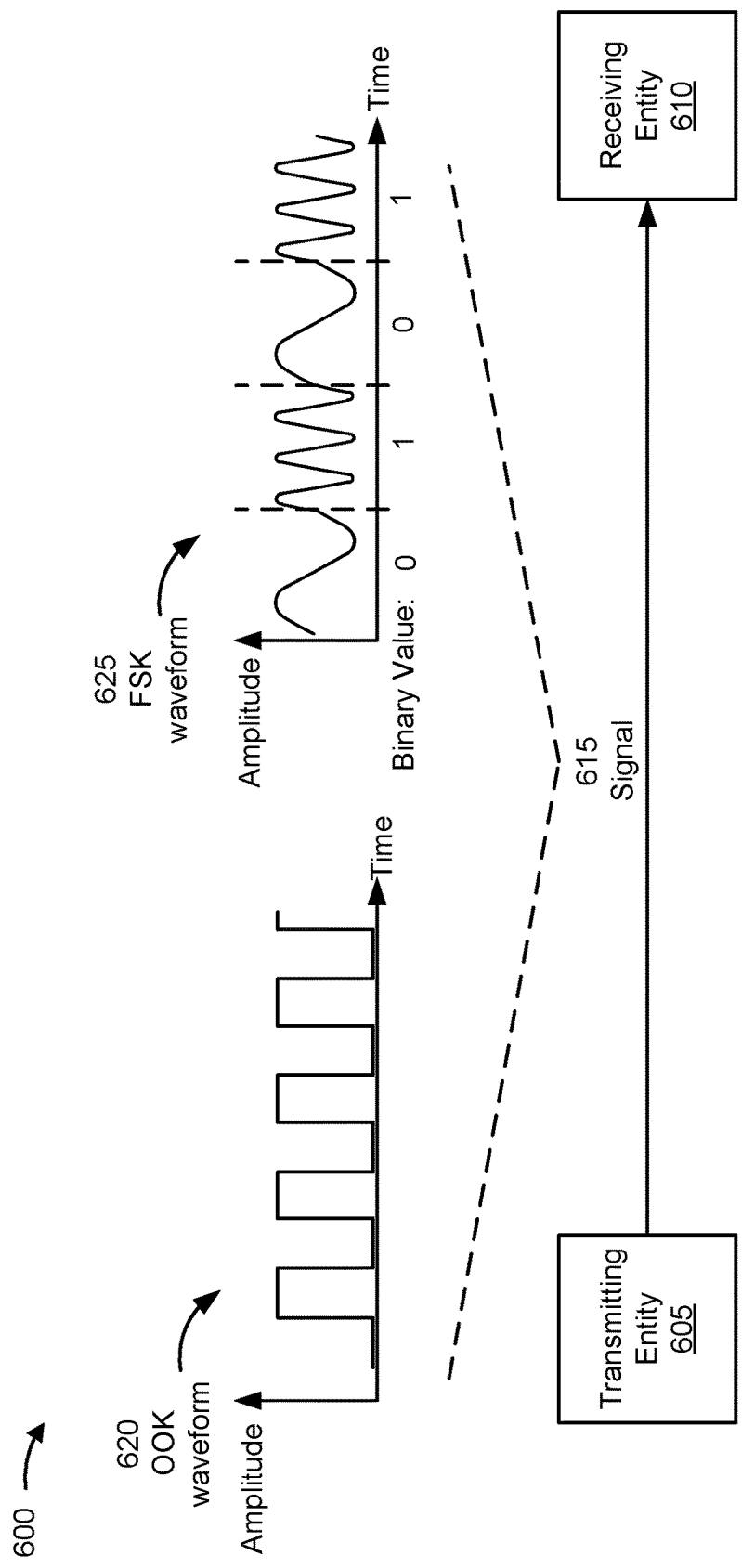
FIG. 6 is a diagram of an example associated with low power signals, in accordance with the present disclosure.

FIG. 6 is a diagram of an example 600 associated with low power signals, in accordance with the present disclosure. As shown in FIG. 6, a transmitting entity 605 and a receiving entity 610 may communicate with each other. The transmitting entity 605 may be a network entity (e.g., the network entity 102, the network entity 106, the network entity 402, or the network entity 404), a network node (e.g., a network node 310), a UE (e.g., a UE 320), a base station, a CU, a DU, and/an RU, among other examples. The receiving entity 610 may be a network entity (e.g., the network entity 102, the network entity 106, the network entity 402, or the network entity 404), a network node (e.g., a network node 310), a UE (e.g., a UE 320), a base station, a CU, a DU, and/an RU, among other examples. As used herein, a "low power" signal may refer to a signal that can be detected, decoded, demodulated, and/or otherwise received using a relatively low power level of a receiving entity. In other words, "low power" in reference to a signal may not refer to a transmit power of the signal. As used herein, "transmitting" entity may refer to an entity that is transmitting a signal in the context of the example being described (e.g., a transmitting entity may be capable of transmitting and receiving signals as described herein). Similarly, "receiving" entity refer to an entity that is receiving a signal in the context of the example being described (e.g., a receiving entity may be capable of transmitting and receiving signals as described herein).

In some examples, the receiving entity 610 may be associated with a reduced feature set, as described in more detail elsewhere herein. For example, the receiving entity 610 may be a RedCap entity, a low-tier entity, an NR-Lite entity, an IoT entity, an ambient IoT entity, a passive entity, a terminal (e.g., an RFID device, a tag, or a similar device), and/or an energy-harvesting-capable entity, among other examples. For example, the receiving entity 610 may not support OFDM signals (e.g., may be unable to detect OFDM signals), may have a low timing tracking and/or frequency tracking capability (e.g., may not support accurate timing/frequency tracking), and/or may support relatively low sampling rates (e.g., a sampling rate of the receiving entity 610 may less than the system bandwidth), among other examples. Therefore, the transmitting entity 605 and the receiving entity 610 may communicate via signals that can be detected, demodulated, and/or otherwise received by the receiving entity 610 (e.g., enabling the receiving entity 610 to receive the signals using less power or low energy consumption).

For example, as shown in FIG. 6, the transmitting entity 605 may transmit, and the receiving entity 610 may receive, a signal 615. The signal 615 may be a low power signal. In some examples, the signal may be associated with keying modulation. Keying modulation may include on-off keying (OOK) modulation, and/or frequency-shift keying (FSK) modulation, among other examples. OOK modulation may also be referred to as amplitude-shift keying (ASK) modulation. An OOK modulation scheme may indicate a binary "1" or a binary "0" via an amplitude of a signal. For example, the presence of a carrier for a specific duration may represent a binary "1", while an absence of the carrier for the same duration may represents a binary "0." FSK modulation is a modulation scheme in which information is encoded on a carrier signal by periodically shifting the frequency of the carrier via multiple discrete frequencies. As an example, FSK modulation may include a binary FSK (BFSK) in which a frequency of the signal is shifted between two discrete frequencies to transmit binary (e.g., ones and zeros) information (e.g., where a first frequency indicates a binary "1" and a second frequency indicates a binary "0").

For example, the transmitting entity 605 may modulate and/or encode the signal 615 using keying modulation (e.g., OOK modulation or FSK modulation). For example, the signal 615 may include an OOK waveform as shown by reference number 620 (e.g., a signal modulating using OOK modulation) or an FSK waveform as shown by reference number 625 (e.g., a signal modulating using FSK modulation). The signal 615 may be an OFDM-compatible signal. For example, the signal 615 may be an OFDM-based OOK signal and/or an OFDM-based FSK signal. For example, the transmitting entity 605 may generate an input signal (e.g., an input signal associated with OOK modulation or FSK modulation) of length M. The transmitting entity 605 may pass the input signal through a DFT-s-OFDM waveform generator (e.g., including an M-point DFT and an N-point iFFT, where N>M) to generate the OFDM-based signal (e.g., the signal 615). The "on" duration (e.g., indicating a binary value of "1") and/or an "off" duration (e.g., indicating a binary value of "0") may be MlK samples, where $K=2^b$ and b=0, 1, 2, and/or another value. A value of M may be an integer multiple of K.

As an example, the signal 615 may be a wakeup signal (WUS), a synchronization signal (SS), a reference signal (RS), or another signal. The signal 615 may be associated with low power consumption and/or low energy consumption by the receiving entity 610 (e.g., associated with receiving the signal 615). For example, the signal 615 may be a low-power (LP) WUS (LP-WUS), an LP-SS, and/or an LP-RS, among other examples. For example, the receiving entity 610 may include a LP radio (e.g., a radio receiver circuit designed to have low energy consumption). The LP radio may also be referred to as an LP receiver, and/or a LP wakeup radio (LP-WUR), among other examples. The receiving entity 610 (e.g., via the LP radio), may monitor for signals (e.g., for the signal 615). In some examples, the receiving entity 610 may include a main radio (e.g., associated with a relatively higher energy consumption than the LP radio). For example, the LP radio may be a companion radio (e.g., a companion receiver) that is configured to monitor for signals, with very low power, while a main radio is in a deep sleep state. The LP radio may wake up the main radio when actual data communication is indicated (e.g., via the signal 615). The LP radio may consume low power by design, and may be powered separately with less power needed, as compared to the main radio.

When there is no data to receive, the main radio may be off or in deep sleep, unless there is data to transmit, and the LP radio may actively monitor for a signal 615. This conserves power and/or energy of the receiving entity 610 by enabling the receiving entity 610 to keep the main radio (e.g., a main receiver) off or in a deep sleep state. If the receiving entity 610 receives a signal 615 (e.g., an LP-WUS) via the LP radio, then the receiving entity 610 may cause the main radio to be turned on (e.g., to enable the receiving entity 610 to receive data when the transmitting entity 605 has data to transmit to the receiving entity 610). For example, the signal 615 (e.g., LP-WUS or another signal) may be used to reduce unnecessary paging receptions. The signal 615 may be transmitted only when there is paging for idle or inactive mode entities (e.g., UEs). When the LP-WUS is detected by the receiving entity 610, the receiving entity 610 may turn on a main radio. The main radio may monitor for a synchronization signal block (SSB) before a paging occasion (PO) for synchronization, and then may receive a paging message accordingly. When the signal 615 is not detected, the main radio may stay powered off or in a deep sleep state for power saving.

For example, the receiving entity 610 (e.g., the LP radio of the receiving entity 610) may be associated with a keying modulation design. For example, the receiving entity 610 (e.g., the LP radio of the receiving entity 610) may be associated with an OOK based design and/or an FSK based design. The receiving entity 610 (e.g., the LP radio of the receiving entity 610) may use an envelope detector (e.g., low intermediate frequency (IF)). The OOK based design and/or an FSK based design may provide greater power saving, as compared to an OFDM-based design. In other words, the receiving entity 610 (e.g., the LP radio of the receiving entity 610) may be configured to receive OOK waveforms (e.g., OFDM-compatible OOK waveforms) and/or FSK waveforms (e.g., OFDM-compatible FSK waveforms) for improved power saving and/or reduced energy consumption associated with one or more reception operations.

In some examples, the signal 615 may be a single-carrier signal (e.g., the signal 615 may occupy a single carrier and/or a single subcarrier in the frequency domain). In such examples, the receiving entity 610 may detect the signal 615 with small sampling rates (e.g., a sampling rate of approximately 30 kilohertz at a 30 kilohertz subcarrier spacing). However, a single-carrier signal may be sensitive to frequency selectivity (e.g., a measure of the performance of the receiving entity 610 to respond only to the signal the receiving entity 610 is tuned to and reject other signals nearby in frequency). In other examples, the signal 615 may be a multi-carrier signal (e.g., the signal 615 may occupy multiple carriers and/or multiple subcarriers in the frequency domain). A multi-carrier signal may be robust against fading, but may be associated with a high sampling rate (e.g., the sampling rate may be proportional to the total bandwidth spanned by the multi-carrier signal), thereby increasing energy consumption of the receiving entity 610. Additionally, the multi-carrier signal (e.g., using an OOK waveform or an FSK waveform) may be associated with a modulation of 1 bit (e.g., a single bit) over multiple subcarriers, resulting in reduced spectral efficiency.

For example, the signal 615 (e.g., using an OOK waveform or an FSK waveform) may be associated with indicating a single bit in a given OFDM symbol. For example, the signal 615 may indicate a single bit per OFDM symbol. This may result in a low data rate for the signal 615. For example, the data rate may be 28,000 bits per second (bit/sec) for a 30 kilohertz subcarrier spacing (e.g., in NR). This data rate may be significantly less than expected for an actual bandwidth occupied by the signal 615. However, increasing the quantity of bits indicated in a given OFDM symbol by the signal 615 (e.g., for OFDM-compatible OOK waveforms or OFDM-compatible FSK waveforms) may result in frequency selectivity errors and/or in-band interference. Therefore, the signal 615 may be associated with a low data rate (e.g., in examples where a single bit is indicated in a given OFDM symbol) or degraded performance (e.g., caused by frequency selectivity errors and/or in-band interference) with an increased quantity of bits indicated in a given OFDM symbol by the signal 615.

Some aspects described herein enable a low power layered modulation signal. For example, the signal may include multiple layers. A layer may refer to an independent data streams. The multiple layers (e.g., multiple independent data streams) may be transmitted simultaneously (e.g., in a given signal) using different modulation schemes (e.g., via a hierarchical modulation scheme). For example, a first layer may be associated with keying modulation (e.g., OOK modulation or FSK modulation) and a second layer may be associated with FMCW modulation. Using keying modulation (e.g., OOK modulation or FSK modulation) in combination with FMCW modulation for respective layers of the signal may enable the receiving entity 610 to receive the signal using low power consumption while also increasing the data rate associated with the signal, as described in more detail elsewhere herein.

As indicated above, FIG. 6 is provided as an example. Other examples may differ from what is described with regard to FIG. 6.

Figure 7:
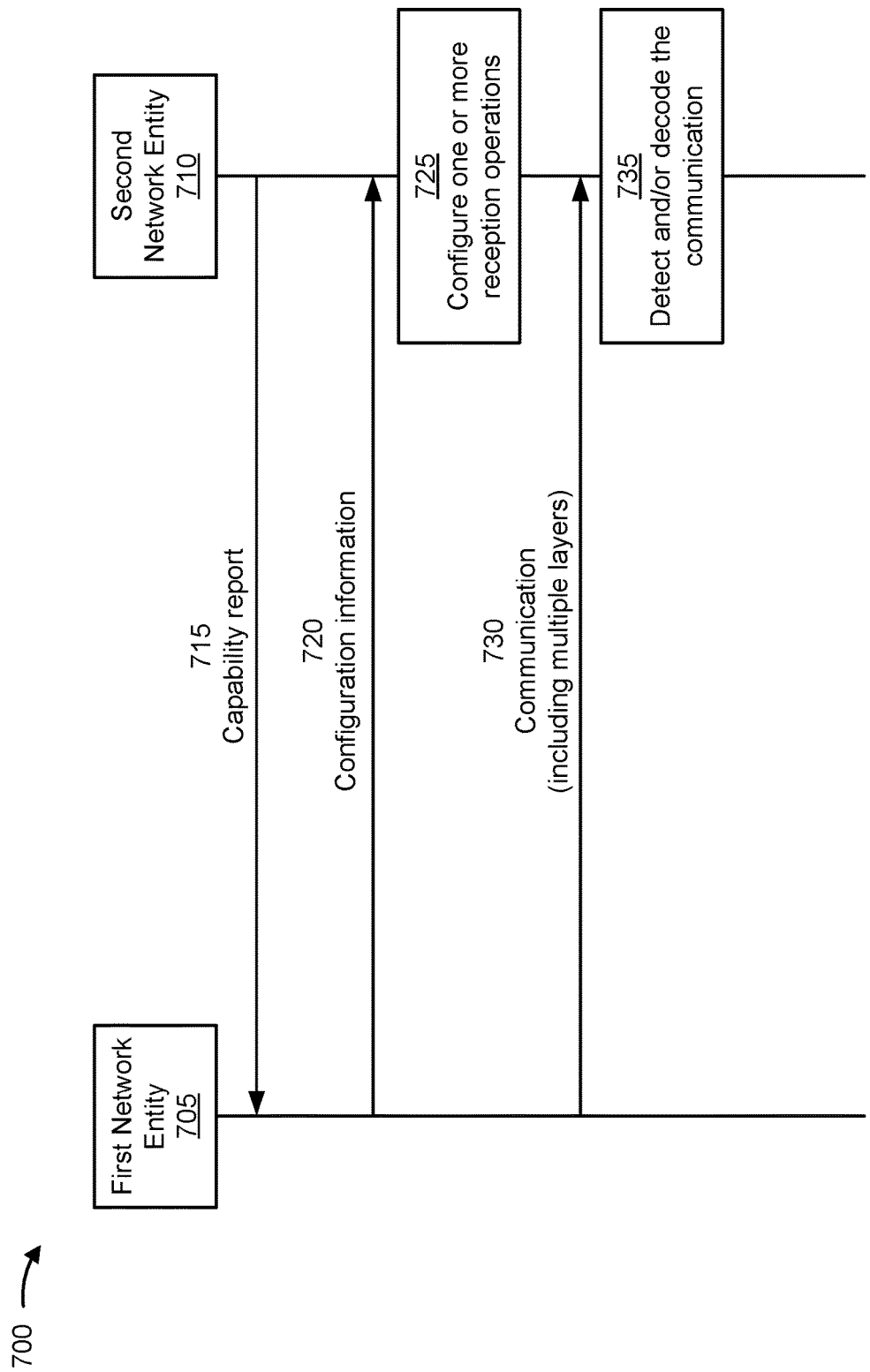
FIG. 7 is a diagram of an example associated with operations associated with a layered modulation communication, in accordance with the present disclosure.

FIG. 7 is a diagram of an example associated with operations 700 associated with a layered modulation communication, in accordance with the present disclosure. As shown in FIG. 7, a first network entity 705, and a second network entity 710 may communicate with each other. In some aspects, the first network entity 705 and the second network entity 710 may be part of a wireless network (for example, the wireless network 300). The first network entity 705 and/or the second network entity 710 may be the network entity 102, the network entity 104, the network entity 106, the apparatus 200, the network node 310, the UE 320, a base station, a CU, a DU, and/or an RU, among other examples. In some aspects, the first network entity 705 may be a network node (e.g., a network node 310, a base station, a CU, a DU, and/or an RU), and the second network entity 710 may be a UE (e.g., a UE 320).

In some aspects, the second network entity 710 may be associated with a reduced feature set, as described in more detail elsewhere herein. For example, the second network entity 710 may be a RedCap entity, a low-tier entity, an NR-Lite entity, an IoT entity, an ambient IoT entity, a passive entity, a terminal (e.g., an RFID device, a tag, or a similar device), and/or an energy-harvesting-capable entity, among other examples. For example, the second network entity 710 may not support OFDM signals (e.g., may be unable to detect OFDM signals), may have a low timing tracking and/or frequency tracking capability (e.g., may not support accurate timing/frequency tracking), and/or may support relatively low sampling rates (e.g., a sampling rate of the second network entity 710 may less than the system bandwidth), among other examples. Therefore, the first network entity 705 and the second network entity 710 may communicate via signals that can be detected, demodulated, and/or otherwise received by the second network entity 710 (e.g., enabling the second network entity 710 to receive the signals using less power or low energy consumption), as described in more detail elsewhere herein. For example, the signal(s) may use modulation techniques (such as OOK, FSK, and/or FMCW modulation techniques) that enable the signal(s) to be detected, demodulated, and/or otherwise received by the second network entity 710 with low power consumption.

As shown by reference number 715, the second network entity 710 may transmit, and the first network entity 705 may receive, a capability report. The second network entity 710 may transmit the capability report via capability signaling, a UE assistance information (UAI) communication, an uplink MAC control element (MAC-CE) communication, an RRC communication, a physical uplink shared channel (PUSCH), and/or a physical uplink control channel (PUCCH), among other examples. The capability report may indicate whether the second network entity 710 supports a feature and/or one or more parameters related to the feature. The capability report may indicate support for one or more operations described herein. The capability report may indicate support for a feature and/or one or more parameters related to the feature via an information element (IE). For example, support for a feature and/or one or more parameters related to the feature described herein may be indicated by a corresponding IE in the capability report.

For example, the capability report may indicate a capability and/or parameter for communicating (e.g., detecting, demodulation, decoding, and/or otherwise receiving) a layered communication that is associated with hierarchical modulation, as described in more detail elsewhere herein. For example, the capability report may indicate whether the second network entity 710 supports communicating (e.g., detecting, demodulation, decoding, and/or otherwise receiving) a communication that includes multiple layers associated with respective modulation schemes. For example, the capability report may indicate whether the second network entity 710 supports communicating (e.g., detecting, demodulation, decoding, and/or otherwise receiving) a communication associated with both keying modulation (e.g., OOK and/or FSK) and FMCW modulation.

The capability report may indicate that the first network entity supports at least one of keying modulation or FMCW modulation. In some aspects, the capability report may indicate a type of keying modulation supported by the second network entity 710. For example, the capability report may indicate whether the second network entity 710 supports OOK modulation (e.g., indicating whether the second network entity 710 is configured to receive a communication that is modulated via OOK modulation). Additionally, or alternatively, the capability report may indicate whether the second network entity 710 supports FSK modulation (e.g., indicating whether the second network entity 710 is configured to receive a communication that is modulated via FSK modulation). For example, the capability report may indicate one or more types of keying modulation (e.g., OOK and/or FSK) supported by the second network entity 710 for receiving communications that include multiple layers associated with respective modulation schemes (e.g., where one of the modulation schemes is a keying modulation scheme).

In some aspects, the capability report may indicate whether the second network entity 710 supports FMCW modulation (e.g., indicating whether the second network entity 710 is configured to receive a communication that is modulated via FMCW modulation). In some aspects, the capability report may indicate one or more supported types of FMCW modulation. For example, the capability report may indicate whether the second network entity 710 supports slope-based FMCW modulation (e.g., where slopes of an FMCW signal correspond to respective binary values). As another example, the capability report may indicate whether the second network entity 710 supports cyclic shift-based FMCW modulation (e.g., where cyclic shifts of an FMCW signal correspond to respective binary values). For example, the capability report may indicate one or more types of FMCW modulation (e.g., slope-based and/or cyclic shift-based) supported by the second network entity 710 for receiving communications that include multiple layers associated with respective modulation schemes (e.g., where one of the modulation schemes is an FMCW modulation scheme).

In some aspects, the capability report may indicate one or more supported modulation orders for communications that include multiple layers associated with respective modulation schemes. A modulation order may refer to a quantity of distinct states that can be used to represent information for a particular modulation scheme (e.g., if a modulation order is two, then the modulation scheme may be capable of indicating two distinct states of information, such as a binary one and a binary zero). For example, the capability report may indicate a modulation order capability of the second network entity 710 for respective layers of communications that include multiple layers associated with respective modulation schemes. In some aspects, the capability report may indicate a first modulation order capability of the second network entity 710 for a most significant bit (MSB) (e.g., that is associated with keying modulation) and a second modulation order capability of the second network entity 710 for a least significant bit (LSB). For example, a communication that includes multiple layers associated with respective modulation schemes may indicate an MSB (e.g., one or more bits) via a first layer that is associated with a first modulation scheme (e.g., OOK or FSK) and an LSB (e.g., one or more bits) via a second layer that is associated with a second modulation scheme (e.g., FMCW modulation).

For example, the capability report may indicate a first modulation order for the keying modulation (e.g., a first modulation order supported by the second network entity 710 for OOK modulation or FSK modulation). In some aspects, the capability report may indicate a supported modulation order for OOK modulation and/or a supported modulation order for FSK modulation. Additionally, or alternatively, the capability report may indicate a second modulation order for FMCW modulation (e.g., a second modulation order supported by the second network entity 710 for FMCW modulation). In some aspects, the capability report may indicate a supported modulation order for slope-based FMCW modulation and/or a supported modulation order for cyclic shift-based FMCW modulation. For example, a supported modulation order for the slope-based FMCW modulation may indicate a quantity of FMCW slopes that can be detected by the second network entity 710. A supported modulation order for cyclic shift-based FMCW modulation may indicate a quantity of FMCW cyclic shifts that can be detected by the second network entity 710.

One or more operations described herein may be based on capability information of the capability report. For example, the second network entity 710 may perform a communication in accordance with the capability information, or may receive configuration information that is in accordance with the capability information.

As shown by reference number 720, the first network entity 705 may transmit, and the second network entity 710 may receive, configuration information. For example, the first network entity 705 may transmit, and the second network entity 710 may receive, the configuration information via one or more of system information signaling (e.g., a master information block (MIB) and/or a system information block (SIB)), RRC signaling, one or more MAC-CEs, and/or downlink control information (DCI), among other examples. In some aspects, the configuration information may indicate that the second network entity 710 is to perform one or more operations described herein.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

The first network entity 705 may configure the second network entity 710 in accordance with the capability report. For example, the first network entity 705 may configure, or may trigger, the second network entity 710 to perform one or more operations based on, in response to, or otherwise associated with the capability report indicating that the second network entity 710 support the one or more operations. For example, the configuration information may indicate a first modulation order for a first layer and/or for an MSB and a second modulation order for a second layer and/or for an LSB (e.g., of communications to be transmitted to the second network entity 710). The first modulation order may be based on, or otherwise associated with, a first supported modulation order indicated via the capability report (e.g., associated with the modulation scheme associated with the first layer and/or the MSB, such as a keying modulation scheme). The second modulation order may be based on, or otherwise associated with, a second supported modulation order indicated via the capability report (e.g., associated with the modulation scheme associated with the second layer and/or the LSB, such as an FMCW modulation scheme). For example, the first network entity 705 may configure the second network entity 710 to use a first modulation order for the first layer and/or the MSB that does not exceed the first supported modulation order. Similarly, the first network entity 705 may configure the second network entity 710 to use a second modulation order for the second layer and/or the LSB that does not exceed the second supported modulation order. For example, the first network entity 705 may configure one or more parameters such that a quantity of bits transmitted via the first layer (e.g., for the MSB) may be less than or equal to the first supported modulation order and a quantity of bits transmitted via the second layer (e.g., for the LSB) may be less than or equal to the second supported modulation order. In other words, a size of first information (e.g., indicated via the first layer and/or the MSB) may be based on the first supported modulation order and a size of second information (e.g., indicated via the second layer and/or the LSB) may be based on the second supported modulation order.

In some aspects, the configuration information may include a configuration of one or more parameters for a communication (e.g., for a type of communication). The communication may be type of communication that includes multiple layers associated with respective modulation schemes. In some aspects, the communication may be, or may include, a WUS or an LP-WUS. In some other aspects, the communication may be, or may include, a broadcast communication, a groupcast communication, or a multicast communication, among other examples. In some other aspects, the communication may be a unicast communication.

In some aspects, the configuration information may indicate a type of modulation or a modulation scheme associated with different layers of the communication. In other words, the configuration information may indicate a first modulation scheme (e.g., OOK modulation or FSK modulation) associated with a first layer and/or an MSB of the communication. The configuration information may indicate a second modulation scheme (e.g., FMCW modulation) associated with a second layer and/or an LSB of the communication. For example, the configuration information may indicate that the first layer and/or the MSB of the communication is associated with keying modulation. In some aspects, the configuration information may indicate a type of keying modulation (e.g., OOK modulation or FSK modulation) associated with the first layer and/or the MSB. The configuration information may indicate that the second layer and/or the LSB is associated with FMCW modulation. In some aspects, the configuration information may indicate a type of keying modulation (e.g., slope-based FMCW modulation or cyclic shift-based FMCW modulation) associated with the second layer and/or the LSB.

The one or more parameters may include the first modulation order (e.g., for the first layer and/or the MSB) of the communication. For example, the configuration information may indicate a first modulation order for an MSB that is modulation via keying modulation (e.g., OOK modulation or FSK modulation). The one or more parameters may include the second modulation order (e.g., for the second layer and/or the LSB) of the communication. For example, the configuration information may indicate a second modulation order for a second layer and/or the LSB of the communication that is modulation via FMCW modulation (e.g., slope-based FMCW modulation or cyclic shift-based FMCW modulation).

In some aspects, the configuration information described herein and/or the capability report may include information transmitted via multiple communications. Additionally, or alternatively, the first network entity 705 may transmit the configuration information, or a communication including at least a portion of the configuration information, before and/or after the second network entity 710 transmits the capability report. For example, the first network entity 705 may transmit a first portion of the configuration information before a transmission of the capability report, the second network entity 710 may transmit at least a portion of the capability report, and the first network entity 705 may transmit a second portion of the configuration information after receiving the capability report.

The second network entity 710 may configure itself based on the configuration information. For example, as shown by reference number 725, the second network entity 710 may configure one or more reception operations (e.g., based on, in response to, or otherwise associated with the configuration information). For example, the second network entity 710 may configure one or more components associated with detecting, decoding, demodulation, and/or otherwise receiving signals associated with a keying modulation scheme (e.g., OOK modulation or FSK modulation) based on, in response to, or otherwise associated with the configuration information. Additionally, or alternatively, the second network entity 710 may configure one or more components associated with detecting, decoding, demodulation, and/or otherwise receiving signals associated with an FMCW modulation scheme (e.g., slope-based FMCW modulation or cyclic shift-based FMCW modulation) based on, in response to, or otherwise associated with the configuration information. For example, the second network entity 710 may include a first receiver (e.g., a first one or more components configured to receive signals) that is associated with receiving signals that are modulated via a keying modulation scheme (e.g., OOK modulation or FSK modulation) and a second receiver (e.g., a first one or more components configured to receive signals) that is associated with receiving signals that are modulated via an FMCW modulation scheme. The second network entity 710 may configure the first receiver based on, in response to, or otherwise associated with the configuration information (e.g., the modulation order associated with the keying modulation scheme and/or the type of keying modulation scheme). The second network entity 710 may configure the second receiver based on, in response to, or otherwise associated with the configuration information (e.g., the modulation order associated with the FMCW modulation scheme and/or the type of FMCW modulation scheme).

As shown by reference number 730, the first network entity 705 may transmit, and the second network entity 710 may receive, a communication. The communication may include multiple layers that are modulated via respective modulation schemes. For example, the communication may include a first layer (e.g., conveying first information) and a second layer (e.g., conveying second information). The first layer may be associated with an MSB (e.g., one or more bits) of the communication and the second layer may be associated with an LSB (e.g., one or more bits) of the communication. In some aspects, the first layer may be associated with keying modulation (e.g., OOK modulation or FSK modulation). The second layer may be associated with FMCW modulation (e.g., slope-based FMCW modulation or cyclic shift-based FMCW modulation). In some aspects, the first network entity 705 may transmit, and the second network entity 710 may receive, the communication via a downlink channel, a broadcast channel, a multicast channel, a multicast broadcast service (MBS) channel, a sidelink channel, an IoT channel, and/or another type of channel. In some aspects, the communication may be a WUS (e.g., an LP-WUS). In other aspects, the communication may include one or more messages and/or reference signals (e.g., intended for one or more network entities including the second network entity 710).

As described elsewhere herein, "layer" may refer to a data stream. A "data stream" may refer to a flow of information that is transmitted and/or received over a wireless communication channel. For example, a layer may be independently encoded and/or modulated. The communication may include multiple layers that are independently encoded and/or modulated. For example, the communication may include different layers which are independent data streams that are transmitted simultaneously using different modulation schemes. Each data stream may be referred to as a "layer." In some aspects, each layer may convey information. For example, a first layer may convey or indicate first information and a second layer may convey or indicate second information. In some aspects, the first layer may be a first data stream that conveys or indicates first information, and the second layer may be a second data stream that conveys or indicates second information. The multiple layers may be transmitted via the same communication and/or the same signal. In some aspects, the multiple layers may be, or may include, multiplexed information (e.g., different sets of information that are separately encoded or modulated and that are multiplexed in the same communication or the same signal). Some examples described herein use two layers as an example. However, the aspects described herein may be similarly applied to any quantity of layers.

The first network entity 705 may determine first information and second information to be included in the communication. The first information may be intended for a set of one or more network entities (e.g., UEs). For example, the first information may be group-common information that is applicable to multiple entities including the second network entity 710 (e.g., multiple UEs). The group-common information may include information that is applicable to a plurality of network entities (e.g., UEs), such as a group of network entities that includes the second network entity 710. In some aspects, the first information may be information that is to be broadcasted by the first network entity 705. In some aspects, the first information may indicate that the first network entity 705 has one or more communications (e.g., has data) to transmit to at least one network entity included in a set of one or more network entities (e.g., a group of UEs). In other examples, the first information may include a first message. In some aspects, the first information may include control information (e.g., scheduling information or other control information).

The first network entity 705 may determine second information to be included in the communication. The second information may be intended for one or more network entities, including the second network entity 710. In some aspects, the second information may be unicast information that is intended or, or applicable to, only the second network entity 710. As an example, the first information may indicate that the first network entity 705 has information (e.g., one or more communications or data) to transmit to at least one network entity included in a set of network entities and the second information may be indicative of the at least one network entity (e.g., the second network entity 710). For example, the first information may indicate whether the first network entity 710 has communication(s) to transmit to at least one network entity included in a set of network entities (e.g., in a binary "yes" or "no" manner) and the second information may indicate an identifier of the at least one network entity for which the communication(s) are intended. As another example, the second information may include a second message. In some aspects, the second information may include data information (e.g., scheduled or configured via the first information). For example, the first information may include control information for the second information.

In some aspects, the first information may include a first message (e.g., intended for a first receiver of the second network entity 710, such as an OOK receiver or an FSK receiver) and the second information may include a second message (e.g., intended for a second receiver of the second network entity 710, such as an FMCW receiver). In some aspects, the first information may include a first message intended for a first network entity (e.g., a first UE that is configured to perform OOK or FSK demodulation) and the second information may include a second message intended for a second network entity (e.g., a second UE that is configured to perform FMCW demodulation). As another example, the first information and the second information may be multiplexed information. For example, the communication (e.g., described herein that includes the first layer and the second layer) may be used for multiplexing different messages in a broadcast channel (e.g., a downlink broadcast channel, a sidelink channel, an IoT channel, or another broadcast channel). As another example, the communication may include two or more messages intended for the same network entity (e.g., the second network entity 710). For example, the first information may include a control message and the second information may include a data message. As another example, the first information may include a control message and the second information may be a reference signal (e.g., a sounding reference signal (SRS), a channel state information (CSI) reference signal (CSI-RS), or another reference signal).

The first network entity 705 may encode the first information using keying modulation. For example, the first network entity 705 may encode and/or modulate the first information using OOK modulation (e.g., to generate an OFDM-compatible OOK waveform) or using FSK modulation (e.g., to generate an OFDM-compatible FSK waveform). The first network entity 705 may encode the second information using FMCW modulation. For example, the first network entity 705 may generate an FMCW waveform having a given slope or a given cyclic shift that corresponds to the second information. As an example, a modulation order for the FMCW modulation may be four. In such examples, a first FMCW slope or a first cyclic shift may correspond to a first state of information (e.g., binary "00"), a second FMCW slope or a second cyclic shift may correspond to a second state of information (e.g., binary "01"), a third FMCW slope or a third cyclic shift may correspond to a third state of information (e.g., binary "10"), and a fourth FMCW slope or a fourth cyclic shift may correspond to a fourth state of information (e.g., binary "11"). The first network entity 705 may encode and/or modulate the second information by generating an FMCW waveform having an FMCW slope and/or cyclic shift that corresponds to the second information. The first network entity 705 may transmit, and the second network entity 710 may receive, a communication that includes a first layer indicating the first information (e.g., modulated via OOK modulation or FSK modulation) and a second layer indicating the second information (e.g., modulated via FMCW modulation).

As shown by reference number 735, the second network entity 710 may detect and/or decode (e.g., receive) the communication to obtain the first information and/or the second information. For example, the second network entity 710 may detect, decode, and/or demodulate the first layer using keying modulation (e.g., OOK modulation or FSK modulation) to obtain the first information. In some aspects, the second network entity 710 may detect, decode, and/or demodulate the second layer using FMCW modulation to obtain the second information. The reception operation for the communication is described in more detail elsewhere herein.

In some aspects, the second network entity 710 may demodulate the first layer to obtain a control communication. The control communication may indicate one or more communication parameters associated with the second layer and/or a data communication conveyed via the second layer. The second network entity 710 may demodulate, based on the control communication (e.g., based on the one or more communication parameters), the second layer to obtain the data communication.

In some aspects, the second network entity 710 (e.g., depending on a capability or configuration of the second network entity 710) may detect, decode, and/or demodulate either the first layer (e.g., to obtain the first information) or the second layer (e.g., to obtain the second information). For example, if the second network entity 710 is capable of and/or configured to perform operations associated with an OOK modulation scheme and/or an FSK modulation scheme (e.g., but not an FMCW modulation scheme), then the second network entity 710 may detect, decode, and/or demodulate the first layer (e.g., to obtain the first information) and may not detect, decode, and/or demodulate the second layer. If the second network entity 710 is capable of and/or configured to perform operations associated with an FMCW modulation scheme (e.g., but not an OOK modulation scheme and/or an FSK modulation scheme), then the second network entity 710 may detect, decode, and/or demodulate the second layer (e.g., to obtain the second information) and may not detect, decode, and/or demodulate the first layer. In other aspects, if the second network entity 710 is capable of and/or configured to perform operations associated with both a keying modulation scheme (e.g., an OOK modulation scheme and/or an FSK modulation scheme) and an FMCW modulation scheme, then the second network entity 710 may detect, decode, and/or demodulate both the first layer (e.g., to obtain the first information) and the second layer (e.g., to obtain the second information).

In some aspects, the second network entity 710 may detect, decode, and/or demodulate the second layer based on, in response to, or otherwise associated with the first information. For example, the first information may indicate whether the second network entity 710 is to receive (e.g., detect, decode, and/or demodulate) the second layer. For example, the first information may indicate whether the second information is intended for or applicable to the second network entity 710. If the first information may indicates that the second information is not intended for or is not applicable to the second network entity 710, then the second network entity may refrain from (e.g., may skip) receiving (e.g., detecting, decoding, and/or demodulating) the second layer. By receiving (e.g., detecting, decoding, and/or demodulating) the second layer only when the second information is intended for or applicable to the second network entity 710, the second network entity 710 may conserve processing resources, computing resources, and/or power resources that would have otherwise been used to detect, decode, and/or demodulate the second layer in examples where the second information is not intended for or is not applicable to the second network entity 710.

As indicated above, FIG. 7 is provided as an example. Other examples may differ from what is described with regard to FIG. 7.

Figure 8:
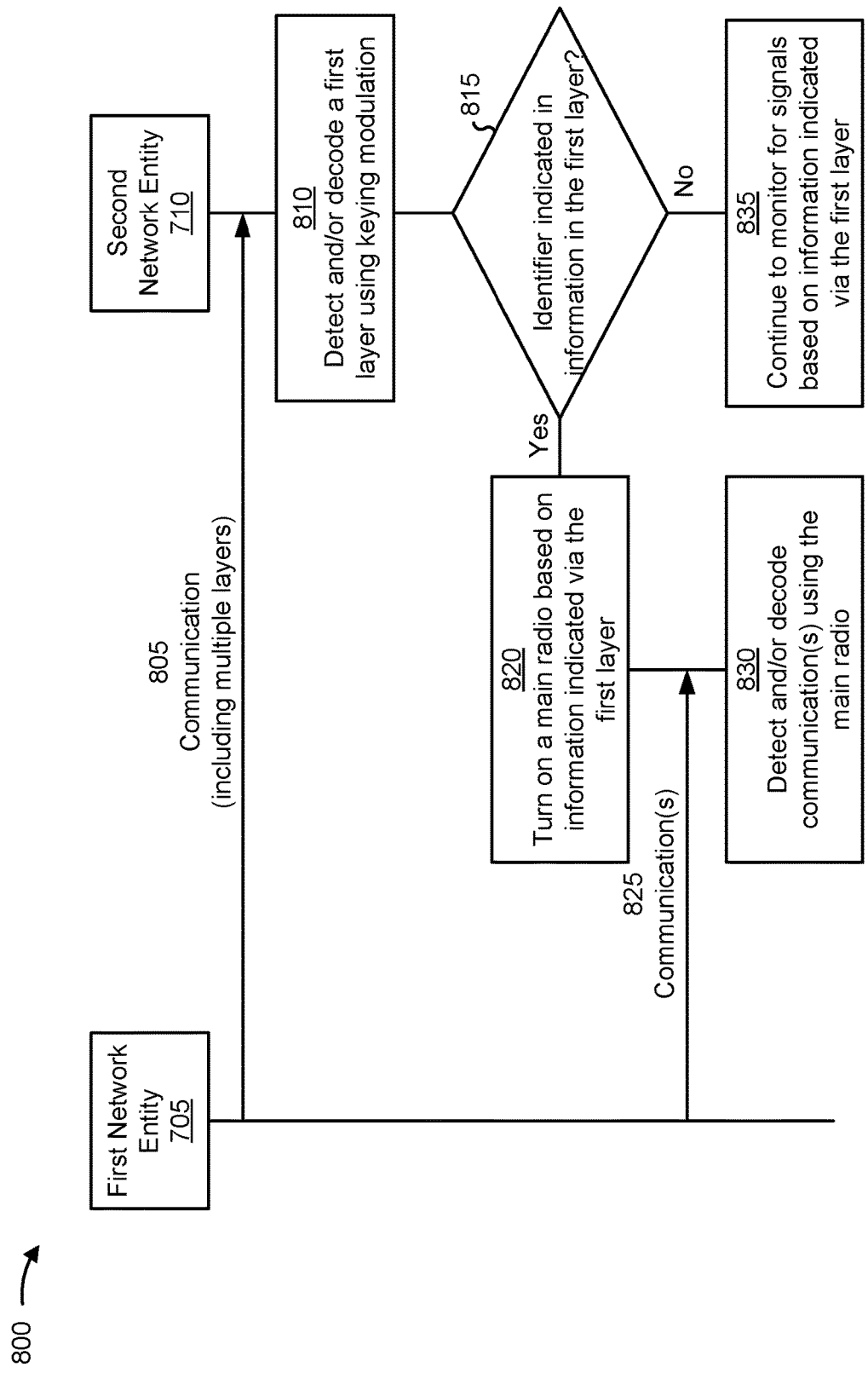
FIG. 8 is a diagram of an example associated with operations associated with a layered modulation communication, in accordance with the present disclosure.

FIG. 8 is a diagram of an example associated with operations 800 associated with a layered modulation communication, in accordance with the present disclosure. As shown in FIG. 8, the first network entity 705 and the second network entity 710 may communicate with each other.

As shown by reference number 805, the first network entity 705 may transmit, and the second network entity 710 may receive, a communication. The communication may include multiple layers that are modulated via respective modulation schemes. The communication may be similar to the communication described above in connection with FIG. 7 (and reference number 730). For example, the first network entity 705 may encode, modulate, and/or otherwise generate a signal for the communication in a similar manner as described elsewhere herein (such as in connection with FIG. 7).

As shown by reference number 810, the second network entity 710 may detect and/or decode a first layer of the communication using a keying modulation scheme (e.g., OOK modulation or FSK modulation). For example, the second network entity 710 may obtain first information based on, or otherwise associated with, detecting, decoding, and/or demodulating the first layer of the communication using the keying modulation. The first information may be an MSB (e.g., one or more bits) of the communication. In some aspects, the first information may be binary information. In some aspects, the first information may include a single bit.

As shown by reference number 815, the second network entity 710 may determine whether an identifier associated with the second network entity 710 is indicated via the first layer (e.g., via the first information). For example, the first information may indicate a group of entities (e.g., a group of UEs). The second network entity 710 may determine whether the second network entity 710 is included in the group of entities (e.g., indicated by the first information). For example, the communication may be a WUS (e.g., an LP-WUS). An MSB of the WUS may indicate the group of entities (e.g., a group of UEs) that are to wake up to receive one or more communications. The second network entity 710 may obtain the MSB of the WUS via detecting, decoding, and/or demodulating the first layer using the keying modulation scheme (e.g., the OOK modulation scheme or the FSK modulation scheme).

As shown by reference number 820, the second network entity 710 may turn on a main radio (e.g., an OFDM radio or an OFDM receiver) based on the information (e.g., first information) indicated via the first layer. For example, if the identifier associated with the second network entity 710 is indicated via the first layer (e.g., via the first information) (e.g., "Yes" as shown in FIG. 8), then the second network entity 710 may turn on the main radio of the second network entity 710 (e.g., to enable the second network entity 710 to receive one or more communications via the main radio).

In some aspects, the second network entity 710 may detect and/or decode a second layer of the communication using an FMCW modulation scheme. For example, if the second network entity 710 is configured to (e.g., capable of) receiving (e.g., detecting, decoding, and/or demodulating) signals using the FMCW modulation scheme, then the second network entity 710 may detect and/or decode the second layer of the communication to obtain second information (e.g., an LSB of the communication). For example, if the identifier associated with the second network entity 710 is indicated via the first layer (e.g., via the first information) (e.g., "Yes" as shown in FIG. 8), then the second network entity 710 may detect and/or decode the second layer of the communication using the FMCW modulation scheme. In some aspects, the second network entity 710 may turn on a main radio (e.g., an OFDM radio or an OFDM receiver) based on, in response to, or otherwise associated with the second information, as described in more detail elsewhere herein. In other aspects, the second network entity 710 may not be configured to (e.g., may not be capable of) receiving (e.g., detecting, decoding, and/or demodulating) signals using the FMCW modulation scheme. In such examples, the second network entity 710 may turn on a main radio (e.g., an OFDM radio or an OFDM receiver) based on, in response to, or otherwise associated with only the first information (e.g., the MSB) indicated via the first layer of the communication.

As shown by reference number 825, the first network entity 705 may transmit, and the second network entity 710 may receive one or more communications. For example, the one or more communications may be OFDM communications. The second network entity 710 may receive the one or more communications via the main radio of the second network entity 710. For example, by turning on the main radio (e.g., based on the information indicated via the first layer and/or the second layer), the second network entity 710 may be enabled to receive the one or more communications. For example, as shown by reference number 830, the second network entity 710 may detect and/or decode the communication(s) using the main radio (e.g., using one or more components of the main radio).

Alternatively, as shown by reference number 835, the second network entity 710 may continue to monitor for signals (e.g., using one or more low power radios, such as an OOK/FSK radio and/or an FMCW radio) based on information indicated via the first layer of the communication. For example, if the identifier associated with the second network entity 710 is not indicated via the first layer (e.g., via the first information) (e.g., "No" as shown in FIG. 8), then the second network entity 710 may refrain from turning on the main radio of the second network entity 710 (e.g., to conserve power). In such examples, the second network entity 710 may continue to monitor for signals (e.g., using one or more low power radios, such as an OOK/FSK radio and/or an FMCW radio). For example, the second network entity 710 may continue to monitor for WUSs (e.g., LP-WUSs).

By turning on the main radio only if the information indicated by the first layer and/or the second layer of the communication indicates that there are communication(s) to be received by the second network entity 710, the second network entity 710 may conserve power that would have otherwise been used to power the main radio. Additionally, by transmitting the communication using multiple layers that are modulated using modulation schemes that can be processed (e.g., received, detected, demodulated, and/or decoded) using relatively low sampling rates, the second network entity 710 may conserve power associated with processing the multiple layers. Further, by transmitting the communication using multiple layers, additional data may be indicated via the same communication (e.g., the same signal), thereby increasing the data rate associated with the communication (e.g., while not significantly increasing the power consumption of the second network entity 710 associated with receiving the communication).

As indicated above, FIG. 8 is provided as an example. Other examples may differ from what is described with regard to FIG. 8.

Figure 9:
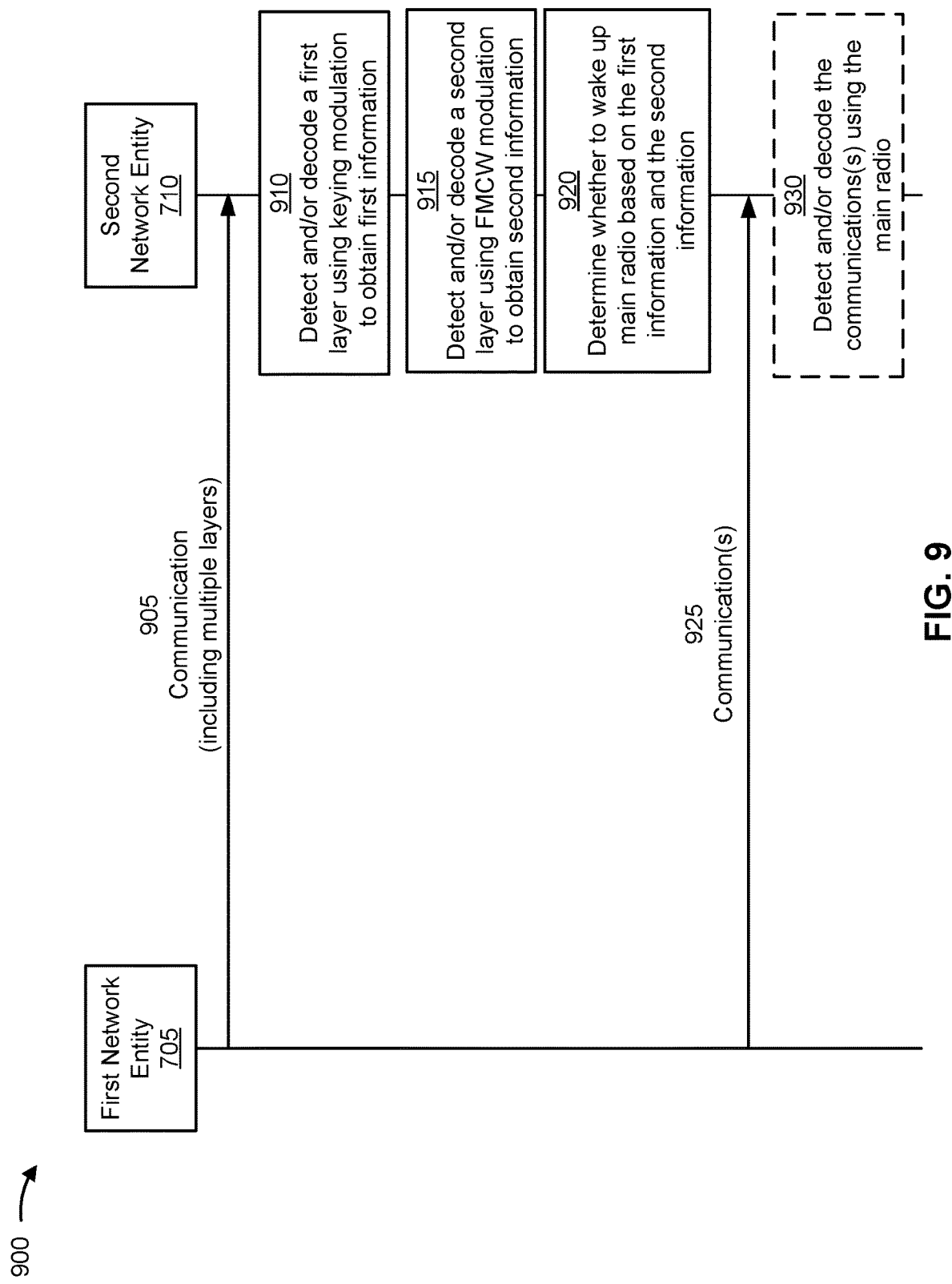
FIG. 9 is a diagram of an example associated with operations associated with a layered modulation communication, in accordance with the present disclosure.

FIG. 9 is a diagram of an example associated with operations 900 associated with a layered modulation communication, in accordance with the present disclosure. As shown in FIG. 9, the first network entity 705 and the second network entity 710 may communicate with each other.

As shown by reference number 905, the first network entity 705 may transmit, and the second network entity 710 may receive, a communication. The communication may include multiple layers that are modulated via respective modulation schemes. The communication may be similar to the communication described above in connection with FIG. 7 and/or FIG. 8 (and reference number 730 and/or reference number 805). For example, the first network entity 705 may encode, modulate, and/or otherwise generate a signal for the communication in a similar manner as described elsewhere herein (such as in connection with FIG. 7).

As shown by reference number 910, the second network entity 710 may detect and/or decode a first layer of the communication using a keying modulation scheme (e.g., OOK modulation or FSK modulation). For example, the second network entity 710 may obtain first information based on, or otherwise associated with, detecting, decoding, and/or demodulating the first layer of the communication using the keying modulation. The first information may be an MSB (e.g., one or more bits) of the communication. In some aspects, the first information may be binary information. In some aspects, the first information may include a single bit.

The second network entity 710 may determine whether an identifier associated with the second network entity 710 is indicated via the first layer (e.g., via the first information). For example, the first information may indicate a group of entities (e.g., a group of UEs). The second network entity 710 may determine whether the second network entity 710 is included in the group of entities (e.g., indicated by the first information). For example, the communication may be a WUS (e.g., an LP-WUS). An MSB of the WUS may indicate the group of entities (e.g., a group of UEs) that are to wake up to receive one or more communications. The second network entity 710 may obtain the MSB of the WUS via detecting, decoding, and/or demodulating the first layer using the keying modulation scheme (e.g., the OOK modulation scheme or the FSK modulation scheme).

In some aspects, as shown by reference number 915, the second network entity 710 may detect and/or decode a second layer of the communication using an FMCW modulation scheme. For example, if the second network entity 710 is configured to (e.g., capable of) receiving (e.g., detecting, decoding, and/or demodulating) signals using the FMCW modulation scheme, then the second network entity 710 may detect and/or decode the second layer of the communication to obtain second information (e.g., an LSB of the communication). For example, if the identifier associated with the second network entity 710 is indicated via the first layer (e.g., via the first information), then the second network entity 710 may detect and/or decode the second layer of the communication using the FMCW modulation scheme. In some aspects, the second network entity 710 may turn on a main radio (e.g., an OFDM radio or an OFDM receiver) based on, in response to, or otherwise associated with the second information, as described in more detail elsewhere herein.

For example, the first information may indicate a group (or set) of network entities (e.g., a group of UEs). The second network entity 710 may determine whether the second network entity 710 is included in the group (or set) indicated by the first information. If the second network entity 710 is not included in the group (or set) indicated by the first information, then the second network entity 710 may refrain from performing additional operation(s) associated with receiving the communication. For example, if the second network entity 710 is not included in the group (or set) indicated by the first information, then the second network entity 710 may refrain from (e.g., may skip) detecting, decoding, and/or demodulating the second layer of the communication. This conserves processing resources, computing resources, and/or power resources that would have otherwise been used by the second network entity 710 to detect, decode, demodulate, and/or otherwise receive the second layer of the communication (e.g., when the second information and/or the communication is not intended for or applicable to the second network entity 710).

If the second network entity 710 is included in the group (or set) indicated by the first information, then the second network entity 710 may perform additional operation(s) associated with receiving the communication. For example, if the second network entity 710 is included in the group (or set) indicated by the first information, then the second network entity 710 may detect, decode, demodulate, and/or otherwise receive the second layer of the communication. For example, if the FMCW modulation scheme is a slope-based FMCW modulation scheme, then the second network entity 710 may determine a slope associated with an FMCW signal included in the communication and/or the second layer (e.g., as described in more detail in connection with FIGS. 10, 11, and/or 12). If the FMCW modulation scheme is a cyclic shift-based FMCW modulation scheme, then the second network entity 710 may determine a cyclic shift associated with an FMCW signal included in the communication and/or the second layer (e.g., as described in more detail in connection with FIGS. 10, 11, 12, and/or 13). The slope or the FMCW may indicate an information state (e.g., a binary value). The second network entity 710 may determine the second information based on the information state (e.g., the second information may be the binary value indicated by the information state).

Because the first layer and the second layer are modulated using keying modulation and FMCW modulation, respectively, the second network entity 710 may be enabled to receive the first layer and the second layer using a low-power radio (e.g., one or more components associated with relatively low power consumption). For example, both the keying modulation scheme and the FMCW modulation scheme may be associated with low sampling rates. Therefore, the second network entity 710 may be enabled to use a low-power radio to receive both layers of the communication. As a result, more information (e.g., more bits) may be communicated via the communication (e.g., by using multiple layers), while still enabling the second network entity 710 to receive the communication using a low-power radio (e.g., thereby reducing a power consumption of the second network entity 710 associated with receiving the communication). Moreover, because the additional information (e.g., additional bit(s), such as the LSB) is indicated via a separate layer (e.g., and not indicated via a layer modulated using the keying modulation scheme), a likelihood of frequency selectivity errors and/or inter-symbol interference associated with communicating the additional information may be reduced.

The second information may include an LSB (e.g., one or more bits) of the communication. For example, the second information may be indicative of a particular network entity for which the first network entity 705 has one or more communications to be transmitted. In some aspects, the second information may include an entity identifier (e.g., an identifier of a particular network entity, such as the second network entity 710). The entity identifier may be a UE identifier. In some aspects, the second information may be entity-specific information (e.g., UE-specific information). For example, the second information may be intended for or applicable to a single network entity (e.g., the second network entity 710).

As shown by reference number 920, the second network entity 710 may determine whether to wake up a main radio (e.g., of the second network entity 710) based on the first information and the second information (e.g., based on the MSB and the LSB). For example, the communication may be an WUS (e.g., an LP-WUS). The first information and the second information may indicate whether the WUS is intended for the second network entity 710. For example, the first information may indicate a set or group of network entities associated with the WUS. The second information may indicate one or more network entities (from the set or group of network entities) associated with the WUS. If the first information and the second information indicate that the second network entity 710 is associated with the WUS (e.g., if the WUS indicates that the second network entity 710 is to wake up), then the second network entity 710 may wake up the main radio.

By indicating a group or set of network entities via the first layer, the first network entity 705 may be enabled to cause network entities that do not support (or are not configured to perform) FMCW-based demodulation to wake up (e.g., assuming the network entities support OOK-based demodulation or FSK-based demodulation). For example, network entities that do not support (or are not configured to perform) FMCW-based demodulation may cause a main radio to wake up if the network entities are included in the group or set of network entities indicated by the first information. Additional power savings for network entities that do support FMCW-based demodulation may be achieved by indicating the particular network entity (or entities) from the group or set that are to wake up via the second information (e.g., via the second layer). For example, the second network entity 710 may support FMCW-based demodulation and may obtain the second information via the second layer. If the second information indicates that the second network entity 710 is not to wake up, then the second network entity 710 may conserve power resources that would have otherwise been used to wake up the main radio in response to the first information indicating the group or set of network entities that includes the second network entity 710.

As shown by reference number 925, the first network entity 705 may transmit one or more communications. For example, the one or more communications may be OFDM communications. The second network entity 710 may receive the one or more communications via the main radio of the second network entity 710. For example, by turning on the main radio (e.g., based on the information indicated via the first layer and/or the second layer), the second network entity 710 may be enabled to receive the one or more communications. For example, as shown by reference number 930, the second network entity 710 may detect and/or decode the communication(s) using the main radio (e.g., using one or more components of the main radio). Alternatively, if the second network entity 710 determines that the main radio is not to be turned on (e.g., if the first information and the second information indicate that the one or more communications are not intended for or applicable to the second network entity 710), then the second network entity 710 may refrain from (e.g., may skip or may not perform one or more operations associated with) receiving the one or more communications. This conserves processing resources and/or power resources that would have otherwise been associated with powering the main radio and/or performing one or more operations associated with receiving the one or more communications.

As indicated above, FIG. 9 is provided as an example. Other examples may differ from what is described with regard to FIG. 9.

FIG. 10 is a diagram of an example 1000 associated with an OOK modulated and FMCW modulated communication, in accordance with the present disclosure.

For example, as shown by reference number 1005, the communication (e.g., the communication described elsewhere herein, such as in connection with reference number 730, reference number 805, and/or reference number 905) may be associated with OOK modulation and slope-based FMCW modulation. For example, the keying modulation scheme may by the OOK modulation (e.g., for the first layer of the communication) and the FMCW modulation scheme may be associated with a slope of an FMCW (e.g., for the second layer of the communication). As shown by reference number 1010, the communication (e.g., the communication described elsewhere herein, such as in connection with reference number 730, reference number 805, and/or reference number 905) may be associated with OOK modulation and cyclic shift-based FMCW modulation. For example, the keying modulation scheme may by the OOK modulation (e.g., for the first layer of the communication) and the FMCW modulation scheme may be associated with a cyclic shift of an FMCW (e.g., for the second layer of the communication).

For example, the communication may include an FMCW signal communicated via an OFDM channel. An FMCW signal may also be referred to as an "FMCW chirp." For example, the FMCW signals may be sampled at a reduced sampling rate as compared to OFDM signals and may be processed using time domain signal processing, such that the second network entity 710 may refrain from performing an FFT to process the FMCW signal. The first network entity 705 may generate an FMCW signal. In some examples, the first network entity 705 may generate the FMCW signal in an analog domain using a voltage controlled oscillator (VCO). The first network entity 705 may transmit the FMCW signal via the OFDM channel using at least one antenna element at the first network entity 705. In some aspects, the VCO and/or the at least one antenna element may be included in one or more communication interfaces or a processing system of the first network entity 705. The analog domain FMCW signal generated and transmitted by the first network entity 705 may be represented by $x_{RF,Tx}(t)$, shown in Equation 1.

$$x_{RF,Tx}(t) = \cos\left(2\pi\left(f_c + \frac{S}{2}t\right)t + \phi_{Tx}\right) \quad (1)$$

As shown in Equation 1, the FMCW signal may be a time-domain signal (e.g., a function of time (t)). In the example of Equation 1, $f_c$ may represent a starting frequency of the FMCW signal, S may represent a slope of the FMCW signal, and $\phi_{Tx}$ may represent a phase of the first network entity 705. The FMCW signal may be associated with a waveform signal transmitted via a symbol of the OFDM channel in the time domain and a bandwidth in the frequency domain. The bandwidth may include one or more resource blocks in the frequency domain. In some examples, each resource block may include a set of resource elements in the frequency domain. The OFDM channel may include one or more symbols in the time domain. A duration or length of each symbol may correspond to a length of an OFDM symbol, or a length of an OFDM symbol and a respective cyclic prefix duration, or a partial length of an OFDM symbol, or a partial length of an OFDM symbol and a respective cyclic prefix duration, or some other length longer than the length of the OFDM symbol and the length of the OFDM symbol and cyclic prefix duration, or some other symbol duration, or any combination thereof. The FMCW signal may span frequencies between the starting frequency and a sum of the starting frequency and the bandwidth (e.g., $\{f_c, f_c+BW\}$).

As shown in FIG. 10, a first layer of the communication may be modulated via OOK modulation (e.g., by varying the amplitude of the signal between two or more discrete amplitudes). For example, as shown by reference number 1015, the first layer of the communication may be modulated at a first amplitude level corresponding to first information (e.g., a single binary bit of "0" as shown in FIG. 10). The second layer of the communication may be modulated by generating an FMCW having a slope corresponding to second information (e.g., a binary value of "11" as shown in FIG. 10). For example, as shown by the dashed lines in FIG. 10, the FMCW modulation may be associated with (e.g., configured with) a set of candidate FMCW slopes. A first candidate slope may correspond to a first information state (e.g., a binary value of "11"), a second candidate slope may correspond to a second information state (e.g., a binary value of "10"), a third candidate slope may correspond to a third information state (e.g., a binary value of "01"), and a fourth candidate slope may correspond to a fourth information state (e.g., a binary value of "00"). As shown by reference number 1020, the second layer of the communication may be modulated such that the FMCW slope is the first candidate slope, thereby indicating the first information state (e.g., a binary value of "11"). As shown by reference numbers 1015 and 1020, an MSB of the communication be a binary value "0" and an LSB of the communication may be a binary value "11".

As shown by reference number 1025, the first layer of the communication may be modulated at a first amplitude level corresponding to first information (e.g., a single binary bit of "1" as shown in FIG. 10). As shown by reference number 1030, the second layer of the communication may be modulated by generating an FMCW having a slope corresponding to second information (e.g., a binary value of "01" as shown in FIG. 10). As shown by reference number 1030, the second layer of the communication may be modulated such that the FMCW slope is the third candidate slope, thereby indicating the first information state (e.g., a binary value of "01"). As shown by reference number 1025 and 1030, an MSB of the communication be a binary value "1" and an LSB of the communication may be a binary value "01." In other words, different amplitudes of the signal may indicate different information for the first layer (e.g., the MSB) and different FMCW slopes may indicate different information for the second layer (e.g., the LSB) of the communication.

As shown by reference number 1010, the first layer of the communication may be modulated using OOK modulation and the second layer of the communication may be modulated using cyclic shift-based FMCW modulation. For example, the FMCW modulation may be associated with a cyclic shift of the FMCW. For example, different cyclic shifts applied to the FMCW may correspond to respective information states. For example, a first candidate cyclic shift may correspond to a first information state (e.g., a binary value of "11"), a second candidate cyclic shift may correspond to a second information state (e.g., a binary value of "10"), a third candidate cyclic shift may correspond to a third information state (e.g., a binary value of "01"), and a fourth candidate cyclic shift may correspond to a fourth information state (e.g., a binary value of "00"). The FMCW signals may be associated with the same slope, but the first network entity 705 may apply different cyclic shifts to indicate different information states. For example, as shown by reference number 1035, the first layer of the communication may be modulated at a first amplitude level corresponding to first information (e.g., a single binary bit of "0" as shown in FIG. 10). As shown by reference number 1040, the second layer of the communication may be modulated by generating an FMCW having a cyclic shift (e.g., the fourth candidate cyclic shift) corresponding to second information (e.g., a binary value of "00" as shown in FIG. 10). For example, the first network entity 705 may apply the cyclic shift (e.g., the fourth candidate cyclic shift) to the FMCW signal to indicate the second information (e.g., a binary value of "00" as shown in FIG. 10). For example, as shown by reference numbers 1035 and 1040, the MSB of the communication may be a binary value "0" and the LSB of the communication may be a binary value "00."

As shown by reference number 1045, the first layer of the communication may be modulated at a first amplitude level corresponding to first information (e.g., a single binary bit of "1" as shown in FIG. 10). As shown by reference number 1050, the second layer of the communication may be modulated by generating an FMCW having a cyclic shift (e.g., the first candidate cyclic shift) corresponding to second information (e.g., a binary value of "11" as shown in FIG. 10). For example, the first network entity 705 may apply the cyclic shift (e.g., the first candidate cyclic shift) to the FMCW signal to indicate the second information (e.g., a binary value of "11" as shown in FIG. 10). For example, as shown by reference numbers 1045 and 1050, the MSB of the communication may be a binary value "1" and the LSB of the communication may be a binary value "11." In other words, different amplitudes of the signal may indicate different information for the first layer (e.g., the MSB) and different applied FMCW cyclic shifts may indicate different information for the second layer (e.g., the LSB) of the communication.

As indicated above, FIG. 10 is provided as an example. Other examples may differ from what is described with regard to FIG. 10.

FIG. 11 is a diagram of an example 1100 associated with an FSK modulated and FMCW modulated communication, in accordance with the present disclosure.

For example, as shown by reference number 1105, the communication (e.g., the communication described elsewhere herein, such as in connection with reference number 730, reference number 805, and/or reference number 905) may be associated with FSK modulation and slope-based FMCW modulation. For example, the keying modulation scheme may by the FSK modulation (e.g., for the first layer of the communication) and the FMCW modulation scheme may be associated with a slope of an FMCW (e.g., for the second layer of the communication). As shown by reference number 1110, the communication (e.g., the communication described elsewhere herein, such as in connection with reference number 730, reference number 805, and/or reference number 905) may be associated with FSK modulation and cyclic shift-based FMCW modulation. For example, the keying modulation scheme may by the FSK modulation (e.g., for the first layer of the communication) and the FMCW modulation scheme may be associated with a cyclic shift of an FMCW (e.g., for the second layer of the communication).

As shown in FIG. 11, a first layer of the communication may be modulated via FSK modulation (e.g., by varying the frequency of the signal between two or more discrete frequencies or frequency ranges). For example, as shown by reference number 1115, the first layer of the communication may be modulated to cause the signal to have a first frequency or be within a first frequency range that corresponds to first information (e.g., a single binary bit of "0" as shown in FIG. 11). The second layer of the communication may be modulated by generating an FMCW having a slope corresponding to second information (e.g., a binary value of "11" as shown in FIG. 11). For example, the FMCW signal may be within the first frequency range that corresponds to first information and the FMCW signal may have the slope that corresponds to the second information. For example, the MSB of the communication may be a binary value "0" (e.g., as indicated via the FSK modulation) and the LSB of the communication may be a binary value "11" (e.g., as indicated via the slope of the FMCW signal).

As shown by reference number 1120, the first layer of the communication may be modulated to cause the signal to have a second frequency or be within a second frequency range that corresponds to information (e.g., a single binary bit of "1" as shown in FIG. 11). The second layer of the communication may be modulated by generating an FMCW having a slope corresponding to information (e.g., a binary value of "01" as shown in FIG. 11). For example, the FMCW signal may be within the second frequency range that corresponds to first information and the FMCW signal may have the slope that corresponds to second information. For example, the MSB of the communication may be a binary value "1" (e.g., as indicated via the FSK modulation) and the LSB of the communication may be a binary value "01" (e.g., as indicated via the slope of the FMCW signal). In other words, different frequencies and/or frequency ranges of the signal may indicate first information for a first layer and/or an MSB of the communication. Different slopes of an FMCW signal may indicate second information for a second layer and/or an LSB of the communication.

As shown by reference number 1125, the first layer of the communication may be modulated to cause the signal to have a first frequency or be within a first frequency range that corresponds to first information (e.g., a single binary bit of "0" as shown in FIG. 11). The second layer of the communication may be modulated by generating an FMCW having a cyclic shift corresponding to second information (e.g., a binary value of "00" as shown in FIG. 11). For example, the FMCW signal may be within the first frequency range that corresponds to first information and the FMCW signal may an applied cyclic shift that corresponds to the second information. For example, the MSB of the communication may be a binary value "0" (e.g., as indicated via the FSK modulation) and the LSB of the communication may be a binary value "00" (e.g., as indicated via the cyclic shift of the FMCW signal). As shown by reference number 1130, the first layer of the communication may be modulated to cause the signal to have a second frequency or be within a second frequency range that corresponds to information (e.g., a single binary bit of "1" as shown in FIG. 11). The second layer of the communication may be modulated by generating an FMCW having a cyclic shift corresponding to information (e.g., a binary value of "11" as shown in FIG. 11). For example, the FMCW signal may be within the second frequency range that corresponds to first information and the FMCW signal may have the cyclic shift that corresponds to second information. For example, the MSB of the communication may be a binary value "1" (e.g., as indicated via the FSK modulation) and the LSB of the communication may be a binary value "11" (e.g., as indicated via the cyclic shift of the FMCW signal). In other words, different frequencies and/or frequency ranges of the signal may indicate first information for a first layer and/or an MSB of the communication. Different applied cyclic shifts of an FMCW signal may indicate second information for a second layer and/or an LSB of the communication.

As indicated above, FIG. 11 is provided as an example. Other examples may differ from what is described with regard to FIG. 11.

Figure 12:
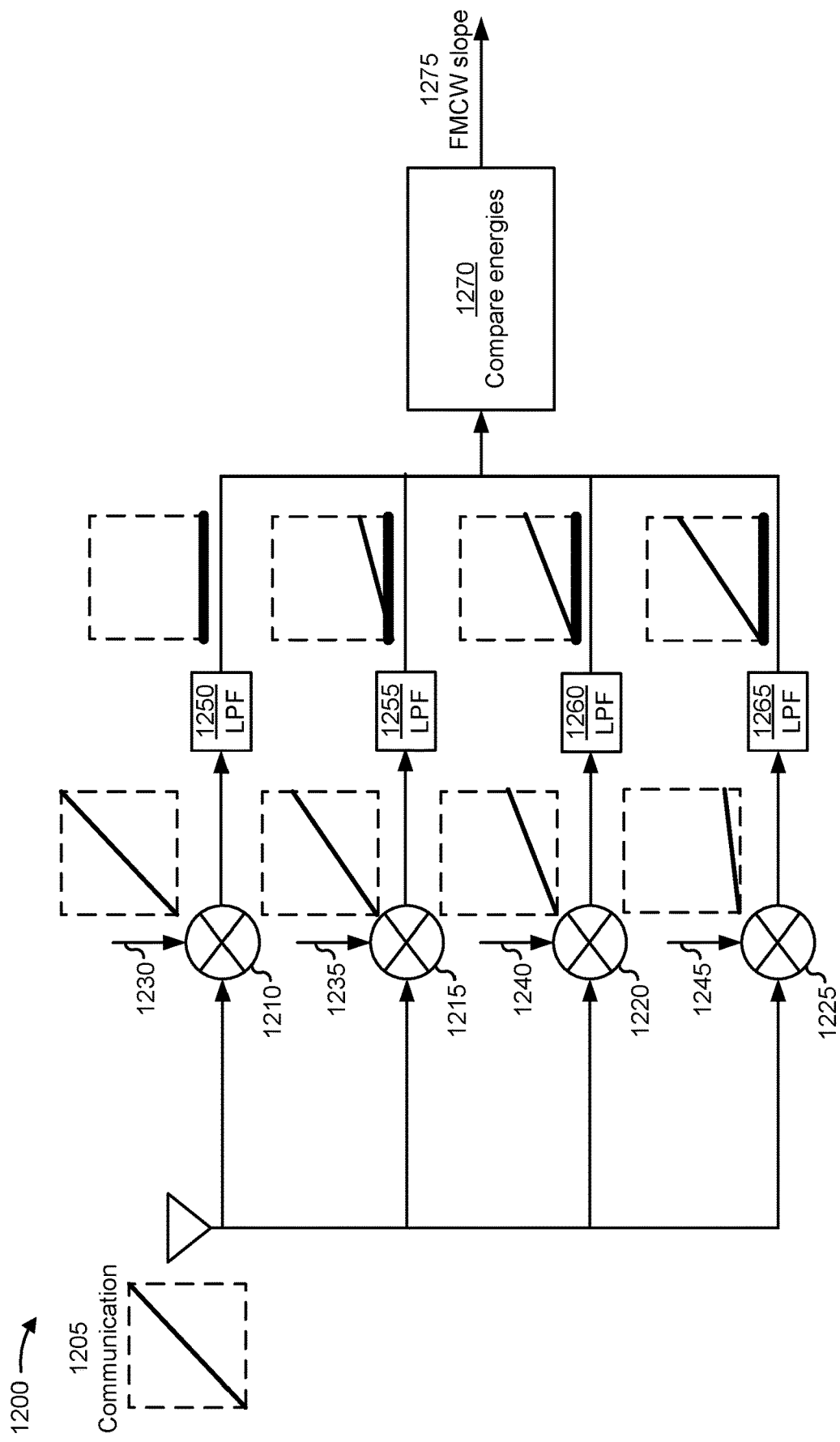
FIG. 12 is a diagram of an example associated with demodulating a slope-based FMCW modulated communication, in accordance with the present disclosure.

FIG. 12 is a diagram of an example 1200 associated with demodulating a slope-based FMCW modulated communication, in accordance with the present disclosure. For example, the second network entity 710 described elsewhere herein may include one or more components described herein and/or may perform one or more operations described herein to detect, decode, and/or demodulate a signal (e.g., a layer) that is modulated via slope-based FMCW modulation. The component(s) depicted and/or described herein may be included in an FMCW receiver of a network entity (e.g., the second network entity 710).

As shown in FIG. 12, the network entity may receive a communication 1205. For example, the network entity may receive the communication via an analog receiver. The communication 1205 may include a layer that is modulated using slope-based FMCW modulation. For example, the communication 1205 may include an FMCW having a given slope. As shown in FIG. 12, the network entity may include a set of mixers (e.g., a first mixer 1210, a second mixer 1215, a third mixer 1220, and a fourth mixer 1225). A quantity of mixers may be based on a supported modulation order for the slope-based FMCW modulation. For example, if the supported modulation order is four, then the network entity may include four mixers (e.g., as shown in FIG. 12). If the supported modulation order is eight, then the network entity may include eight mixers.

The communication 1205 may be provided to (e.g., passed to) each mixer from the set of mixers. The set of mixers may be associated with respective candidate slopes. For example, a first candidate slope 1230 (e.g., a locally generated FMCW signal having the first candidate slope 1230) may be provided to the first mixer 1210. A second candidate slope 1235 (e.g., a locally generated FMCW signal having the second candidate slope 1235) may be provided to the second mixer 1215. A third candidate slope 1240 (e.g., a locally generated FMCW signal having the third candidate slope 1240) may be provided to the third mixer 1220. A fourth candidate slope 1245 (e.g., a locally generated FMCW signal having the fourth candidate slope 1245) may be provided to the fourth mixer 1225. The outputs of the set of mixers may be provided to respective low-pass filters (LPFs) (e.g., shown as an LPF 1250, an LPF 1255, an LPF 1260, and an LPF 1265 in FIG. 12 as an example). The outputs of the LPFs may indicate frequency domain energy differences between the received communication (e.g., the communication 1205) and the respective candidate slopes. For example, because the first candidate slope 1230 may be similar to the slope of the communication 1205, the output of the LPF 1250 may indicate that the received communication (e.g., the communication 1205) is similar to an energy detection level of the first candidate slope 1230. Conversely, because the fourth candidate slope 1245 is not similar to the slope of the communication 1205, the output of the LPF 1265 may indicate that the received communication (e.g., the communication 1205) is outside of an energy detection level (e.g., in the frequency domain) of the fourth candidate slope 1245.

As shown by reference number 1270, the network entity may compare energies of outputs of the LPFs. For example, the network entity may determine when output indicates that the received communication (e.g., the communication 1205) is within the energy detection level (e.g., in the frequency domain) of a given candidate slope. As shown by reference number 1275, the network entity may determine the FMCW slope of the communication 1205 based on determining the given candidate slope (e.g., from the energy comparisons). For example, the network entity may combine the communication 1205 with respective signals associated with a set of one or more candidate slopes resulting in one or more combined signals (e.g., where the one or more combined signals are the outputs of the mixers and/or the LPFs). The network entity may determine a slope, from the set of one or more candidate slopes, based on energy levels of received combined signals from the one or more combined signals. As described elsewhere herein, the determined slope may indicate information (e.g., may be mapped to an information state, such as a binary value).

As indicated above, FIG. 12 is provided as an example. Other examples may differ from what is described with regard to FIG. 12.

Figure 13:
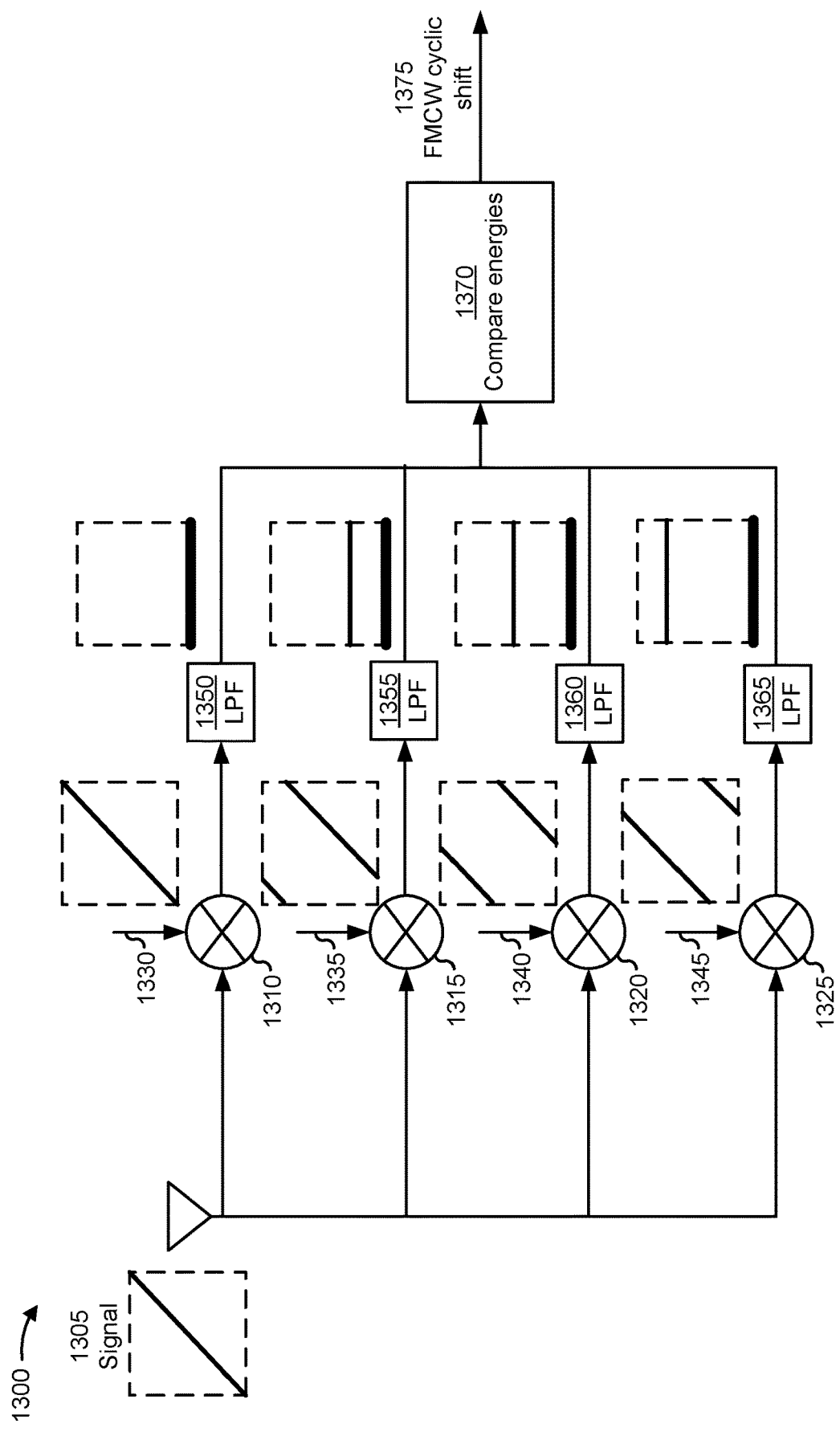
FIG. 13 is a diagram of an example associated with demodulating a cyclic shift-based FMCW modulated communication, in accordance with the present disclosure.

FIG. 13 is a diagram of an example 1300 associated with demodulating a cyclic shift-based FMCW modulated communication, in accordance with the present disclosure. For example, the second network entity 710 described elsewhere herein may include one or more components described herein and/or may perform one or more operations described herein to detect, decode, and/or demodulate a signal (e.g., a layer) that is modulated via cyclic shift-based FMCW modulation. The component(s) depicted and/or described herein may be included in an FMCW receiver of a network entity (e.g., the second network entity 710).

As shown in FIG. 13, the network entity may receive a communication 1305. For example, the network entity may receive the communication via an analog receiver. The communication 1305 may include a layer that is modulated using cyclic shift-based FMCW modulation. For example, the communication 1305 may include an FMCW having a given cyclic shift. As shown in FIG. 13, the network entity may include a set of mixers (e.g., a first mixer 1310, a second mixer 1315, a third mixer 1320, and a fourth mixer 1325). A quantity of mixers may be based on a supported modulation order for the cyclic shift-based FMCW modulation. For example, if the supported modulation order is four, then the network entity may include four mixers (e.g., as shown in FIG. 13). If the supported modulation order is eight, then the network entity may include eight mixers.

The communication 1305 may be provided to (e.g., passed to) each mixer from the set of mixers. The set of mixers may be associated with respective candidate cyclic shifts. For example, a first candidate cyclic shift 1330 (e.g., a locally generated FMCW signal having the first candidate cyclic shift 1330) may be provided to the first mixer 1310. A second candidate cyclic shift 1335 (e.g., a locally generated FMCW signal having the second candidate cyclic shift 1335) may be provided to the second mixer 1315. A third candidate cyclic shift 1340 (e.g., a locally generated FMCW signal having the third candidate cyclic shift 1340) may be provided to the third mixer 1320. A fourth candidate cyclic shift 1345 (e.g., a locally generated FMCW signal having the fourth candidate cyclic shift 1345) may be provided to the fourth mixer 1325. The outputs of the set of mixers may be provided to respective low-pass filters (LPFs) (e.g., shown as an LPF 1350, an LPF 1355, an LPF 1360, and an LPF 1365 in FIG. 13 as an example). The outputs of the LPFs may indicate frequency domain energy differences between the received communication (e.g., the communication 1305) and the respective candidate cyclic shifts. For example, because the first candidate cyclic shift 1330 may be similar to the cyclic shift of the communication 1305, the output of the LPF 1350 may indicate that the received communication (e.g., the communication 1305) is similar to an energy detection level of the first candidate cyclic shift 1330. Conversely, because the fourth candidate cyclic shift 1345 is not similar to the cyclic shift of the communication 1305, the output of the LPF 1365 may indicate that the received communication (e.g., the communication 1305) is outside of an energy detection level (e.g., in the frequency domain) of the fourth candidate cyclic shift 1345.

As shown by reference number 1370, the network entity may compare energies of outputs of the LPFs. For example, the network entity may determine when output indicates that the received communication (e.g., the communication 1305) is within the energy detection level (e.g., in the frequency domain) of a given candidate cyclic shift. As shown by reference number 1375, the network entity may determine the FMCW cyclic shift of the communication 1305 based on determining the given candidate cyclic shift (e.g., from the energy comparisons). For example, the network entity may combine the communication 1305 with respective signals associated with a set of one or more candidate cyclic shifts resulting in one or more combined signals (e.g., where the one or more combined signals are the outputs of the mixers and/or the LPFs). The network entity may determine a cyclic shift, from the set of one or more candidate cyclic shifts, based on energy levels of received combined signals from the one or more combined signals. As described elsewhere herein, the determined cyclic shift may indicate information (e.g., may be mapped to an information state, such as a binary value).

As indicated above, FIG. 13 is provided as an example. Other examples may differ from what is described with regard to FIG. 13.

Figure 14:
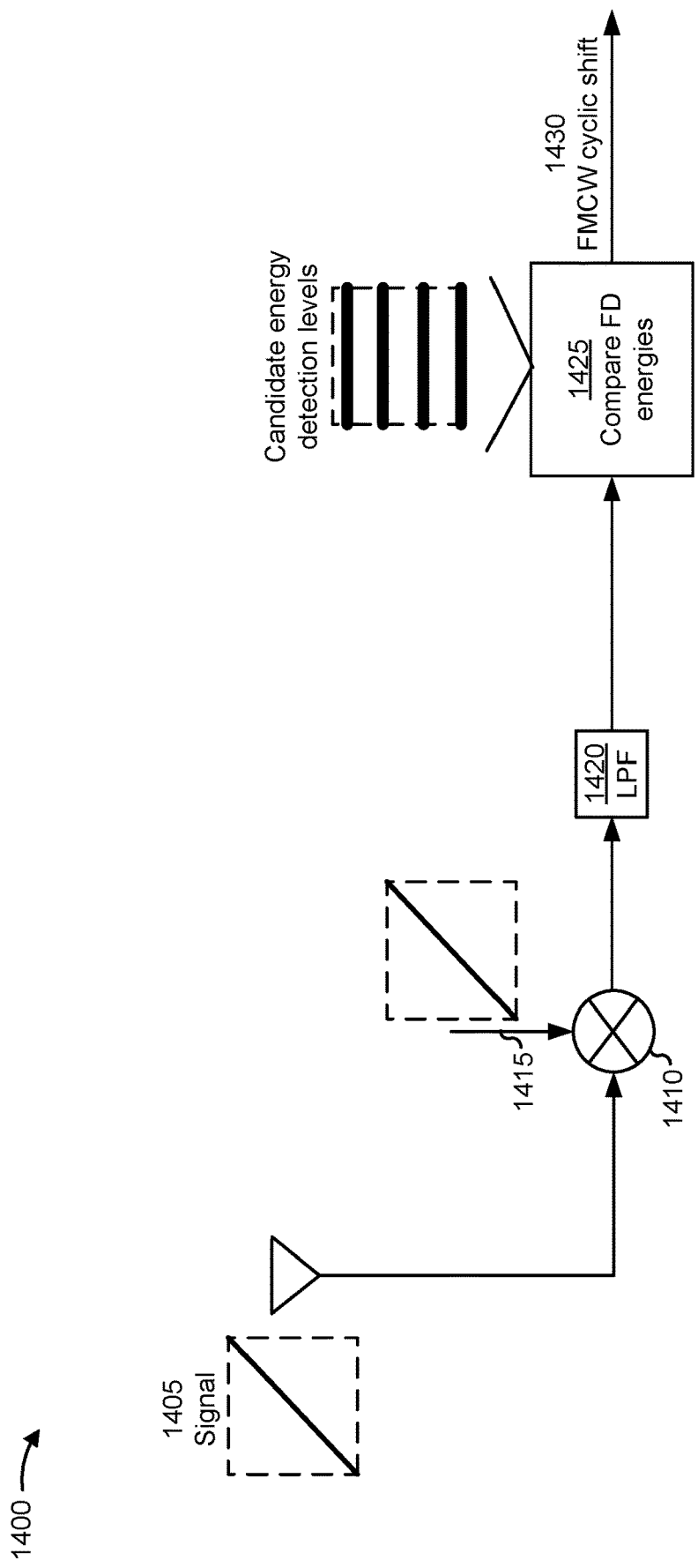
FIG. 14 is a diagram of an example associated with demodulating a cyclic shift-based FMCW modulated communication, in accordance with the present disclosure.

FIG. 14 is a diagram of an example 1400 associated with demodulating a cyclic shift-based FMCW modulated communication, in accordance with the present disclosure. For example, the second network entity 710 described elsewhere herein may include one or more components described herein and/or may perform one or more operations described herein to detect, decode, and/or demodulate a signal (e.g., a layer) that is modulated via cyclic shift-based FMCW modulation. The component(s) depicted and/or described herein may be included in an FMCW receiver of a network entity (e.g., the second network entity 710).

As shown in FIG. 14, the network entity may receive a communication 1405. For example, the network entity may receive the communication via an analog receiver. The communication 1405 may include a layer that is modulated using cyclic shift-based FMCW modulation. For example, the communication 1405 may include an FMCW having a given cyclic shift. The network entity may include a single mixer (e.g., a mixer 1410) associated with detecting, decoding, and/or demodulating signals that are modulated via cyclic shift-based FMCW modulation.

The communication 1405 may be provided to (e.g., passed to) the mixer 1410. A cyclic shift input 1415 may be provided to the mixer 1410. The cyclic shift input 1415 may be a locally generated FMCW signal having a given cyclic shift. The given cyclic shift may be no cyclic shift. For example, the cyclic shift input 1415 may be an FMCW signal that is not cyclic shifted. The output of the mixer 1410 may be provided to an LPF 1420. The output of the LPF 1420 may indicate an energy level at a given frequency. As shown by reference number 1425, the network entity may compare the frequency domain (FD) energy level of the output of the LPF 1420 to a set of candidate energy detection levels. For example, the set of candidate energy detection levels may be associated with respective candidate cyclic shifts.

As shown by reference number 1430, the network entity may determine the FMCW cyclic shift based on the largest overlap between a FD energy level of the output of the LPF 1420 and a candidate energy detection level from the set of candidate energy detection levels. The network entity may determine an FMCW slope of a received communication using a single mixer in a similar manner as described above. For example, the network entity may combine the communication 1405 with a signal associated with a candidate cyclic shift (e.g., the cyclic shift input 1415), resulting in a combined signal. The network entity may compare an energy level of the combined signal to one or more candidate energy levels associated with respective candidate cyclic shifts from a set of one or more candidate cyclic shifts. The network entity may determine a cyclic shift, from the set of one or more candidate cyclic shifts, based on comparing the energy level to the one or more candidate energy levels.

As indicated above, FIG. 14 is provided as an example. Other examples may differ from what is described with regard to FIG. 14.

Figure 15:
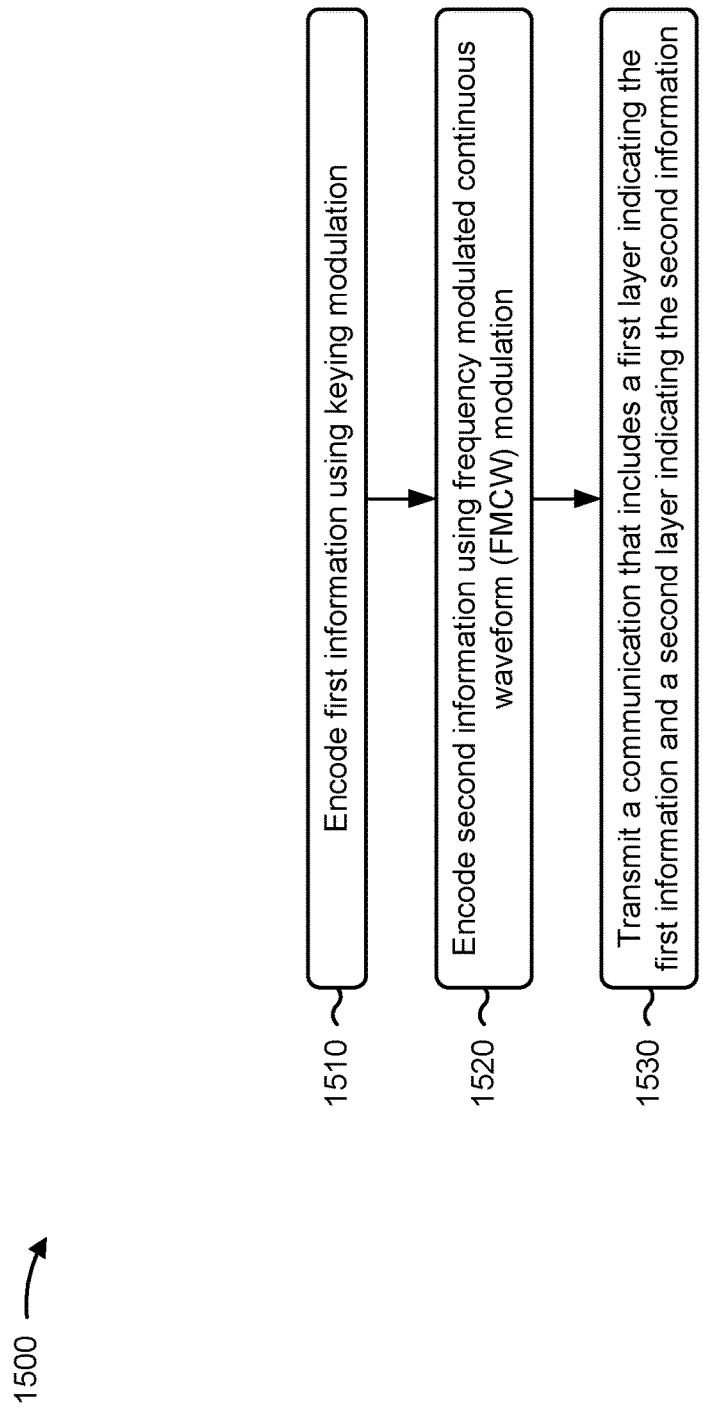
FIG. 15 is a diagram illustrating an example process performed, for example, at a first network entity or an apparatus of a first network entity, in accordance with the present disclosure.

FIG. 15 is a diagram illustrating an example process 1500 performed, for example, at a first network entity or an apparatus of a first network entity, in accordance with the present disclosure. Example process 1500 is an example where the apparatus or the first network entity (e.g., the network entity 102, the network entity 104, the apparatus 200, the network node 310, the UE 320, the network entity 402, the network entity 404, and/or the first network entity 705) performs operations associated with layered modulation communication.

As shown in FIG. 15, in some aspects, process 1500 may include encoding first information using keying modulation (block 1510). For example, the first network entity (e.g., using communication manager 1708 and/or encoding component 1710, depicted in FIG. 17) may encode first information using keying modulation, as described above.

As further shown in FIG. 15, in some aspects, process 1500 may include encoding second information using FMCW modulation (block 1520). For example, the first network entity (e.g., using communication manager 1708 and/or encoding component 1710, depicted in FIG. 17) may encode second information using FMCW modulation, as described above.

As further shown in FIG. 15, in some aspects, process 1500 may include transmitting a communication that includes a first layer indicating the first information and a second layer indicating the second information (block 1530). For example, the first network entity (e.g., using communication manager 1708 and/or transmission component 1704, depicted in FIG. 17) may transmit a communication that includes a first layer indicating the first information and a second layer indicating the second information, as described above.

Process 1500 may include additional aspects, such as any single aspect or any combination of aspects described below and/or in connection with one or more other processes described elsewhere herein.

In a first aspect, the first information includes one or more MSBs of the communication and the second information includes one or more LSBs of the communication.

In a second aspect, alone or in combination with the first aspect, the keying modulation is on-off keying modulation and the FMCW modulation is associated with a slope of an FMCW.

In a third aspect, alone or in combination with one or more of the first and second aspects, the keying modulation is on-off keying modulation and the FMCW modulation is associated with a cyclic shift of an FMCW.

In a fourth aspect, alone or in combination with one or more of the first through third aspects, the keying modulation is frequency-shift keying modulation and the FMCW modulation is associated with a slope of an FMCW.

In a fifth aspect, alone or in combination with one or more of the first through fourth aspects, the keying modulation is frequency-shift keying modulation and the FMCW modulation is associated with a cyclic shift of an FMCW.

In a sixth aspect, alone or in combination with one or more of the first through fifth aspects, the communication includes a wakeup signal.

In a seventh aspect, alone or in combination with one or more of the first through sixth aspects, the first information is intended for a set of one or more network entities, and wherein the second information is intended for a second network entity included in the set of one or more network entities.

In an eighth aspect, alone or in combination with one or more of the first through seventh aspects, the set of one or more network entities includes a plurality of network entities, and the second network entity is included in the plurality of network entities.

In a ninth aspect, alone or in combination with one or more of the first through eighth aspects, the first information includes group-common information, and wherein the second information includes entity-specific information.

In a tenth aspect, alone or in combination with one or more of the first through ninth aspects, the group-common information includes information that is applicable to a plurality of network entities, and the entity-specific information includes information that is applicable to a single network entity.

In an eleventh aspect, alone or in combination with one or more of the first through tenth aspects, the first information indicates that the first network entity has one or more communications to transmit to at least one network entity included in a set of one or more network entities, and wherein the second information includes information indicative of the at least one network entity.

In a twelfth aspect, alone or in combination with one or more of the first through eleventh aspects, process 1500 includes receiving a capability report indicating that a second network entity supports at least one of the keying modulation or the FMCW modulation.

In a thirteenth aspect, alone or in combination with one or more of the first through twelfth aspects, process 1500 includes receiving a capability report indicating that a second network entity supports the keying modulation and does not support the FMCW modulation, and wherein the first information is intended for the second network entity based on the second network entity supporting the keying modulation and the second information is not intended for the second network entity based on the second network entity not supporting the FMCW modulation.

In a fourteenth aspect, alone or in combination with one or more of the first through thirteenth aspects, process 1500 includes receiving a capability report indicating that a second network entity supports both the keying modulation and the FMCW modulation, and wherein the second information is intended for the second network entity based on the second network entity supporting both the keying modulation and the FMCW modulation.

In a fifteenth aspect, alone or in combination with one or more of the first through fourteenth aspects, process 1500 includes receiving a capability report indicating that a second network entity supports at least one of a first modulation order for the keying modulation or a second modulation order for the FMCW modulation.

In a sixteenth aspect, alone or in combination with one or more of the first through fifteenth aspects, the first information is intended for the second network entity, and wherein a size of the first information is based on the first modulation order.

In a seventeenth aspect, alone or in combination with one or more of the first through sixteenth aspects, the second information is intended for the second network entity, and wherein a size of the second information is based on the second modulation order.

In an eighteenth aspect, alone or in combination with one or more of the first through seventeenth aspects, the communication is a broadcast communication, a groupcast communication, or a multicast communication.

In a nineteenth aspect, alone or in combination with one or more of the first through eighteenth aspects, the first information is indicative of a first message and the second information is indicative of a second message.

In a twentieth aspect, alone or in combination with one or more of the first through nineteenth aspects, the first information is indicative of a first type of message and the second information is indicative of a second type of message.

In a twenty-first aspect, alone or in combination with one or more of the first through twentieth aspects, the first information is indicative of a control communication and the second information is indicative of a data communication.

In a twenty-second aspect, alone or in combination with one or more of the first through twenty-first aspects, the first information is indicative of a control communication and the second information is indicative of a reference signal.

In a twenty-third aspect, alone or in combination with one or more of the first through twenty-second aspects, the first layer includes a first data stream and the second layer includes a second data stream.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
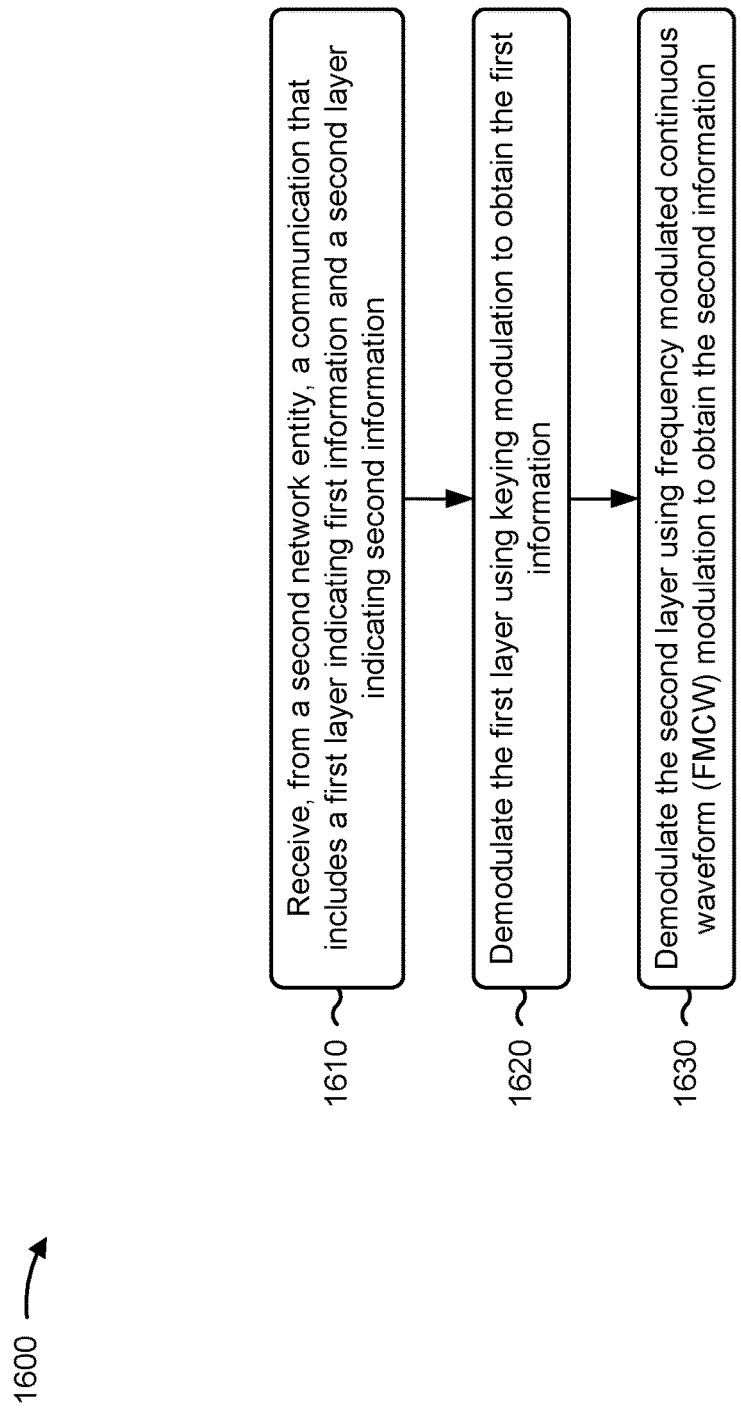
FIG. 16 is a diagram illustrating an example process performed, for example, at a first network entity or an apparatus of a first network entity, in accordance with the present disclosure.

FIG. 16 is a diagram illustrating an example process 1600 performed, for example, at a first network entity or an apparatus of a first network entity, in accordance with the present disclosure. Example process 1600 is an example where the apparatus or the first network entity (e.g., the network entity 102, the network entity 104, the apparatus 200, the UE 320, the network entity 404, and/or the second network entity 710) performs operations associated with layered modulation communication.

As shown in FIG. 16, in some aspects, process 1600 may include receiving, from a second network entity, a communication that includes a first layer indicating first information and a second layer indicating second information (block 1610). For example, the first network entity (e.g., using communication manager 1808 and/or reception component 1802, depicted in FIG. 18) may receive, from a second network entity, a communication that includes a first layer indicating first information and a second layer indicating second information, as described above.

As further shown in FIG. 16, in some aspects, process 1600 may include demodulating the first layer using keying modulation to obtain the first information (block 1620). For example, the first network entity (e.g., using communication manager 1808 and/or demodulation component 1810, depicted in FIG. 18) may demodulate the first layer using keying modulation to obtain the first information, as described above.

As further shown in FIG. 16, in some aspects, process 1600 may include demodulating the second layer using FMCW modulation to obtain the second information (block 1630). For example, the first network entity (e.g., using communication manager 1808 and/or demodulation component 1810, depicted in FIG. 18) may demodulate the second layer using FMCW modulation to obtain the second information, as described above.

Process 1600 may include additional aspects, such as any single aspect or any combination of aspects described below and/or in connection with one or more other processes described elsewhere herein.

In a first aspect, the first information includes one or more MSBs of the communication and the second information includes one or more LSBs of the communication.

In a second aspect, alone or in combination with the first aspect, the keying modulation is on-off keying modulation and the FMCW modulation is associated with a slope of an FMCW.

In a third aspect, alone or in combination with one or more of the first and second aspects, the keying modulation is on-off keying modulation and the FMCW modulation is associated with a cyclic shift of an FMCW.

In a fourth aspect, alone or in combination with one or more of the first through third aspects, the keying modulation is frequency-shift keying modulation and the FMCW modulation is associated with a slope of an FMCW.

In a fifth aspect, alone or in combination with one or more of the first through fourth aspects, the keying modulation is frequency-shift keying modulation and the FMCW modulation is associated with a cyclic shift of an FMCW.

In a sixth aspect, alone or in combination with one or more of the first through fifth aspects, the communication includes a wakeup signal.

In a seventh aspect, alone or in combination with one or more of the first through sixth aspects, the first information is intended for a set of one or more network entities including the first network entity, and wherein the second information is intended for the first network entity.

In an eighth aspect, alone or in combination with one or more of the first through seventh aspects, the set of one or more network entities includes a plurality of network entities, and the first network entity is included in the plurality of network entities.

In a ninth aspect, alone or in combination with one or more of the first through eighth aspects, the first information includes group-common information, and wherein the second information includes entity-specific information.

In a tenth aspect, alone or in combination with one or more of the first through ninth aspects, the group-common information includes information that is applicable to a plurality of network entities including the first network entity, and the entity-specific information includes information that is applicable to only the first network entity.

In an eleventh aspect, alone or in combination with one or more of the first through tenth aspects, the first information indicates that the second network entity has one or more communications to transmit to at least one network entity included in a set of one or more network entities, and wherein the second information includes information indicative of the at least one network entity being the first network entity.

In a twelfth aspect, alone or in combination with one or more of the first through eleventh aspects, the FMCW modulation is associated with slopes of an FMCW, and wherein demodulating the second layer includes combining the communication with respective signals associated with a set of one or more candidate slopes resulting in one or more combined signals, and determining a slope, from the set of one or more candidate slopes, based on energy levels of received combined signals from the one or more combined signals, wherein the slope indicates the second information.

In a thirteenth aspect, alone or in combination with one or more of the first through twelfth aspects, the FMCW modulation is associated with cyclic shifts of an FMCW, and wherein demodulating the second layer includes combining the communication with respective signals associated with a set of one or more candidate cyclic shifts resulting in one or more combined signals, and determining a cyclic shift, from the set of one or more candidate cyclic shifts, based on energy levels of received combined signals from the one or more combined signals, wherein the cyclic shift indicates the second information.

In a fourteenth aspect, alone or in combination with one or more of the first through thirteenth aspects, the FMCW modulation is associated with cyclic shifts of an FMCW, and wherein demodulating the second layer includes combining the communication with a signal associated with a candidate cyclic shift, resulting in a combined signal, comparing an energy level of the combined signal to one or more candidate energy levels associated with respective candidate cyclic shifts from a set of one or more candidate cyclic shifts, and determining a cyclic shift, from the set of one or more candidate cyclic shifts, based on comparing the energy level to the one or more candidate energy levels.

In a fifteenth aspect, alone or in combination with one or more of the first through fourteenth aspects, process 1600 includes transmitting a capability report indicating that the first network entity supports at least one of the keying modulation or the FMCW modulation.

In a sixteenth aspect, alone or in combination with one or more of the first through fifteenth aspects, process 1600 includes transmitting a capability report indicating that the first network entity supports at least one of a first modulation order for the keying modulation or a second modulation order for the FMCW modulation.

In a seventeenth aspect, alone or in combination with one or more of the first through sixteenth aspects, a size of the first information is based on the first modulation order.

In an eighteenth aspect, alone or in combination with one or more of the first through seventeenth aspects, a size of the second information is based on the second modulation order.

In a nineteenth aspect, alone or in combination with one or more of the first through eighteenth aspects, the communication is a broadcast communication, a groupcast communication, or a multicast communication.

In a twentieth aspect, alone or in combination with one or more of the first through nineteenth aspects, the first information is indicative of a first message and the second information is indicative of a second message.

In a twenty-first aspect, alone or in combination with one or more of the first through twentieth aspects, the first information is indicative of a first type of message and the second information is indicative of a second type of message.

In a twenty-second aspect, alone or in combination with one or more of the first through twenty-first aspects, the first information is indicative of a control communication and the second information is indicative of a data communication.

In a twenty-third aspect, alone or in combination with one or more of the first through twenty-second aspects, demodulating the second layer includes demodulating the first layer to obtain the control communication, and demodulating, based on the control communication, the second layer to obtain the data communication.

In a twenty-fourth aspect, alone or in combination with one or more of the first through twenty-third aspects, the first information is indicative of a control communication and the second information is indicative of a reference signal.

In a twenty-fifth aspect, alone or in combination with one or more of the first through twenty-fourth aspects, the first layer includes a first data stream and the second layer includes a second data stream.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
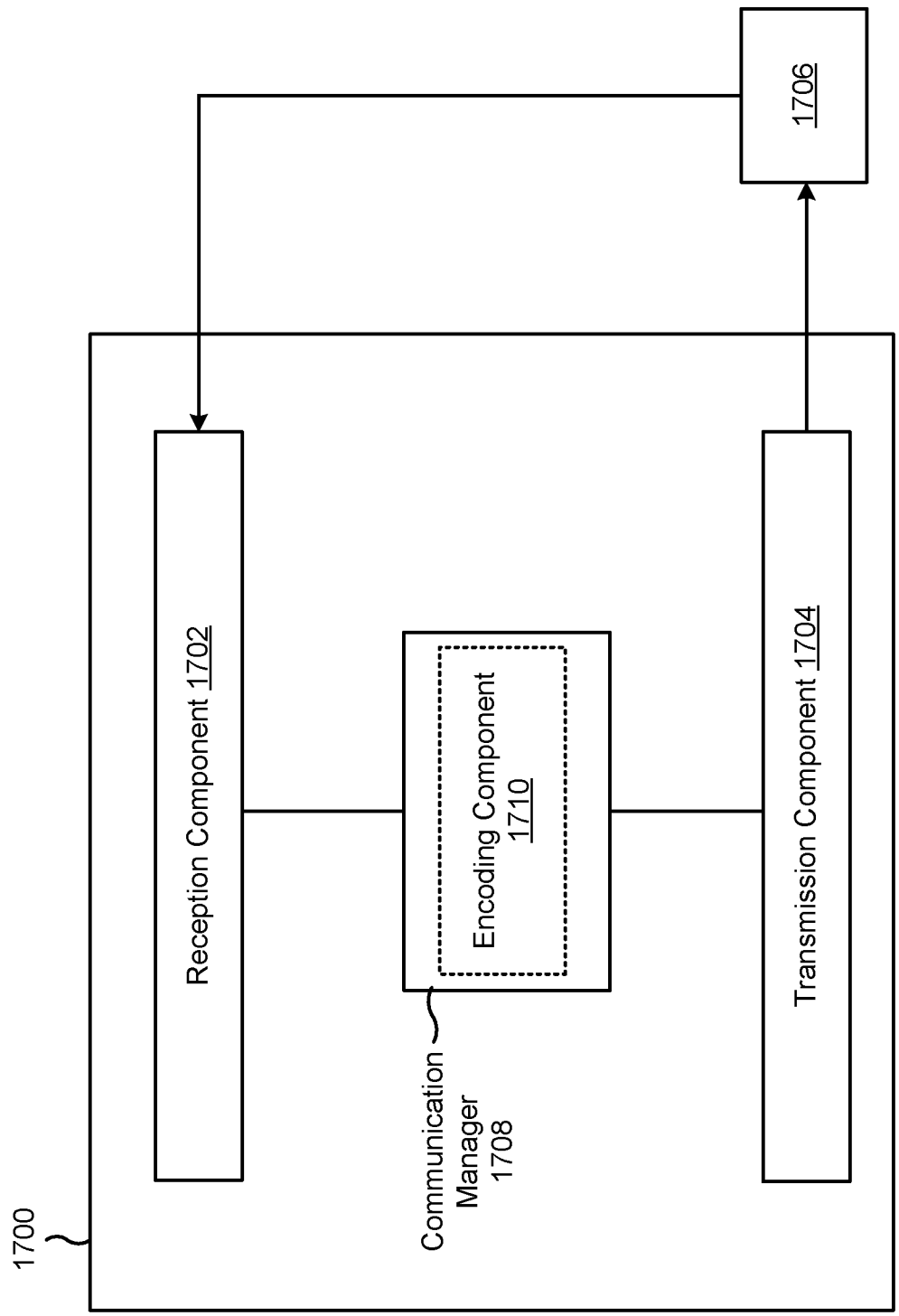
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a network entity, or a network entity may include the apparatus 1700. In some aspects, the apparatus 1700 may be, or may include, a processing system of the network entity. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 1708. The communication manager 1708 may be, or may be similar to, other communication managers described herein. The communication manager 1708 may include an encoding component 1710, among other examples.

In some aspects, the apparatus 1700 may be configured to perform one or more operations described herein in connection with FIGS. 7-14. Additionally, or alternatively, the apparatus 1700 may be configured to perform one or more processes described herein, such as process 1500 of FIG. 15, or a combination thereof. In some aspects, the apparatus 1700 and/or one or more components shown in FIG. 17 may include one or more components of the network entity described in connection with FIG. 2 and/or FIG. 4. Additionally, or alternatively, one or more components shown in FIG. 17 may be implemented within one or more components described in connection with FIG. 2 and/or FIG. 4. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, one or more modems, one or more demodulators, one or more MIMO detectors, one or more receive processors, one or more controllers/processors, one or more memories, or a combination thereof, of the network entity described in connection with FIG. 2 and/or FIG. 4.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, one or more modems, one or more modulators, one or more transmit MIMO processors, one or more transmit processors, one or more controllers/ processors, one or more memories, or a combination thereof, of the network entity described in connection with FIG. 2 and/or FIG. 4. In some aspects, the transmission component 1704 may be co-located with the reception component 1702 in one or more transceivers.

The encoding component 1710 may encode first information using keying modulation. The encoding component 1710 may encode second information using FMCW modulation. The transmission component 1704 may transmit a communication that includes a first layer indicating the first information and a second layer indicating the second information.

The reception component 1702 may receive a capability report indicating that a second network entity supports at least one of the keying modulation or the FMCW modulation. The reception component 1702 may receive a capability report indicating that a second network entity supports the keying modulation and does not support the FMCW modulation.

The reception component 1702 may receive a capability report indicating that a second network entity supports both the keying modulation and the FMCW modulation.

The reception component 1702 may receive a capability report indicating that a second network entity supports at least one of a first modulation order for the keying modulation or a second modulation order for the FMCW modulation.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
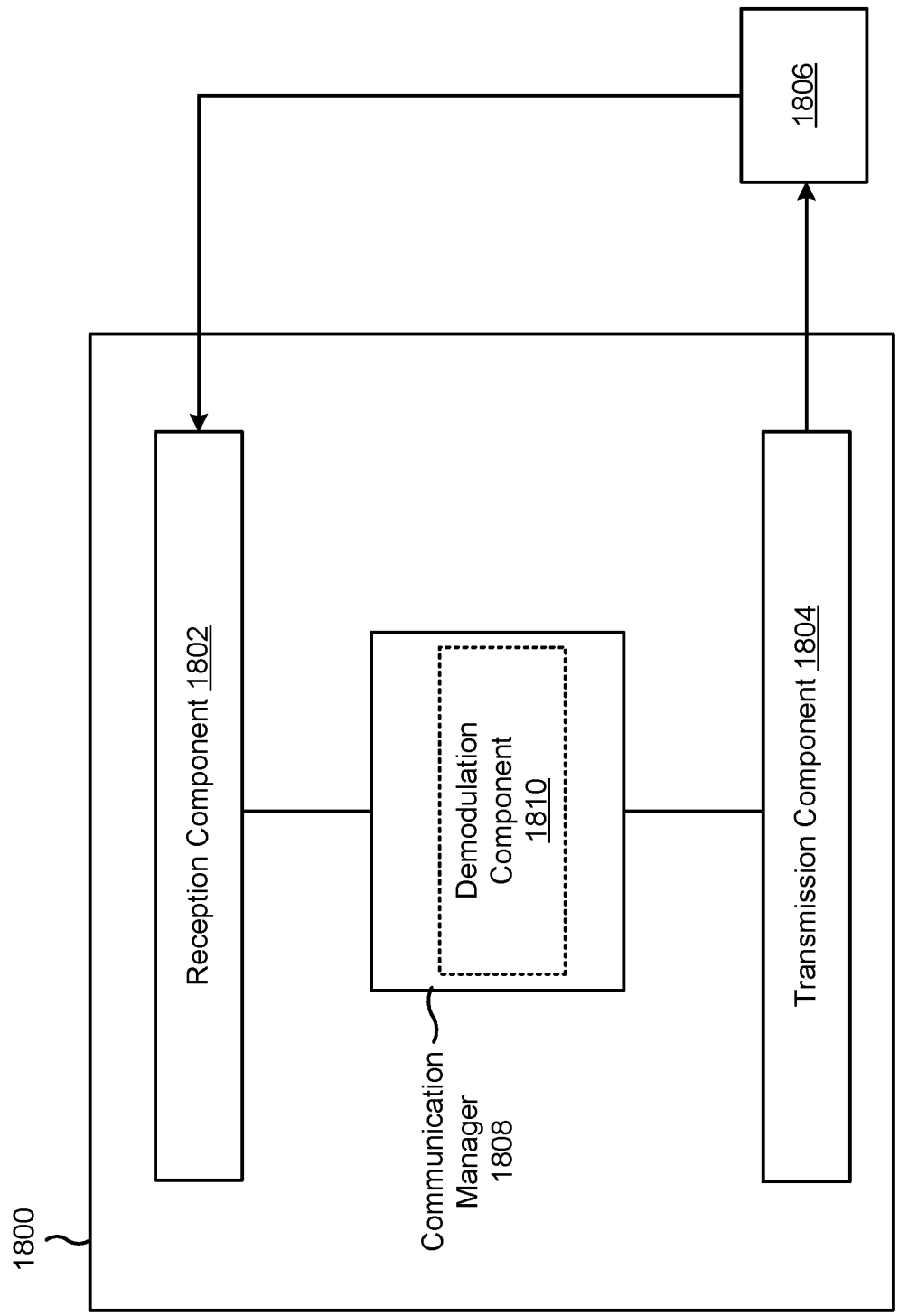
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a network entity, or a network entity may include the apparatus 1800. In some aspects, the apparatus 1800 may be, or may include, a processing system of the network entity. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 1808. The communication manager 1808 may be, or may be similar to, other communication managers described herein The communication manager 1808 may include a demodulation component 1810, among other examples.

In some aspects, the apparatus 1800 may be configured to perform one or more operations described herein in connection with FIGS. 7-14. Additionally, or alternatively, the apparatus 1800 may be configured to perform one or more processes described herein, such as process 1600 of FIG. 16, or a combination thereof. In some aspects, the apparatus 1800 and/or one or more components shown in FIG. 18 may include one or more components of the network entity described in connection with FIG. 2 and/or FIG. 4. Additionally, or alternatively, one or more components shown in FIG. 18 may be implemented within one or more components described in connection with FIG. 2 and/or FIG. 4. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, one or more modems, one or more demodulators, one or more MIMO detectors, one or more receive processors, one or more controllers/processors, one or more memories, or a combination thereof, of the network entity described in connection with FIG. 2 and/or FIG. 4.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, one or more modems, one or more modulators, one or more transmit MIMO processors, one or more transmit processors, one or more controllers/processors, one or more memories, or a combination thereof, of the network entity described in connection with FIG. 2 and/or FIG. 4. In some aspects, the transmission component 1804 may be co-located with the reception component 1802 in one or more transceivers.

The reception component 1802 may receive, from a second network entity, a communication that includes a first layer indicating first information and a second layer indicating second information. The demodulation component 1810 may demodulate the first layer using keying modulation to obtain the first information. The demodulation component 1810 may demodulate the second layer using FMCW modulation to obtain the second information.

The transmission component 1804 may transmit a capability report indicating that the first network entity supports at least one of the keying modulation or the FMCW modulation.

The transmission component 1804 may transmit a capability report indicating that the first network entity supports at least one of a first modulation order for the keying modulation or a second modulation order for the FMCW modulation.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a first network entity, comprising: encoding first information using keying modulation; encoding second information using frequency modulated continuous waveform (FMCW) modulation; and transmitting a communication that includes a first layer indicating the first information and a second layer indicating the second information.

Aspect 2: The method of Aspect 1, wherein the first information includes one or more most significant bits (MSBs) of the communication and the second information includes one or more least significant bits (LSBs) of the communication.

Aspect 3: The method of any of Aspects 1-2, wherein the keying modulation is on-off keying modulation and the FMCW modulation is associated with a slope of an FMCW.

Aspect 4: The method of any of Aspects 1-2, wherein the keying modulation is on-off keying modulation and the FMCW modulation is associated with a cyclic shift of an FMCW.

Aspect 5: The method of any of Aspects 1-2, wherein the keying modulation is frequency-shift keying modulation and the FMCW modulation is associated with a slope of an FMCW.

Aspect 6: The method of any of Aspects 1-2, wherein the keying modulation is frequency-shift keying modulation and the FMCW modulation is associated with a cyclic shift of an FMCW.

Aspect 7: The method of any of Aspects 1-6, wherein the communication includes a wakeup signal.

Aspect 8: The method of any of Aspects 1-7, wherein the first information is intended for a set of one or more network entities, and wherein the second information is intended for a second network entity included in the set of one or more network entities.

Aspect 9: The method of Aspect 8, wherein the set of one or more network entities includes a plurality of network entities, and the second network entity is included in the plurality of network entities.

Aspect 10: The method of any of Aspects 1-9, wherein the first information includes group-common information, and wherein the second information includes entity-specific information.

Aspect 11: The method of Aspect 10, wherein the group-common information includes information that is applicable to a plurality of network entities, and the entity-specific information includes information that is applicable to a single network entity.

Aspect 12: The method of any of Aspects 1-11, wherein the first information indicates that the first network entity has one or more communications to transmit to at least one network entity included in a set of one or more network entities, and wherein the second information includes information indicative of the at least one network entity.

Aspect 13: The method of any of Aspects 1-12, further comprising: receiving a capability report indicating that a second network entity supports at least one of the keying modulation or the FMCW modulation.

Aspect 14: The method of any of Aspects 1-13, further comprising: receiving a capability report indicating that a second network entity supports the keying modulation and does not support the FMCW modulation, and wherein the first information is intended for the second network entity based on the second network entity supporting the keying modulation and the second information is not intended for the second network entity based on the second network entity not supporting the FMCW modulation, wherein the first information is intended for the second network entity based on the second network entity supporting the keying modulation and the second information is not intended for the second network entity based on the second network entity not supporting the FMCW modulation.

Aspect 15: The method of any of Aspects 1-14, further comprising: receiving a capability report indicating that a second network entity supports both the keying modulation and the FMCW modulation, and wherein the second information is intended for the second network entity based on the second network entity supporting both the keying modulation and the FMCW modulation, wherein the second information is intended for the second network entity based on the second network entity supporting both the keying modulation and the FMCW modulation.

Aspect 16: The method of any of Aspects 1-15, further comprising: receiving a capability report indicating that a second network entity supports at least one of a first modulation order for the keying modulation or a second modulation order for the FMCW modulation.

Aspect 17: The method of Aspect 16, wherein the first information is intended for the second network entity, and wherein a size of the first information is based on the first modulation order.

Aspect 18: The method of Aspect 16, wherein the second information is intended for the second network entity, and wherein a size of the second information is based on the second modulation order.

Aspect 19: The method of any of Aspects 1-18, wherein the communication is a broadcast communication, a groupcast communication, or a multicast communication.

Aspect 20: The method of any of Aspects 1-19, wherein the first information is indicative of a first message and the second information is indicative of a second message.

Aspect 21: The method of any of Aspects 1-20, wherein the first information is indicative of a first type of message and the second information is indicative of a second type of message.

Aspect 22: The method of any of Aspects 1-21, wherein the first information is indicative of a control communication and the second information is indicative of a data communication.

Aspect 23: The method of any of Aspects 1-21, wherein the first information is indicative of a control communication and the second information is indicative of a reference signal.

Aspect 24: The method of any of Aspects 1-23, wherein the first layer includes a first data stream and the second layer includes a second data stream.

Aspect 25: A method of wireless communication performed by a first network entity, comprising: receiving, from a second network entity, a communication that includes a first layer indicating first information and a second layer indicating second information; demodulating the first layer using keying modulation to obtain the first information; and demodulating the second layer using frequency modulated continuous waveform (FMCW) modulation to obtain the second information.

Aspect 26: The method of Aspect 25, wherein the first information includes one or more most significant bits (MSBs) of the communication and the second information includes one or more least significant bits (LSBs) of the communication.

Aspect 27: The method of any of Aspects 25-26, wherein the keying modulation is on-off keying modulation and the FMCW modulation is associated with a slope of an FMCW.

Aspect 28: The method of any of Aspects 25-27, wherein the keying modulation is on-off keying modulation and the FMCW modulation is associated with a cyclic shift of an FMCW.

Aspect 29: The method of any of Aspects 25-27, wherein the keying modulation is frequency-shift keying modulation and the FMCW modulation is associated with a slope of an FMCW.

Aspect 30: The method of any of Aspects 25-27, wherein the keying modulation is frequency-shift keying modulation and the FMCW modulation is associated with a cyclic shift of an FMCW.

Aspect 31: The method of any of Aspects 25-30, wherein the communication includes a wakeup signal.

Aspect 32: The method of any of Aspects 25-31, wherein the first information is intended for a set of one or more network entities including the first network entity, and wherein the second information is intended for the first network entity.

Aspect 33: The method of Aspect 32, wherein the set of one or more network entities includes a plurality of network entities, and the first network entity is included in the plurality of network entities.

Aspect 34: The method of any of Aspects 25-33, wherein the first information includes group-common information, and wherein the second information includes entity-specific information.

Aspect 35: The method of Aspect 34, wherein the group-common information includes information that is applicable to a plurality of network entities including the first network entity, and the entity-specific information includes information that is applicable to only the first network entity.

Aspect 36: The method of any of Aspects 25-35, wherein the first information indicates that the second network entity has one or more communications to transmit to at least one network entity included in a set of one or more network entities, and wherein the second information includes information indicative of the at least one network entity being the first network entity.

Aspect 37: The method of any of Aspects 25-36, wherein the FMCW modulation is associated with slopes of an FMCW, and wherein demodulating the second layer comprises: combining the communication with respective signals associated with a set of one or more candidate slopes resulting in one or more combined signals; and determining a slope, from the set of one or more candidate slopes, based on energy levels of received combined signals from the one or more combined signals, wherein the slope indicates the second information.

Aspect 38: The method of any of Aspects 25-37, wherein the FMCW modulation is associated with cyclic shifts of an FMCW, and wherein demodulating the second layer comprises: combining the communication with respective signals associated with a set of one or more candidate cyclic shifts resulting in one or more combined signals; and determining a cyclic shift, from the set of one or more candidate cyclic shifts, based on energy levels of received combined signals from the one or more combined signals, wherein the cyclic shift indicates the second information.

Aspect 39: The method of any of Aspects 25-38, wherein the FMCW modulation is associated with cyclic shifts of an FMCW, and wherein demodulating the second layer comprises: combining the communication with a signal associated with a candidate cyclic shift, resulting in a combined signal; comparing an energy level of the combined signal to one or more candidate energy levels associated with respective candidate cyclic shifts from a set of one or more candidate cyclic shifts; and determining a cyclic shift, from the set of one or more candidate cyclic shifts, based on comparing the energy level to the one or more candidate energy levels.

Aspect 40: The method of any of Aspects 25-39, further comprising: transmitting a capability report indicating that the first network entity supports at least one of the keying modulation or the FMCW modulation.

Aspect 41: The method of any of Aspects 25-40, further comprising: transmitting a capability report indicating that the first network entity supports at least one of a first modulation order for the keying modulation or a second modulation order for the FMCW modulation.

Aspect 42: The method of Aspect 41, wherein a size of the first information is based on the first modulation order.

Aspect 43: The method of Aspect 41, wherein a size of the second information is based on the second modulation order.

Aspect 44: The method of any of Aspects 25-43, wherein the communication is a broadcast communication, a groupcast communication, or a multicast communication.

Aspect 45: The method of any of Aspects 25-44, wherein the first information is indicative of a first message and the second information is indicative of a second message.

Aspect 46: The method of any of Aspects 25-45, wherein the first information is indicative of a first type of message and the second information is indicative of a second type of message.

Aspect 47: The method of any of Aspects 25-46, wherein the first information is indicative of a control communication and the second information is indicative of a data communication.

Aspect 48: The method of Aspect 47, wherein demodulating the second layer comprises: demodulating the first layer to obtain the control communication; and demodulating, based on the control communication, the second layer to obtain the data communication.

Aspect 49: The method of any of Aspects 25-46, wherein the first information is indicative of a control communication and the second information is indicative of a reference signal.

Aspect 50: The method of any of Aspects 25-49, wherein the first layer includes a first data stream and the second layer includes a second data stream.

Aspect 51: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-50.

Aspect 52: An apparatus for wireless communication at a device, the apparatus comprising one or more memories and one or more processors coupled to the one or more memories, the one or more processors configured to cause the device to perform the method of one or more of Aspects 1-50.

Aspect 53: An apparatus for wireless communication, the apparatus comprising at least one means for performing the method of one or more of Aspects 1-50.

Aspect 54: A non-transitory computer-readable medium storing code for wireless communication, the code comprising instructions executable by one or more processors to perform the method of one or more of Aspects 1-50.

Aspect 55: A non-transitory computer-readable medium storing a set of instructions for wireless communication, the set of instructions comprising one or more instructions that, when executed by one or more processors of a device, cause the device to perform the method of one or more of Aspects 1-50.

Aspect 56: A device for wireless communication, the device comprising a processing system that includes one or more processors and one or more memories coupled with the one or more processors, the processing system configured to cause the device to perform the method of one or more of Aspects 1-50.

Aspect 57: An apparatus for wireless communication at a device, the apparatus comprising one or more memories and one or more processors coupled to the one or more memories, the one or more processors individually or collectively configured to cause the device to perform the method of one or more of Aspects 1-50.

Aspect 58: A device for wireless communication, comprising: a processing system configured to perform the method of one or more of Aspects 1-50.

Aspect 59: An apparatus for wireless communication at a device, the apparatus comprising: a processing system configured to perform the method of one or more of Aspects 1-50.

Aspect 60: A device for wireless communication, comprising: at least one memory; at least one communication interface; and at least one processor coupled to the at least one memory and the at least one communication interface, wherein the at least one processor is configured to perform the method of one or more of Aspects 1-50.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, because those skilled in the art understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. As another example, "determining" can include resolving, selecting, obtaining, choosing, establishing and other such similar actions.

Even though particular combinations of features are recited in the claims and/or disclosed in the specification, these combinations do not limit the scope of the disclosure. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" covers a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein is critical or essential unless explicitly described as such. Also, as used herein, the articles "a" and "an" include one or more items and may be used interchangeably with "one or more." Further, as used herein, the article "the" includes one or more items referenced in connection with the article "the" and may be used interchangeably with "the one or more." Furthermore, as used herein, the terms "set" and "group" include one or more items and may be used interchangeably with "one or more." Where only one item is intended, the phrase "only one" or similar language is used. Also, as used herein, the terms "has," "have," "having," or the like are open-ended terms that do not limit an element that they modify (e.g., an element "having" A may also have B). Further, as used herein, "based on" is in the inclusive sense, unless otherwise explicitly indicated. For example, "based on" may be used interchangeably with "based at least in part on," "associated with", or "in accordance with" unless otherwise explicitly indicated. The phrase "based on" shall not be construed as a reference to a closed set of information, one or more conditions, one or more factors, or the like. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is inclusive when used in a series and may be used interchangeably with "and/or," unless explicitly stated otherwise (e.g., if used in combination with "either" or "only one of").

What is claimed is:

1. A first network entity for wireless communication, comprising:
  a processing system configured to:
    encode first information using keying modulation, wherein the first information is intended for a set of one or more network entities;
    encode second information using frequency modulated continuous waveform (FMCW) modulation, wherein the second information is intended for a second network entity included in the set of one or more network entities; and
    transmit a communication that includes a first layer indicating the first information and a second layer indicating the second information.

2. The first network entity of claim 1, wherein the first information includes one or more most significant bits (MSBs) of the communication and the second information includes one or more least significant bits (LSBs) of the communication.

3. The first network entity of claim 1, wherein the keying modulation is on-off keying modulation and the FMCW modulation is associated with a slope of an FMCW.

4. The first network entity of claim 1, wherein the keying modulation is on-off keying modulation and the FMCW modulation is associated with a cyclic shift of an FMCW.

5. The first network entity of claim 1, wherein the keying modulation is frequency-shift keying modulation and the FMCW modulation is associated with a slope of an FMCW.

6. The first network entity of claim 1, wherein the keying modulation is frequency-shift keying modulation and the FMCW modulation is associated with a cyclic shift of an FMCW.

7. The first network entity of claim 1, wherein the communication includes a wakeup signal.

8. The first network entity of claim 1, wherein the set of one or more network entities includes a plurality of network entities, and the second network entity is included in the plurality of network entities.

9. The first network entity of claim 1, wherein the first information includes group-common information, and wherein the second information includes entity-specific information.

10. The first network entity of claim 9, wherein the group-common information includes information that is applicable to a plurality of network entities, and the entity-specific information includes information that is applicable to a single network entity.

11. A first network entity for wireless communication, comprising:
  a processing system configured to:
    receive, from a second network entity, a communication that includes a first layer indicating first information and a second layer indicating second information;
    demodulate the first layer using keying modulation to obtain the first information, wherein the first information is intended for a set of one or more network entities including the first network entity; and
    demodulate the second layer using frequency modulated continuous waveform (FMCW) modulation to obtain the second information, wherein the second information is intended for the first network entity.

12. The first network entity of claim 11, wherein the first information includes one or more most significant bits (MSBs) of the communication and the second information includes one or more least significant bits (LSBs) of the communication.

13. The first network entity of claim 11, wherein the communication includes a wakeup signal.

14. The first network entity of claim 11, wherein the second information is intended for a plurality of network entities included in the set of network entities, and wherein the first network entity is included in the plurality of network entities.

15. The first network entity of claim 11, wherein the first information includes group-common information, and wherein the second information includes entity-specific information.

16. The first network entity of claim 11, wherein the first information indicates that the second network entity has one or more communications to transmit to at least one network entity included in the set of network entities, and wherein the second information includes information indicative of the at least one network entity being the first network entity.

17. The first network entity of claim 11, wherein the FMCW modulation is associated with slopes of an FMCW, and wherein, to demodulate the second layer, the processing system is configured to:
combine the communication with respective signals associated with a set of one or more candidate slopes resulting in one or more combined signals; and
determine a slope, from the set of one or more candidate slopes, based on energy levels of received combined signals from the one or more combined signals, wherein the slope indicates the second information.

18. The first network entity of claim 11, wherein the FMCW modulation is associated with cyclic shifts of an FMCW, and wherein, to demodulate the second layer, the processing system is configured to:
combine the communication with respective signals associated with a set of one or more candidate cyclic shifts resulting in one or more combined signals; and
determine a cyclic shift, from the set of one or more candidate cyclic shifts, based on energy levels of received combined signals from the one or more combined signals, wherein the cyclic shift indicates the second information.

19. The first network entity of claim 11, wherein the FMCW modulation is associated with cyclic shifts of an FMCW, and wherein, to demodulate the second layer, the processing system is configured to:
combine the communication with a signal associated with a candidate cyclic shift, resulting in a combined signal;
compare an energy level of the combined signal to one or more candidate energy levels associated with respective candidate cyclic shifts from a set of one or more candidate cyclic shifts; and
determine a cyclic shift, from the set of one or more candidate cyclic shifts, based on comparing the energy level to the one or more candidate energy levels.

20. The first network entity of claim 11, wherein the processing system is configured to:
transmit a capability report indicating that the first network entity supports at least one of the keying modulation or the FMCW modulation.

21. The first network entity of claim 11, wherein the processing system is configured to:
transmit a capability report indicating that the first network entity supports at least one of a first modulation order for the keying modulation or a second modulation order for the FMCW modulation.

22. A first network entity for wireless communication, comprising:
a processing system configured to:
encode first information using keying modulation, wherein the keying modulation is on-off keying modulation;
encode second information using frequency modulated continuous waveform (FMCW) modulation, wherein the FMCW modulation is associated with a cyclic shift of an FMCW; and
transmit a communication that includes a first layer indicating the first information and a second layer indicating the second information.

23. A first network entity for wireless communication, comprising:
a processing system configured to:
encode first information using keying modulation, wherein the keying modulation is frequency-shift keying modulation;
encode second information using frequency modulated continuous waveform (FMCW) modulation, wherein the FMCW modulation is associated with a cyclic shift of an FMCW; and
transmit a communication that includes a first layer indicating the first information and a second layer indicating the second information.

24. A first network entity for wireless communication, comprising:
a processing system configured to:
encode first information using keying modulation, wherein the first information includes group-common information;
encode second information using frequency modulated continuous waveform (FMCW) modulation, wherein the second information includes entity-specific information; and
transmit a communication that includes a first layer indicating the first information and a second layer indicating the second information.

25. The first network entity of claim 24, wherein the group-common information includes information that is applicable to a plurality of network entities, and the entity-specific information includes information that is applicable to a single network entity.

26. A first network entity for wireless communication, comprising:
a processing system configured to:
receive, from a second network entity, a communication that includes a first layer indicating first information and a second layer indicating second information, wherein the first information includes group-common information, and wherein the second information includes entity-specific information;
demodulate the first layer using keying modulation to obtain the first information; and
demodulate the second layer using frequency modulated continuous waveform (FMCW) modulation to obtain the second information.

27. A first network entity for wireless communication, comprising:
a processing system configured to:
receive, from a second network entity, a communication that includes a first layer indicating first information and a second layer indicating second information, wherein the first information indicates that the second network entity has one or more communications to transmit to at least one network entity included in a set of one or more network entities, and wherein the second information includes information indicative of the at least one network entity being the first network entity;

demodulate the first layer using keying modulation to obtain the first information; and demodulate the second layer using frequency modulated continuous waveform (FMCW) modulation to obtain the second information.

28. A first network entity for wireless communication, comprising:

a processing system configured to:

transmit a capability report indicating that the first network entity supports at least one of keying modulation or frequency modulated continuous waveform (FMCW) modulation;

receive, from a second network entity, a communication that includes a first layer indicating first information and a second layer indicating second information;

demodulate the first layer using the keying modulation to obtain the first information; and demodulate the second layer using the FMCW modulation to obtain the second information.

29. A first network entity for wireless communication, comprising:

a processing system configured to:

transmit a capability report indicating that the first network entity supports at least one of a first modulation order for keying modulation or a second modulation order for frequency modulated continuous waveform (FMCW) modulation;

receive, from a second network entity, a communication that includes a first layer indicating first information and a second layer indicating second information;

demodulate the first layer using keying modulation to obtain the first information; and demodulate the second layer using frequency modulated continuous waveform (FMCW) modulation to obtain the second information.

\* \* \* \* \*